US010748287B2

United States Patent
Dhaini et al.

(10) Patent No.: US 10,748,287 B2
(45) Date of Patent: Aug. 18, 2020

(54) SYSTEM AND METHOD FOR AUTOMATED DETECTION AND MEASUREMENT OF CORNEAL HAZE AND DEMARCATION LINE IN OPTICAL COHERENCE TOMOGRAPHY IMAGES

(71) Applicant: American University of Beirut, Beirut (LB)

(72) Inventors: Ahmad R. Dhaini, Quebec (CA); Sarah Maria El Oud, Beirut (LB); Shady Awwad, Beirut (LB); Maamoun Abdul Fattah, Beirut (LB); Manal Chokr, Beirut (LB)

(73) Assignee: American University of Beirut, Beirut (LB)

( * ) Notice: Subject to any disclaimer, the term of this patent is extended or adjusted under 35 U.S.C. 154(b) by 78 days.

(21) Appl. No.: 16/009,937

(22) Filed: Jun. 15, 2018

(65) Prior Publication Data

US 2018/0365833 A1    Dec. 20, 2018

Related U.S. Application Data

(60) Provisional application No. 62/521,199, filed on Jun. 16, 2017.

(51) Int. Cl.
*G06T 7/00* (2017.01)
*G06K 9/00* (2006.01)
*G06F 3/0481* (2013.01)
*G06T 7/11* (2017.01)
(Continued)

(52) U.S. Cl.
CPC .......... *G06T 7/0014* (2013.01); *G06F 3/0481* (2013.01); *G06K 9/0061* (2013.01); *G06K 9/44* (2013.01); *G06K 9/6222* (2013.01); *G06T 7/11* (2017.01); *G06K 2209/05* (2013.01); *G06T 2207/10101* (2013.01); *G06T 2207/30041* (2013.01)

(58) Field of Classification Search
CPC ............... G06T 7/0014; G06T 7/11; G06T 2207/10101; G06T 2207/30041; G06K 9/6222; G06K 9/44; G06K 9/0061; G06K 2209/05; G06F 3/0481
See application file for complete search history.

(56) References Cited

U.S. PATENT DOCUMENTS

| | | | |
|---|---|---|---|
| 7,501,645 B2 | 3/2009 | Shaver | 250/559.27 |
| 8,632,180 B2 | 1/2014 | Narasimha-Iyer | 351/206 |
| 9,677,869 B2 * | 6/2017 | Berkeley | G01N 21/359 |

(Continued)

FOREIGN PATENT DOCUMENTS

WO    WO2016/109750    7/2016

OTHER PUBLICATIONS

Baggio, D. L., OpenCV 3.0 Computer Vision with Java. PACKT, 2015.

(Continued)

*Primary Examiner* — Neil R Mclean
(74) *Attorney, Agent, or Firm* — J. Peter Paredes; David G. Rosenbaum; Rosenbaum IP, P.C.

(57) ABSTRACT

A system and method for Automated Detection and Measurement of Corneal Haze and the Demarcation Line is disclosed. Data extraction module performs visual data and statistics generation to detect corneal haze and calculate corneal attributes in images.

20 Claims, 28 Drawing Sheets

(51) Int. Cl.
*G06K 9/44* (2006.01)
*G06K 9/62* (2006.01)

(56) References Cited

U.S. PATENT DOCUMENTS

| | | | | |
|---|---|---|---|---|
| 9,721,351 | B2* | 8/2017 | Gonzalez | A61F 9/008 |
| 10,076,242 | B2* | 9/2018 | Sadda | G01B 9/02083 |
| 2007/0282313 | A1 | 12/2007 | Huang et al. | 606/5 |
| 2009/0268159 | A1 | 10/2009 | Xu et al. | 351/206 |
| 2012/0184845 | A1 | 7/2012 | Ishikawa et al. | 600/425 |
| 2015/0305614 | A1* | 10/2015 | Narasimha-Iyer | G06T 7/0012 351/206 |
| 2016/0058280 | A1 | 3/2016 | Srivastava et al. | A61B 3/0025 |
| 2016/0183786 | A1* | 6/2016 | Wei | A61B 3/1233 351/205 |
| 2016/0278627 | A1 | 9/2016 | Huang et al. | A61B 3/0025 |

OTHER PUBLICATIONS

Dhawan, S. et al. "Complications of corneal collagen cross-linking." Journal of Ophthalmology (2011), vol. 2011, Article ID 869015, 5 pages.
Frank et al. "Weka-A Machine Learning Workbench for Data Mining." Data Mining and Knowledge Discovery Handbook. Springer US, 2005. pp. 1269-1277.
http://what-when-how.com/introduction-to-video-and-image-processing/morphology-introduction-to-video-and-image-processing-part-2/ (Oct. 15, 2018).
Kueh HY, et al., Image analysis for biology, MBL Physiology Course 2008, pp. 1-52.
Seiler et al. "Corneal cross-linking-induced stromal demarcation line." Cornea 25.9 (2006): 1057-1059.
Sinjab et al. "Corneal Collagen Cross Linking." (2016).
Suzuki, S. et al, "Topological structural analysis of digitized binary images by border following," Computer Vision, Graphics, and Image Processing, 1985, pp. 32-46, vol. 30, Issue 1.
The OpenCV Reference Manual, Release 3.0.0-dev, pp. 1-899, Jun. 25, 2014.
Waked N et al. "Keratoconus screening in a Lebanese students population". J Fr Ophthalmol (2012).
Walfish, S., A Review of Statistical Outlier Methods, Nov. 2, 2006, pp. 1-5, Pharmaceutical Technology.
Young IT, et al., Fundamentals of Image Processing, 1995-2007, pp. 1-112, Version 2.3, Delft University of Technology.
Zeiss, Cirrus HD-OCT. User Manual Addendum—Anterior Segment Imaging. (2015).
International Search Report and Written Opinion issued in corresponding foreign application, PCT/US18/37758, pp. 1-9 (dated Nov. 1, 2018).
Avetisov S.E. et al. UNIVERSUM: medicine and pharmacology No. 4 (38), pp. 2-7, Apr. 2017.

* cited by examiner

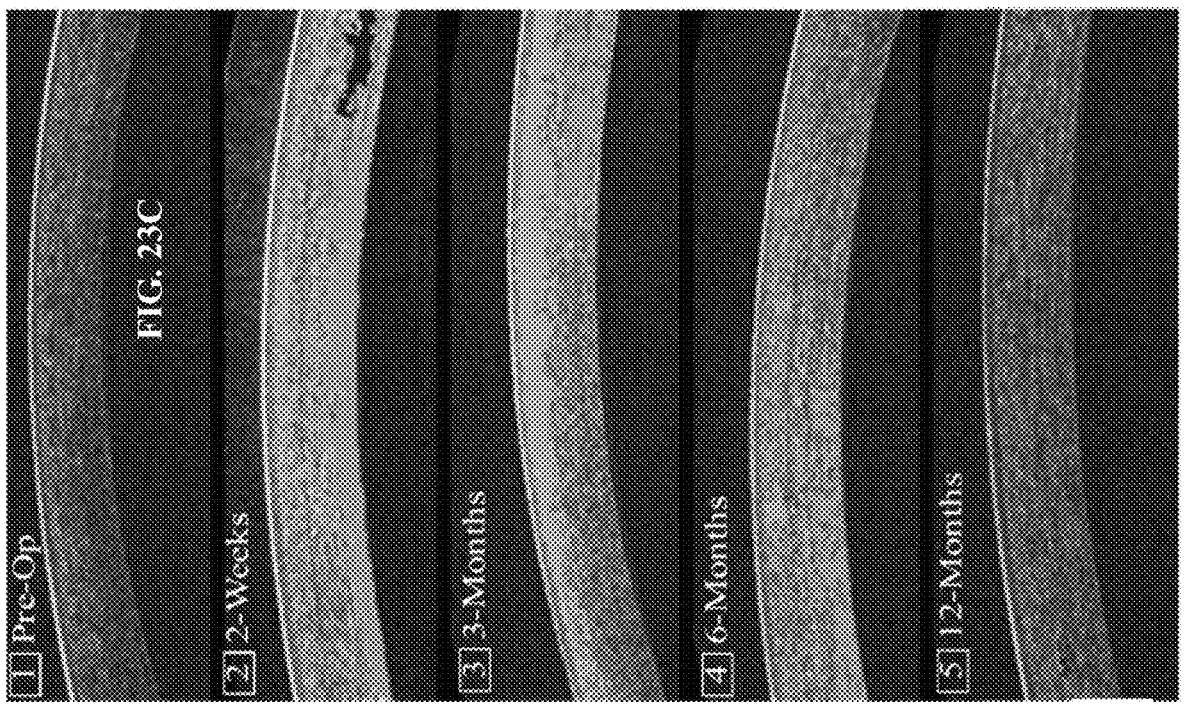
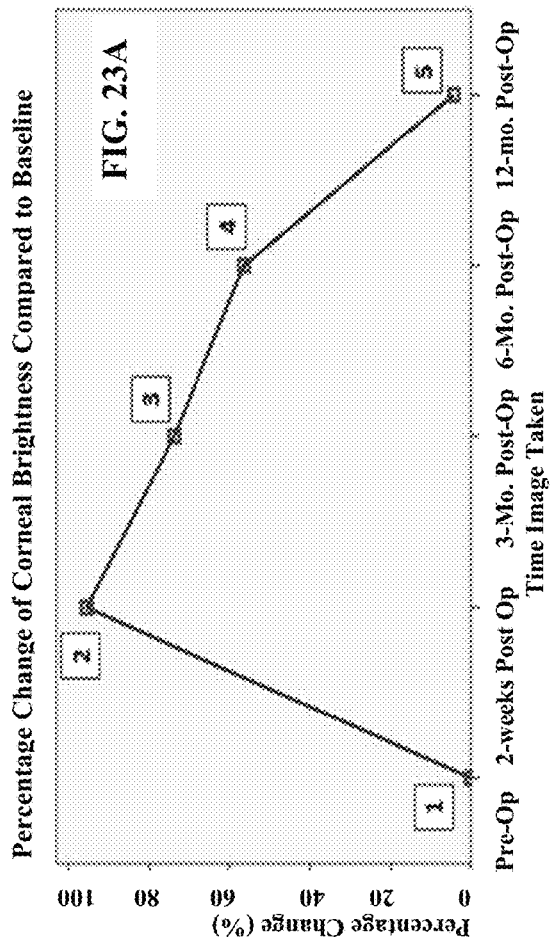
(a) Haze Brightness change over time
Percentage Area of Cornea Occupied by Haze
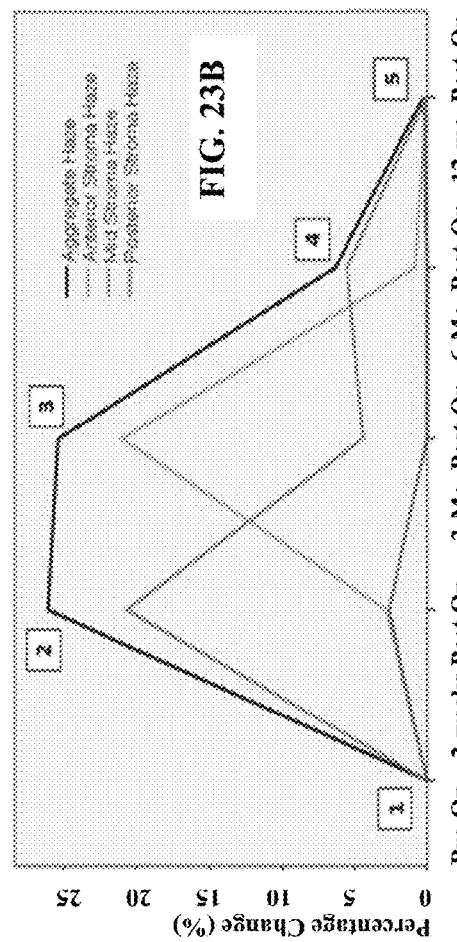
(b) Change of corneal area occupied by haze over time

SYSTEM AND METHOD FOR AUTOMATED DETECTION AND MEASUREMENT OF CORNEAL HAZE AND DEMARCATION LINE IN OPTICAL COHERENCE TOMOGRAPHY IMAGES

CROSS-REFERENCE TO RELATED APPLICATIONS

The present application claims priority from U.S. provisional application Ser. No. 62/521,199, filed Jun. 16, 2017, herein incorporated by reference in its entirety.

BACKGROUND

The invention generally relates to image detection and specifically automated image detection.

Corneal haze describes a cloudy or opaque appearance of the cornea, as shown in FIG. 1. It is most often caused by inflammatory cells and other debris activated during trauma, infection, or eye procedures and surgeries such as crosslinking for keratoconus eyes and refractive surgeries (i.e., LASIK). The cornea is normally clear and corneal haze can occur in any part of the cornea, thus it can greatly impair vision. A demarcation line indicates the transition zone between cross-linked anterior corneal stroma and untreated posterior corneal stroma; it is biomicroscopically detectable as early as 2 weeks after treatment. The presence and depth of the demarcation line is an easy and useful tool for clinicians to assess the corneal cross-linking effect and determining the efficacy of the procedure.

The backscattered light from a normal (clear) cornea is typically low, but in corneal dystrophies or after injury, corneal haze can be associated with pathology that often indicates the corneal structures responsible for poor vision. Thus, changes in haze and demarcation line can be used to track progression of disease or response to treatment such as crosslinking or refractive surgery. More importantly, observation of haze has been very valuable to ophthalmologists because the same processes that produce haze are often responsible for forward scatter that degrades vision. Similarly, the presence and depth of the demarcation line reflects the success of the surgery and/or treatment.

To date, clinical instruments for measuring haze have included custom modified slit-lamps, clinical confocal microscopes, and Scheimpflug cameras. The spatial resolution needed to identify the source of the backscattered light varies among instruments. Some slit-illumination instruments can only resolve approximately two thirds of the full corneal thickness, while the depth of field with confocal microscopes has been reported from 4 to 26 µm.

Therefore, quantification of corneal haze by means of an objective method that can adequately assess the overall amount of opacification, coupled with analysis of its regional variations within the cornea relative to the ablation zone, would lead to better understanding of the phenomenon. Furthermore, standardizing image brightness in optical coherence tomography (OCT) images and developing the technology for automatically detecting and classifying corneal haze will offer objective view of the cornea and may improve clinical decision-making after corneal surgeries such as crosslinking and LASIK.

Furthermore, the demarcation line can be manually observed by a human operator using the OCT scanner interface; however, the process is tedious and time consuming; the experienced operator will have to observe many OCT sections of the cornea and determine the demarcation line among other reactive and non-specific hazy lines that can mimic the actual demarcation line. Subsequently, the operator would need to use a digital caliper to evaluate the line depth. Most importantly, the whole evaluation is in part subjective and operator-dependent, with intra-observer repeatability and inter-observer reproducibility not yet investigated. Thus, automated detection and measurement of the demarcation line depth can become "the standard of care" in cross-linking surgery in assessing treatment success. By the same token, software analysis of stromal haze could potentially become instrumental in objectively assessing cross-linking side effects.

Optical Coherence Tomography is a non-invasive, in-vivo imaging technique based on the back-scatter or reflectivity of light in a medium (see, e.g., Huang et al. 1991). In ophthalmic examinations, the beam of light produced by the OCT device scans the eye through the pupil and the image formation process records the back-scattering profile of the light at each location. The amount of scatter is indicative of the reflectivity of the tissue encountered, and a grayscale cross-sectional image is formed as the light beam sweeps across the field of view (FOV). OCT imaging has dramatically advanced ophthalmic diagnostic capabilities and led also to better understanding of ocular anatomy. It is now an established basis of routine ophthalmic practice. Several implementations of OCT have been developed including time domain (TD-OCT) and frequency domain (FD-OCT) which covers both spectral domain (SD-OCT) and swept-source (SS-OCT). The present invention attempts to solve these problems as well as others.

SUMMARY OF THE INVENTION

Provided herein are systems, methods and compositions for Automated Detection and Measurement of Corneal Haze.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 15a is Post-Closing; FIG. 15b is Post-Contouring; FIG. 15c is Post-Dilation; and FIG. 15d is Final result: haze detected and outlined.

FIG. 23A is a graph showing the analysis of sample patient haze and corneal brightness over time; FIG. 23B is a graph showing the analysis of sample patient corneal area occupied by haze over time; and FIG. 23C is the associated OCT images of the haze and corneal brightness over the time period.

FIG. 25 shows the Differences of depths for all patients among ophthalmologists on two occasions; and FIG. 26 shows Differences of depths of the demarcation lines as measured by ophthalmologists and software in microns for all patients at 1-month and 3-months post-operation periods.

DETAILED DESCRIPTION OF THE INVENTION

Figure 1:
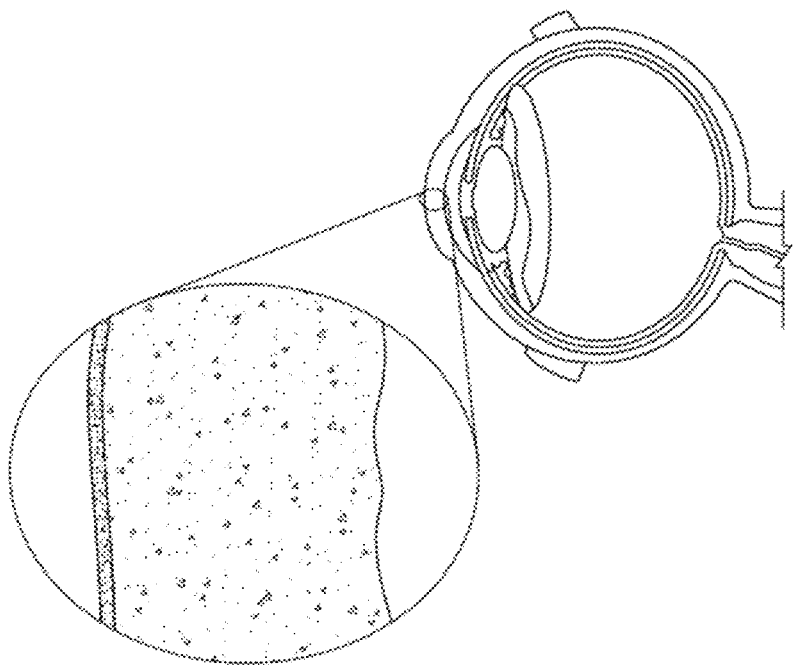
FIG. 1 is a schematic representation of the anatomy of the human eye with a cross section of the cornea.
Figure 2:
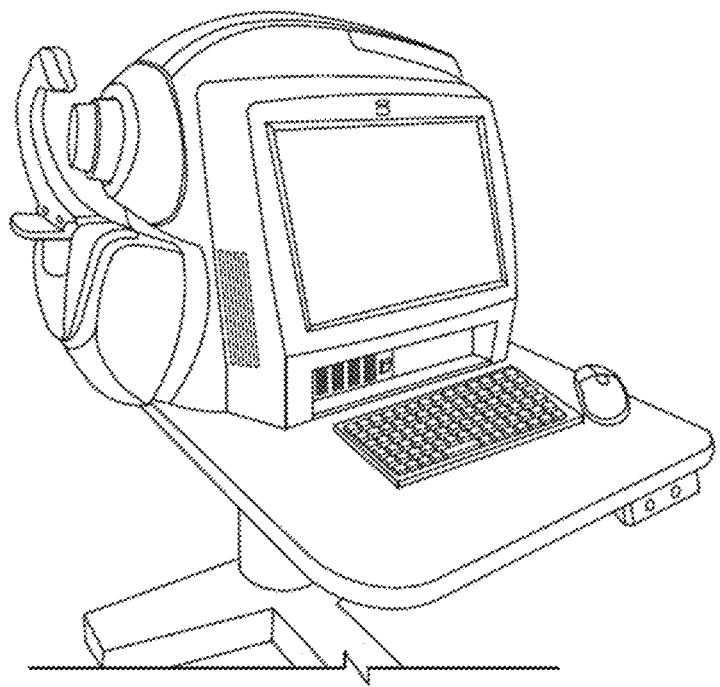
FIG. 2 is an Optical Coherence Tomography (OCT) image scanner.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the surgical area of a patient and/or the implant.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any non-claimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The System and Method for Automated Detection and Measurement of Corneal Haze comprises a fast objective detection and measurement of corneal haze using spectral domain optical coherence tomography (SD-OCT) images. The System and Method for Automated Detection and Measurement of Corneal Haze includes an image analysis technique capable of providing absolute measurements of corneal signal intensities and contrast via detecting regions of bright intensity so as to detect and classify haze. The System and Method for Automated Detection and Measurement of Corneal Haze comprises: 1) detecting the boundaries of the cornea; 2) computing the average brightness of the cornea and corneal thickness; 3) locating a plurality of regions of interest; 4) classifying location as anterior, middle, or posterior relative to the cornea; or 5) detecting the demarcation line (if present), and measure its corneal depth. The System and Method for Automated Detection and Measurement of Corneal Haze also detects and determines the depth of the demarcation line (if present); this is very important as the presence and depth of the demarcation line reflects the success of the surgery and/or treatment.

Moreover, the System and Method for Automated Detection and Measurement of Corneal Haze includes image analysis and machine learning techniques capable of detecting the presence and measuring the depth of demarcation line as follows: Given an OCT video, consisting of 128 transversal cuts (i.e., 2D images), the technology detects the line via the following six steps: 1) filter valid cuts in an OCT image; 2) detect the boundaries of the cornea; 3) detect the depth of the Epithelium; 4) detect potential demarcation lines in each cut 5) filter candidate demarcation lines across all valid cuts; 6) report the cut and the depth of the chosen demarcation line.

The System and Method for Automated Detection and Measurement of Corneal Haze can be employed as a standardized tool for corneal stromal haze and demarcation line measurement of individual patients or in aggregate data for the purpose of longitudinal studies. The System and Method for Automated Detection and Measurement of Corneal Haze will help ophthalmologists have a better understanding of the corneal haze phenomenon. The System and Method for Automated Detection and Measurement of Corneal Haze will also help improve clinical decision-making (i.e., treatment and diagnosis). Furthermore, with some customizations, the System and Method for Automated Detection and Measurement of Corneal Haze may be employed in other medical practices such as Pathology.

The System and Method for Automated Detection and Measurement of Corneal Haze may be comprised in two main forms: 1) stand-alone software that can be installed on a computer used by the ophthalmologist; 2) a web application accessible to ophthalmologists around the world; or 3) a software plugin installed as part of the OCT image scanner software. The technology will enable ophthalmologists to obtain fast objective measurement and classification of corneal haze, as well as detection and measurement of demarcation line depth, which may improve clinical decision-making after corneal surgeries such as crosslinking and LASIK. The invention also has the promise to be applied in other medical sectors and practices such as Pathology. The System and Method for Automated Detection and Measurement of Corneal Haze (in both forms) comprises two main modules: a Back-end system and a Front-end system. The Back-end system includes the new image processing technique that processes and analyses the digital OCT image to detect and measure haze and the demarcation line. The Back-end then provides statistics and information about the haze regions and the stromal demarcation line in the image. The Front-end module comprises a user-interface for the physician to interact with the Back-end (e.g., visually view statistics, toggle some back-end parameters to customize the view of the image, show highlights of different haze regions, highlight the demarcation line, and create a new project for each patient, load images, etc.).

Figure 3:
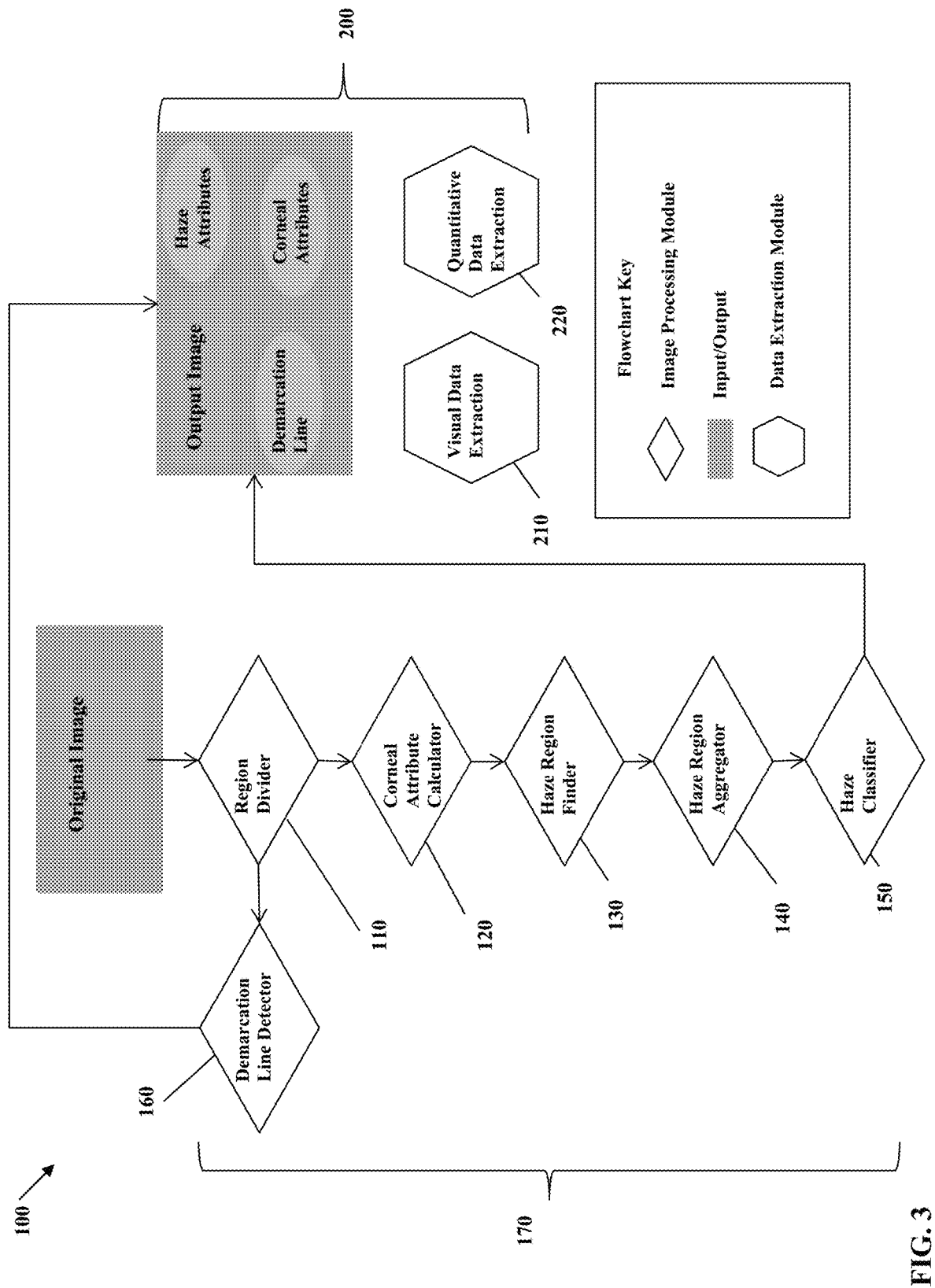
FIG. 3 is a schematic diagram of the Software Architecture.

The architecture of the software of the System and Method for Automated Detection and Measurement of Corneal Haze is depicted in FIG. 3; the System and Method for Automated Detection and Measurement of Corneal Haze comprises two main modules. The first module is the image processing module 170, which uses a unique algorithm to find and measure the haze in the OCT image and returns information about the image. This information is used by the second module, the data extraction module to either produce visualization of several features found in the image (e.g., regions of haze) or to retrieve statistical data about the haze and cornea.

Referring now to FIG. 3, there is illustrated a block diagram of a computer operable to execute the disclosed architecture 100. In order to provide additional context for various aspects of the subject innovation, FIG. 3 and the following discussion are intended to provide a brief, general description of a suitable computing environment in which the various aspects of the innovation can be implemented.

While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos. The term "algorithm" as used herein is a broad term and is to be given its ordinary and customary meaning to a person of ordinary skill in the art (and is not to be limited to a special or customized meaning), and furthermore refers without limitation to a computational process (for example, programs) involved in transforming information from one state to another, for example, by using computer processing.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

The System and Method for Automated Detection and Measurement comprises an image processing module 170 and a data extraction module 200. The image processing module comprises a plurality of sub-modules selected from the group consisting of: a region divider 110, a corneal attribute calculator 120, a haze region detection 130, a haze region aggregation 140, a haze classifier 150, and a demarcation line detector 160.

Figure 4:
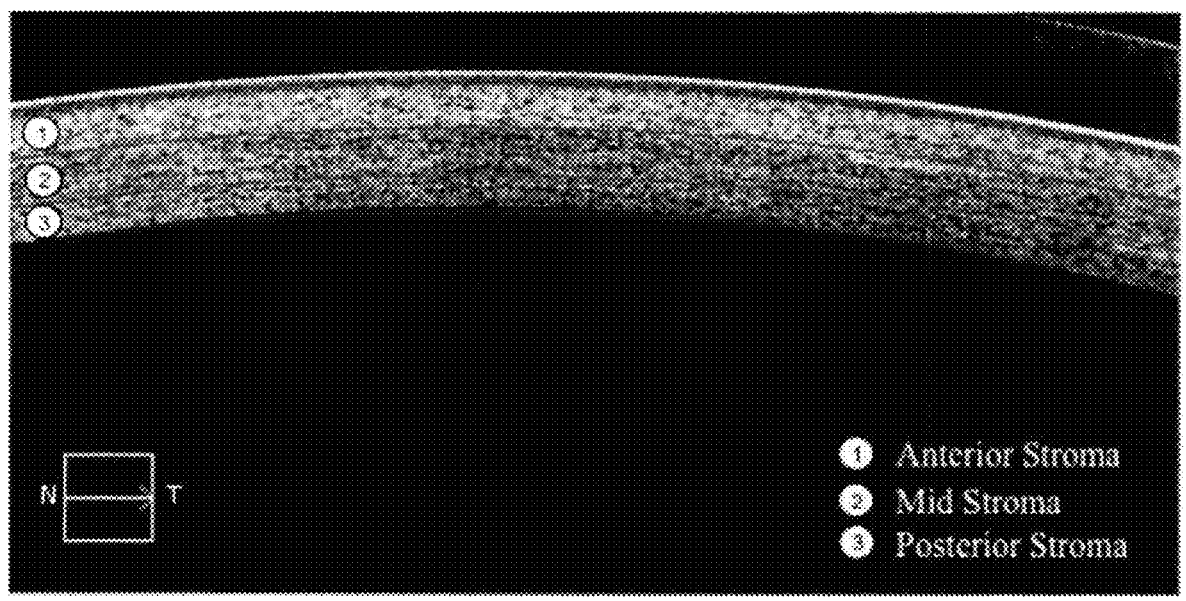
FIG. 4 is an OCT image of the segments of the cornea, namely, 1) Anterior Stroma; 2) Mid Stroma; and 3) Posterior Stroma.

The region divider 110 is used in order to detect haze and calculate corneal attributes, the program must first locate the region covered by the cornea in the image, via dividing it into segments. To segment the image, the program finds the coordinates of the top and bottom boundaries of the cornea. Furthermore, to classify the detected haze, the cornea is segmented into three regions of equal size using a new boundary detection technique: Anterior Stroma, Mid Stroma, Posterior Stroma (as shown in FIG. 4).

The corneal attribute calculator 120 is used once the boundaries of the image are identified, the program calculates the corneal thickness, total corneal area, total corneal intensity, and average corneal intensity. These are salient parameters that are used in the haze detection and classification stage.

The haze region detection 130 is used for the data extracted by the first two sub-modules is used to find regions within the cornea that have similar haze attributes (i.e., combined regions of brightness). In this process, the total intensity of all haze regions, and the total area of all haze regions are calculated.

The haze region aggregation 140 is used once all the regions in the cornea that contain haze are detected, an algorithm is applied to aggregate haze regions that may be close enough to each other (based on a formula that measures the distance between neighboring hazes regions). The haze region aggregation output of this sub-module is a list of haze regions, which may or contain one or more haze regions.

The haze classifier 150 is used as each haze component in the list retrieved from the Haze Region Aggregation sub-module gets classified based on the value of the following attributes: Haze area; Percentage of haze in each region; Region to which the haze belongs; and Average intensity of haze.

Figure 5:
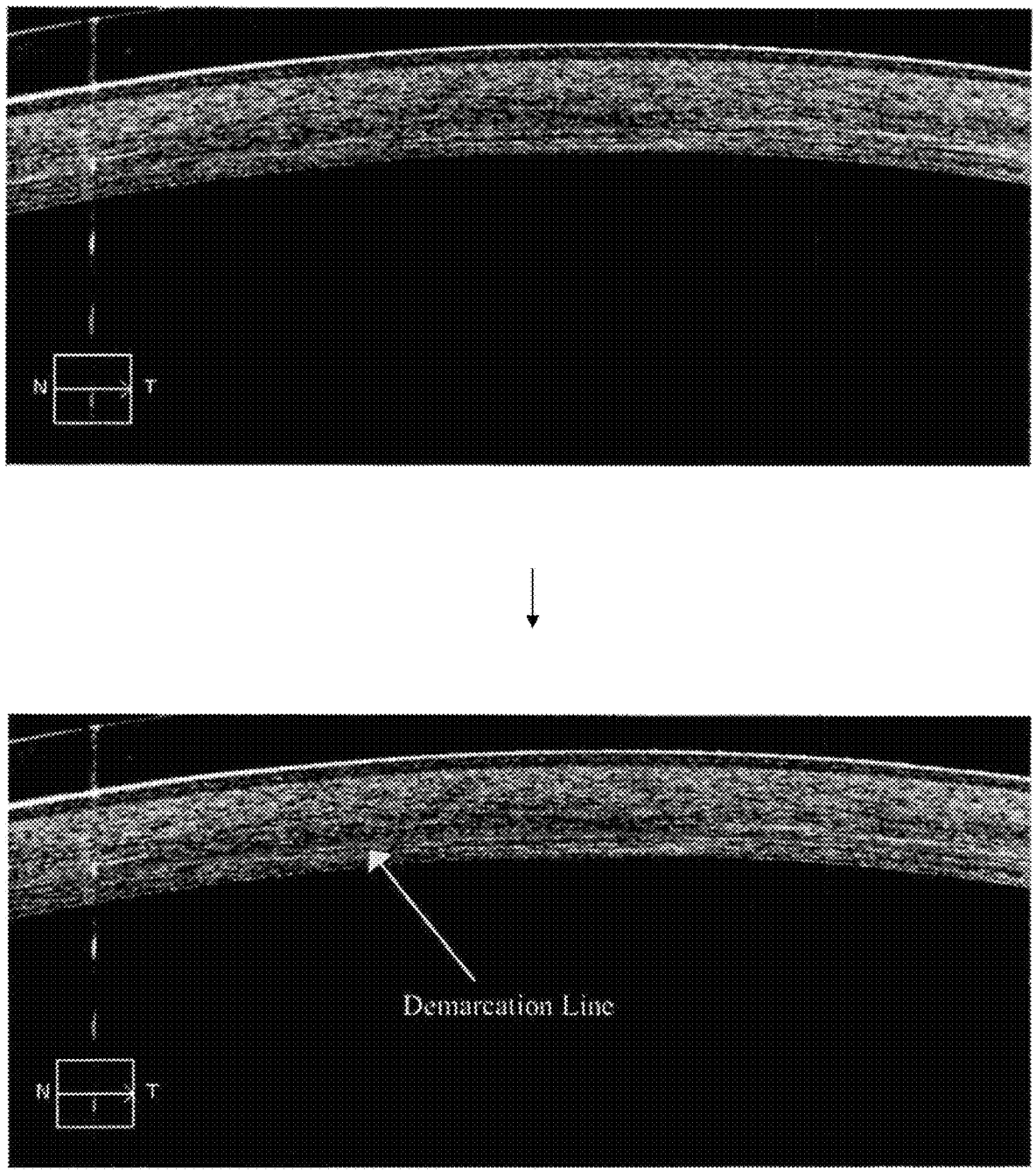
FIG. 5 is an OCT image showing the Detection of the Demarcation Line.

The demarcation line detector 160 is a sub-module that is applied to find the demarcation line (i.e., a bright line that follows the curvature of the cornea as shown in FIG. 5). Using a new algorithm described below, the demarcation line detector detects the location of the demarcation line in the cornea and returns its depth (i.e., how "far" is it from the epithelium).

With the information generated by the image processing module 170, the data extraction module 200 performs visual data and statistics generation comprising at least two sub-modules including a data visualizer 210 and a quantitative data generator 220.

The data visualizer 210 is used when the data given by the image processing module is used to provide visual representation of corneal haze regions. The data visualizer colors the haze in each region and it is color-coded and highlighted depending on its class. This data visualizer 210 offers visual interaction with the user via graphical user interface (GUI).

The quantitative data generator 220 is used when the raw data values given by the image processing module are compiled and converted into "useful" statistics, to help in clinical decision-making and monitoring of haze progress in the eye of the patient.

Figure 6A:
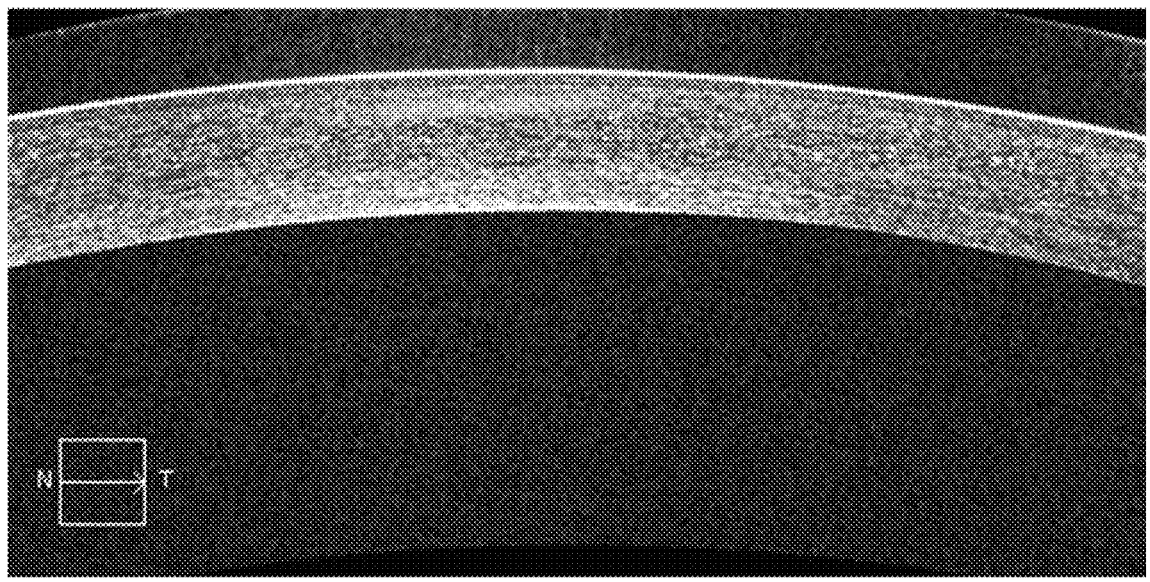
FIG. 6A is an Original OCT Image.
Figure 6B:
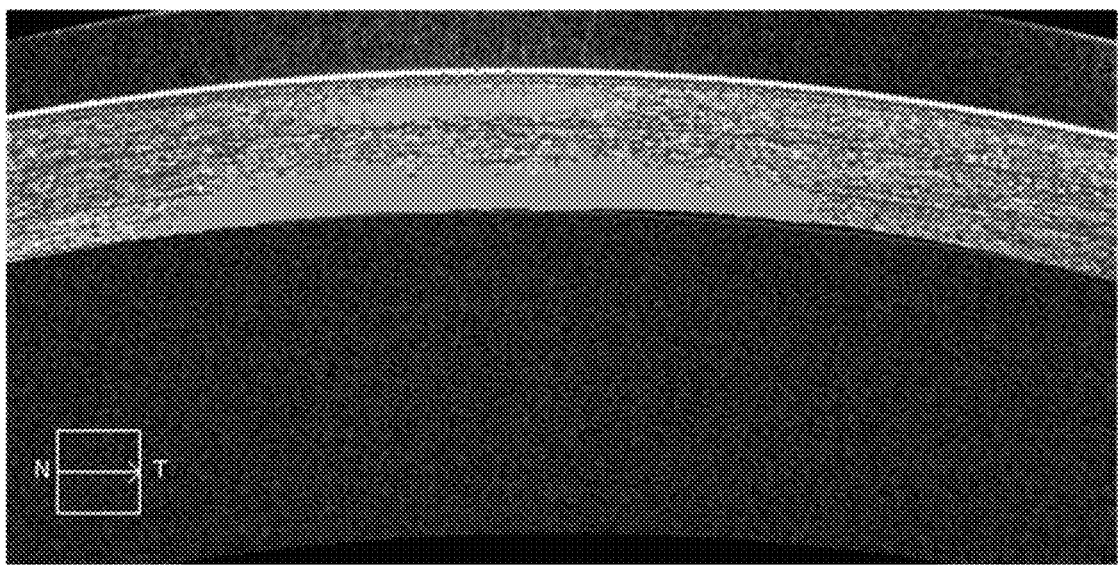
FIG. 6B is Output OCT Image.

To offer automated objective detection and classification of corneal haze, the System and Method for Automated Detection and Measurement of Corneal Haze includes image analysis technique(s) and makes use of methods from an image-processing library. The System and Method for Automated Detection and Measurement of Corneal Haze takes as input an optical coherence tomography (OCT) image of the anterior segment of the cornea (as shown in FIG. 6a), and provides two types of outputs: 1) the OCT image with visual annotations that reflect the detection and classification of the haze (as shown FIG. 6b) and 2) statistics about the haze. The data can be used for clinical applications, which can help improve diagnostics and treatment; it can also be used for collecting standardized data in longitudinal studies.

Figure 7A:
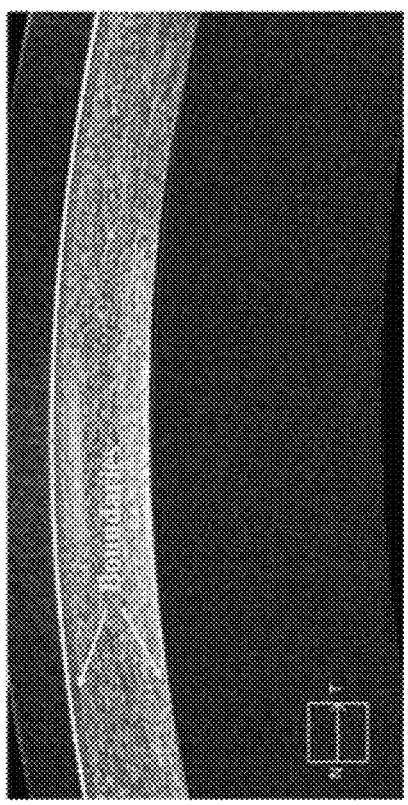
FIGS. 7a-7d are OCT images indicating the steps taken by the System and Method for Automated Detection and Measurement to detect and classify haze.
Figure 7B:
Figure 7C:
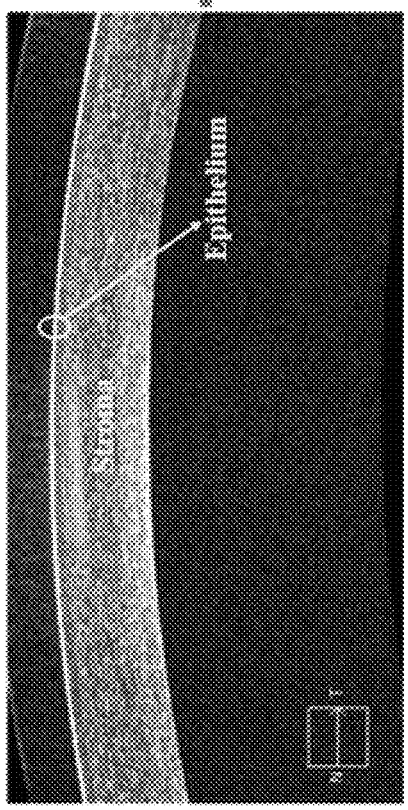
Figure 7D:
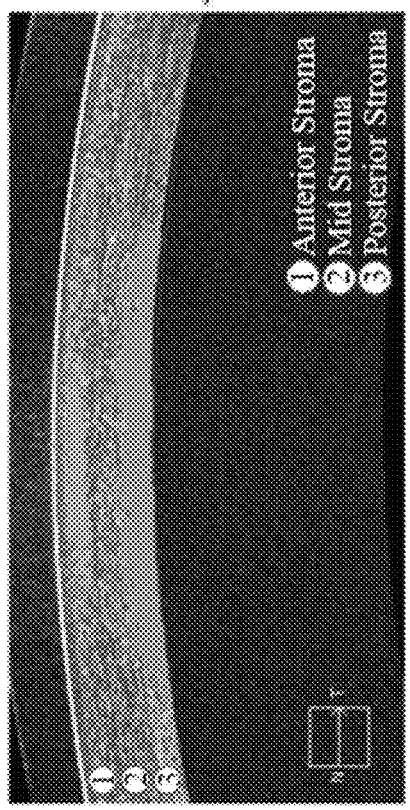

The detection and classification of corneal haze in an OCT image is achieved by the System and Method for Automated Detection and Measurement of Corneal Haze via the following steps: loading the OCT image into the program, as shown in FIG. 7a; detecting corneal boundaries (excluding the Epithelium's bright surface), as shown in FIG. 7b; computing corneal properties such as area(s), intensity, and average brightness; splitting the cornea into three regions: 1) Anterior Stroma; 2) Mid Stroma; 3) Posterior Stroma; detecting haze regions (contours), as shown in FIG. 7c; aggregating "close" haze regions; classifying haze into corresponding region(s), as shown in FIG. 7d.

The System and Method for Automated Detection and Measurement of Corneal Haze detects and computes the depth of the demarcation line when available (typically, it may appear in 3 to 6 months post-surgery images). Details about the steps applied by the new solution to detect and classify haze as well as detect and measure the demarcation line depth, are provided below.

TABLE 1

Relevant notations and Descriptions

| Notation | Description |
|---|---|
| $M$ | Matrix representing the OCT image with dimensions w × h |
| $\theta$ | Brightness parameter $\theta$ used in the Thresholding technique |
| $p_{i,j}$ | Pixel intensity value at position [i,j] in M |
| $c(x)$ | Function depicting the coordinates of given curve c (e.g., top(x), bottom(x), mid$_1$(x), mid$_2$(x), dem(x)) |
| $A_{cor}$ | Total area of the cornea |
| $A_{cor\text{-}H}$ | Total area of cornea without haze |
| $I_{cor}$ | Total corneal pixel intensity |
| $I_{cor\text{-}H}$ | Total pixel intensity of cornea without haze |
| $\overline{I}_{cor}$ | Average corneal pixel intensity |
| $T_{cor}$ | Thickness of the cornea |
| $r$ | Corneal region $r = \begin{cases} 1, & \text{Anterior Stroma} \\ 2, & \text{Mid Stroma} \\ 3, & \text{Posterior Stroma} \end{cases}$ |
| $e$ | Thickness of the Epithelium's bright surface |
| $C_r$ | The set of contours in corneal region r, such that $C_r =$ |
| $\mathcal{H}_r$ | The set of haze in corneal region r, $\mathcal{H}_r = \{\hbar_{r,1}, \hbar_{r,2}, \ldots, \hbar_{r,k}, \ldots, \hbar_{r,|Hr|}\}$ |
| $A(\hbar)$ | Area of haze $\hbar$ |
| $I(\hbar)$ | Pixel intensity of haze $\hbar$ |
| $\overline{I(\hbar)}$ | Average pixel intensity of haze $\hbar$ |
| $S(c)$ | Score of curve c (x) |
| $\mathfrak{X}$ | Outliers' demarcation line score threshold |
| $\gamma$ | Minimum demarcation line score |

Input Image

The input image is a 2D digital image extracted from the OCT scanner in jpeg format. Alternative formats for the image may be extracted, such as bmp, gif, tif, tiff, tga, and dds, bpg, and exif. In one embodiment, it has a width w of 540 pixels and height h of 270 pixels. In other embodiments, the digital image may have width w between 100 and 1000 pixels and a height h between about 100 and about 1000 pixels. The OCT scanner typically generates images of length l=4000 μm [ZEISS, Cirrus HD-OCT. User Manual Addendum—Anterior Segment Imaging]; thus, the pixel-to-μm conversion ratio can be obtained by l/w. Alternatively, the OCT scanner can generate images of lengths between about 100 μm and about 9000 The OCT image is modeled in the System and Method for Automated Detection and Measurement of Corneal Haze uses a matrix M with dimensions w×h. As shown in Eq. (1), the matrix consists of pixel intensity values; each pixel intensity value is denoted as $p_{i,j}$ (also referred to as [i,j]; example, M[1,4]=$p_{1,4}$), where i=0, ..., h−1 and j=0, ..., w−1. For a 8-bit grey-scale image, $0 \leq p_{i,j} \leq 255$. Other scaled images are available, including, but not limited to: 15-bit, 16-bit, 24-bit, 30-bit, 36-bit or 48-bit.

$$M = \begin{bmatrix} p_{0,0} & \cdots & p_{0,w-1} \\ \vdots & \ddots & \vdots \\ p_{h-1,0} & \cdots & p_{h-1,w-1} \end{bmatrix} \quad (1)$$

The image is seen by the program with a coordinate system that has the origin (0,0) at the upper left corner of the image.

Finding the Corneal Region

Finding the relevant corneal region in the image (i.e., where haze is detected) requires finding the coordinate vectors of the top and bottom boundaries. Once identified, the top boundary must be shifted down so that the epithelium's surface is not considered as part of the analyzed region (the epithelium typically has very bright surface that may greatly alter the average brightness calculated). Each of the boundary vectors is found using a different method.

Finding the Top Boundary

Figure 8:
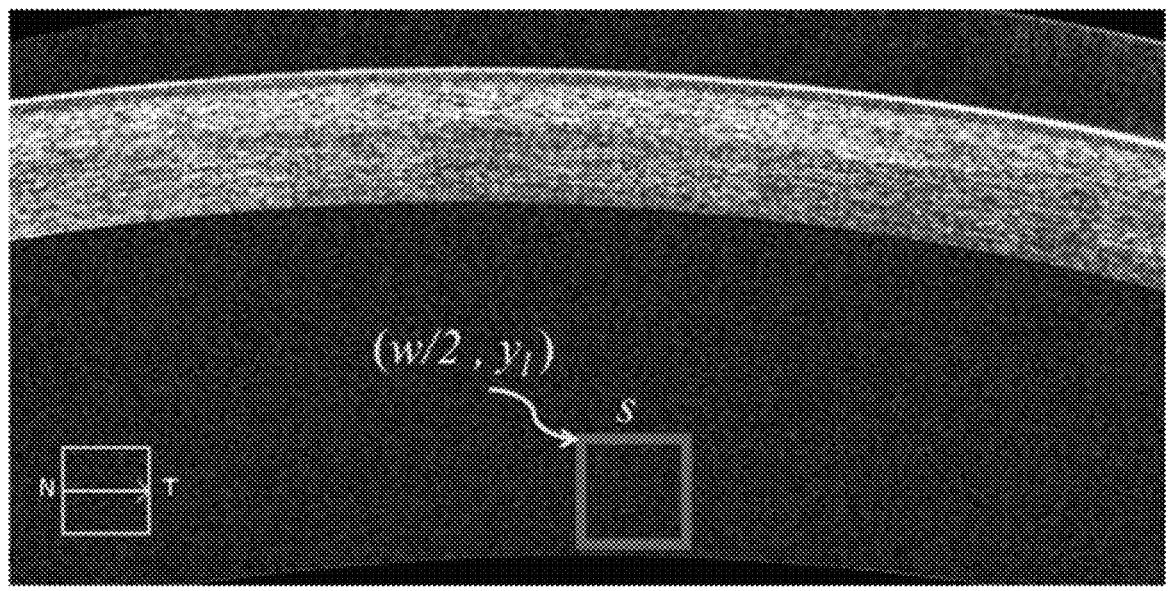
FIG. 8 is Region used for computing the Thresholding parameter θ.

To find the top boundary, the image is first processed using the Thresholding technique, which allows emphasizing the pixels in the corneal region as opposed to the remainder of the image (i.e., the black region—with the legend—outside the cornea as shown in FIG. 8). The Thresholding technique is based on a brightness parameter θ, such that pixels with values smaller than θ are referred to as background pixels, and those with values larger than θ are referred to as foreground pixels.

To emphasize corneal pixels, the brightness parameter θ is computed as the average brightness of the area below the cornea. This is done via sampling a collection of pixels (rather than a single a pixel, which may not produce accurate results) in that area with a square of side s (as shown in FIG. 8), and then computing their average pixel value.

Thus, the brightness parameter θ is computed as follows:

$$\theta = \frac{1}{s^2} \times \left( \sum_{x=w/2}^{\frac{w}{2}+s} \sum_{y=y_l}^{y_l+s} M[x, y] \right) \quad (2)$$

where $y_l$ is the y-coordinate value of the legend in the image. Applying Thresholding generates a binary version of the matrix, denoted $M_B$, by setting each pixel value $p'_{i,j}$ as follows:

$$p'_{i,j} = \begin{cases} 1, & p_{i,j} \geq \theta \\ 0, & \text{otherwise} \end{cases} \quad (3)$$

Figure 9:
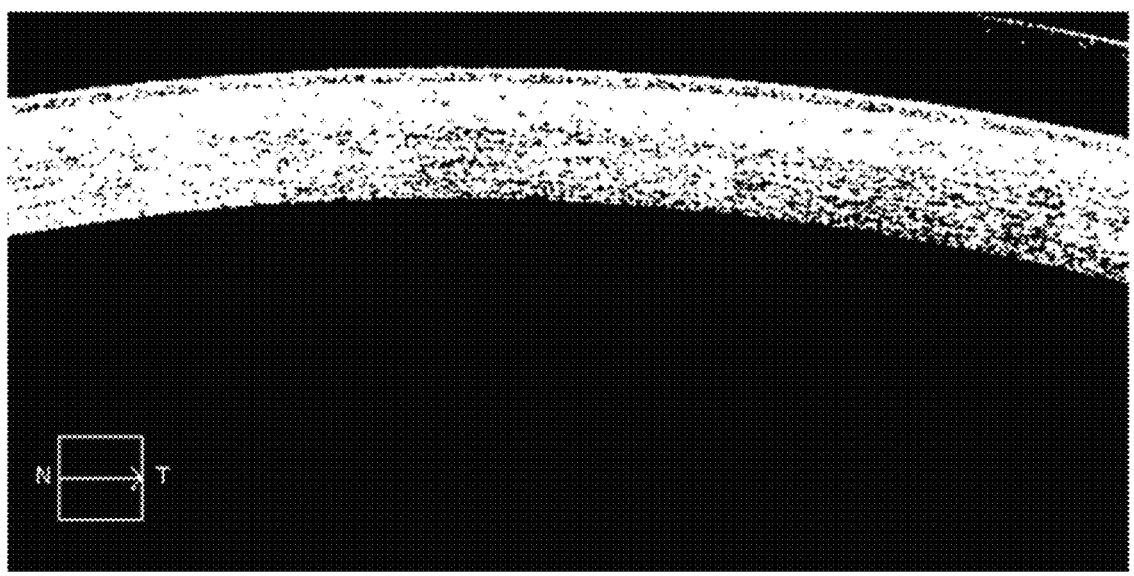
FIG. 9 is an OCT Image after applying the Thresholding technique.

The new matrix $M_B$ is illustrated in FIG. 9. In one embodiment, $M_B$ is used to find the top boundary, which is due to the fact that the upper section of the image has uniform intensity due to the high intensity of the Epithelium's bright surface, whereas the lowest section does not always have this uniformity; thus, it may not have a continuous curvature.

Figure 10:
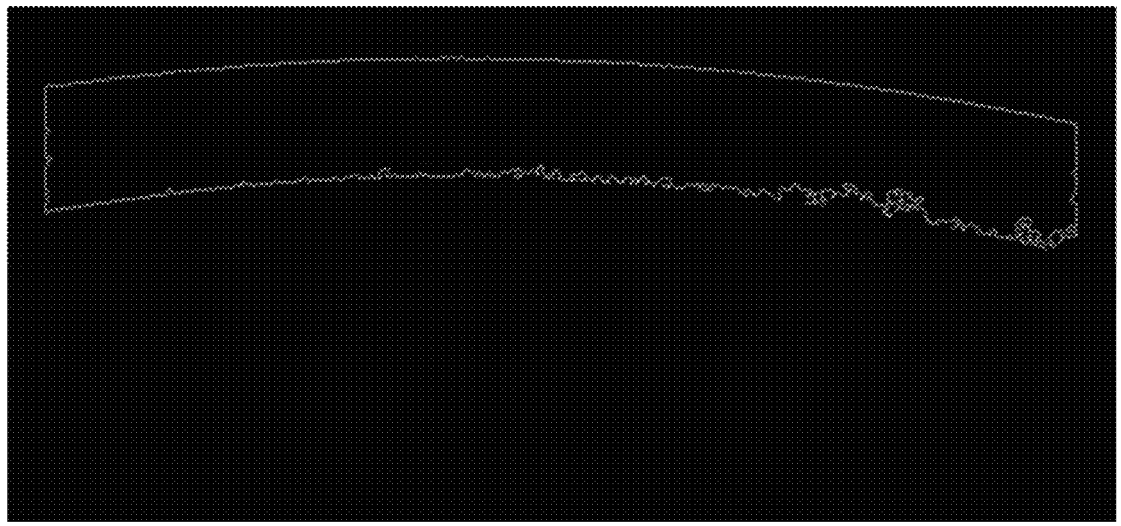
FIG. 10 is Image after applying the Contouring method.

The new image enables to extract the contours (i.e., borders) of the cornea; a contour is defined as the set of points that enclose a certain region. To achieve so, Suzuki's algorithm is applied implemented in OpenCV for obtaining external contours (i.e., a contour that is not encompassed within any other contour). However, the contouring function requires a "connected" pixel region (which is the corneal region) enclosed in another "connected" region (in the present case, it's the "black+legend" region). Since this is not the case for the image as shown in FIG. 9, the image black borders is augmented to the left and right of $M_B$ with arbitrary thickness. The border thickness can be of any value as long as the cornea can be seen as complete object. Using the contouring function provided by OpenCV, and after trimming out the smaller corneal contours (i.e., of size smaller than (w×h)/β; β=10 is set) such as the legend or any other contour appearing due to some distortion in the image (e.g., the small bright area in the top right of the image in FIG. 9), the image as shown in FIG. 10 is obtained.

Finally, after eliminating the extra thickness borders that was added, the top boundary vector top(x) is extracted by searching for the first pixel at the y-axis that has a non-zero value. The vector top(x) is in fact a function that for a given x-coordinate, it returns the y-coordinate falling on the top boundary.

The Epithelium's bright surface is not considered as corneal haze since it is nothing but a very bright region caused by a reflection from the OCT. Thus, to ignore this part of the cornea, every y-coordinate in the vector top(x) is increased by the thickness of the epithelium's surfacee, which is measured dynamically (typically, the average value of e is about 3 pixels≈22 μm).

Finding the Bottom Boundary

As aforementioned and illustrated in FIG. 10, since the bottom boundary does not have a "clear" curvature, applying the technique used for the top boundary to find it will not achieve the desired results. Thus, a different technique is applied using the original image matrix M to capture it. Based on the type of OCT images extracted, to find the bottom boundary, the following is assumed: the bottom boundary of the cornea has the same "curvature" as the top boundary (which is normally the case in almost all images); the change in pixel intensity (i.e., brightness) around the top and bottom boundaries (as seen in FIG. 9 for example) is the highest among all other regions.

Based on these two assumptions, a new technique performs the following steps: 1) For every pixel curve c(x) starting from top(x) downwards, compute the change in image intensity at a distance $y_d$ above and below c(x). The change in image intensity is computed as the ratio $\bar{I}_r$ of intensities above and below c(x), denoted $\bar{I}_a$ and $\bar{I}_b$ respectively, as follows:

$$\bar{I}_a = \sum_{x=0}^{w} \sum_{y=c(x)-y_d}^{c(x)-1} M[x, y] \quad (4)$$

$$\bar{I}_b = \sum_{x=0}^{w} \sum_{y=c(x)+1}^{c(x)+d} M[x, y]$$

$$\bar{I}_r = \frac{\bar{I}_a}{\bar{I}_b}$$

2) Find the minimum ratio $\bar{I}_r$ (thus, the curve with the highest pixel intensity value) and mark its y-position as $y_{shift}$.

3) The bottom boundary curve is thus represented by the following function:

$$\text{bottom}(x) = \text{top}(x) + y_{shift} \quad (5)$$

Corneal Properties

With the corneal region identified, salient corneal properties are calculated. More specifically, the area, thickness and brightness are three parameters that are important for the detection and classification of corneal haze, as well as for relevant statistical data needed in longitudinal studies.

Corneal Thickness

Corneal thickness is used to analyze corneal thinning over time. It is computed as follows:

$$T_{cor} = Y_{shift} - e \quad (6)$$

Corneal Area

The corneal area is computed by counting the number of pixels between the top and bottom boundaries as follows:

$$A_{cor} = \sum_{x=0}^{w} \sum_{y=top(x)}^{bottom(x)} 1 \qquad (7)$$

Corneal Intensity

Similar to the corneal area, the total corneal intensity and average corneal intensity are computed as follows:

$$I_{cor} = \sum_{x=0}^{w} \sum_{y=top(x)}^{bottom(x)} M[x,y] \qquad (8)$$

$$\overline{I_{cor}} = \frac{I_{cor}}{A_{cor}} \qquad (9)$$

Splitting Cornea into Three Regions

Figure 11:
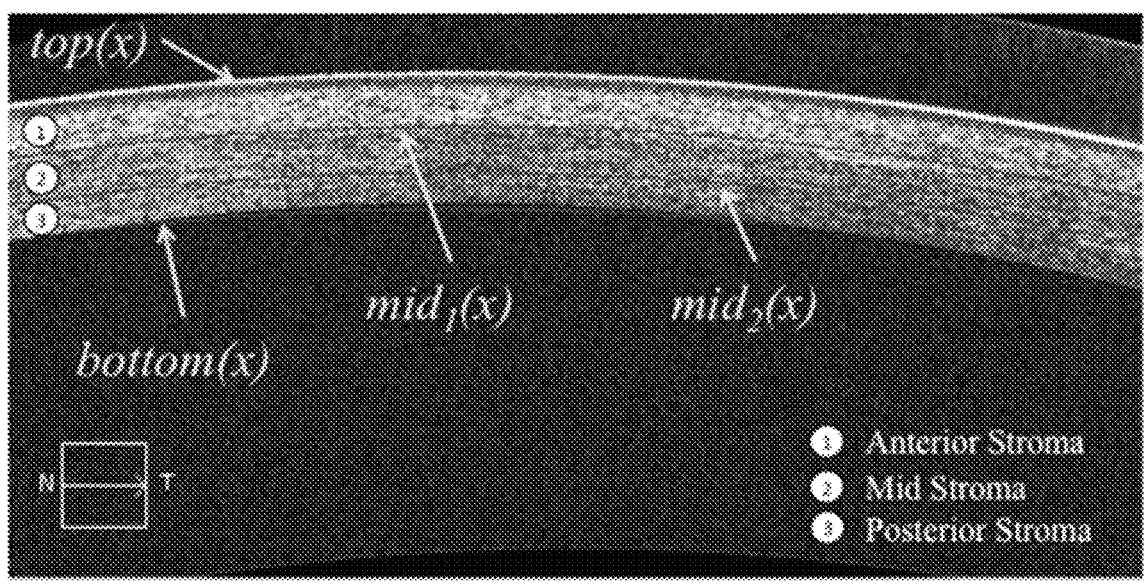
FIG. 11 is an OCT image showing the Cornea segmented into three regions.

The cornea comprises three "depth" regions in which haze may appear: 1) Anterior Stroma; 2) Mid Stroma; 3) Posterior Stroma. Identifying the corneal region, in which detected haze may exist, is key for classifying the identified haze, which may affect clinical decision-making. The foregoing Stroma regions are normally of equal size and follow the curvature of the top and bottom boundaries. By dividing the cornea into three equal regions ($T_{cor}/3$), the representative image is obtained and shown in FIG. 11. The two curves defining the forgoing regions are thus given using the following functions:

$$\text{mid}_1(x) = \text{top}(x) + T_{cor}/3 \qquad (10.1)$$

$$\text{mid}_2(x) = \text{top}(x) + 2*T_{cor}/3 \qquad (11.2)$$

Detecting Haze Regions

Haze appears in the cornea as dense regions of bright pixel intensity. To find these regions, the contouring technique is used for finding the top boundary. However, here, contouring is applied within the corneal region only. Thus, a new image matrix $M_C$ is created and consists of pixels $p''_{i,j}$ inside the cornea only; these are computed as follows:

$$p''_{i,j} = \begin{cases} p_{i,j}, & \text{top}(i) \leq j \leq \text{bottom}(i) \\ 0, & \text{otherwise} \end{cases} \qquad (12)$$

Figure 12:
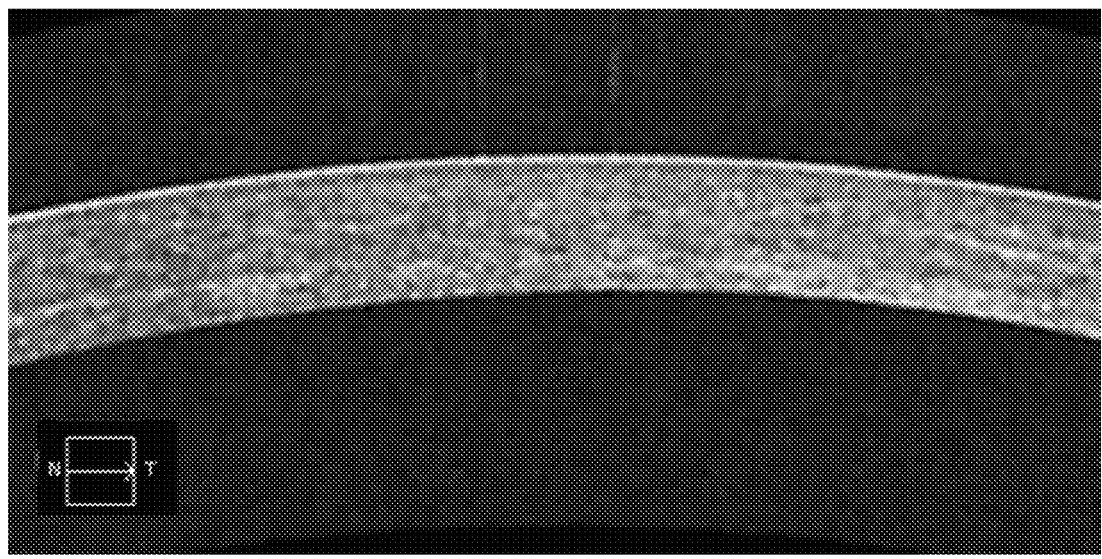
FIG. 12 is an OCT Image after representing MC after applying the Blurring method.

The new image created from $M_C$, is then blurred as shown in FIG. 12; that is each pixel's value is computed as the average value of pixels located in a 3×3 kernel around it. This is applied to obtain smoother boundaries for the haze (which facilitates detecting it), as well as for fading away any possible noisy fluctuations in high pixel intensity regions.

To extract regions of "brighter" pixel intensity, the Thresholding technique is applied and used to find the top corneal boundary. However since haze regions may vary in terms of pixel intensity, a dynamic threshold is computed and based on the Isodata algorithm. The latter takes the histogram H(i) of the image pixels' intensities as input and provides the threshold θ as output. Since the region(s) of interest have high intensity values, the histogram of the image is extracted such that it covers the region between the average intensity and the maximum intensity as follows:

$$H(i) = n_i, i = \overline{I_{cor}}, \overline{I_{cor}} + 1, \overline{I_{cor}} + 2, \ldots, 256 \qquad (13)$$

where $n_i$ is the number of corneal pixels with intensity value i.

The Isodata algorithm requires setting an initial threshold value $\theta_0$ and then computing the mean pixel intensity values below and above $\theta_0$ (i.e., background and foreground pixels, respectively). In the customized version of the Isodata algorithm, $\theta_0$ is computed as follows:

$$\theta_0 = \overline{I_{cor}} + \frac{256 - \overline{I_{cor}}}{2}, \qquad (14)$$

Subsequently, these parameters are used to obtain new values of $\theta_k = 1, 2, 3 \ldots$) until $\theta_k$ is converged into a "steady" value (i.e., until $\theta_k = \theta_{k-1}$). The algorithm then stops and the output threshold value θ is set to the last $\theta_k$ value. In the amended version of the Isodata algorithm, $\theta_k$ is computed, and the mean background and foreground pixels values ($m_{b,k-1}$ and $m_{f,k-1}$, respectively) as follows:

$$\theta_k = \frac{m_{b,k-1} + m_{f,k-1}}{2} \qquad (15)$$

$$m_{b,k} = \frac{1}{\Lambda_{b,k}} \sum_{i=\overline{I_{cor}}}^{\theta_{k-1}} i \times H(i) \quad m_{f,k}$$

$$= \frac{1}{\Lambda_{f,k}} \sum_{i=\theta_k+1}^{\overline{I_{cor}}} i \times H(i)$$

where, $\Lambda_{b,k} = \sum_{i=\overline{I_{cor}}}^{\theta_{k-1}} H(i)$, and $\Lambda_{f,k} = \sum_{i=\theta_k+1}^{\overline{I_{cor}}} H(i)$.

Figure 13:
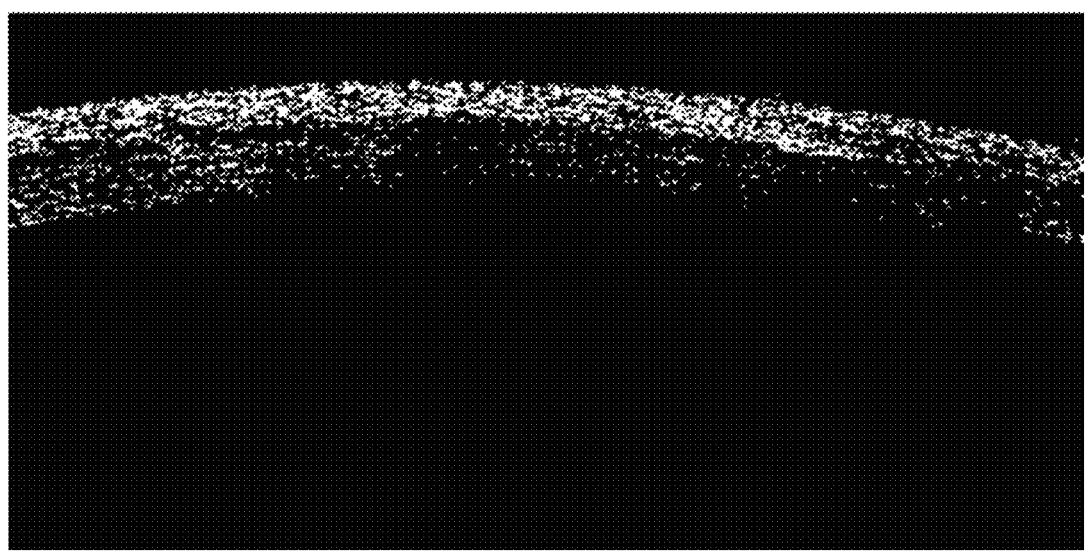
FIG. 13 is an OCT Image after representing MCB.

By applying Thresholding on $M_C$ as in Eq. (3), its binary version $M_{CB}$ is obtained as illustrated in FIG. 13.

Figure 14:
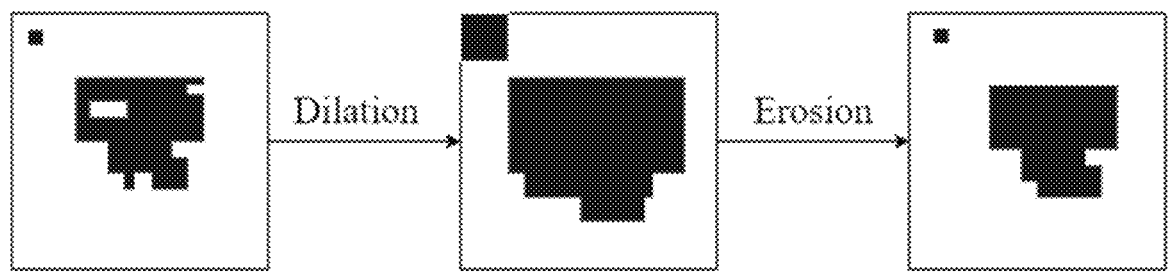
FIG. 14 is a schematic showing Morphology operators: Closing.

To eliminate noise and join distant pixels that belong to the same haze, morphology operators is employed. More specifically, the Closing and the Opening operators is applied, which employ the Erosion and Dilation techniques. Closing is when dilation is applied first, followed by erosion. In contrast, Opening is when Erosion is applied first, followed by Dilation. Erosion works by taking the minimum intensity pixel in a certain area around every pixel, and then replaces the pixel value with that minimum; this reduces bright areas. In contrast, Dilation does the opposite by taking the maximum intensity; therefore, it increases bright areas. As illustrated in FIG. 14, Closing smoothens object contours, joins narrow breaks, and fills holes smaller than the structuring element (an area of size 3×3 is selected).

Figure 15A:
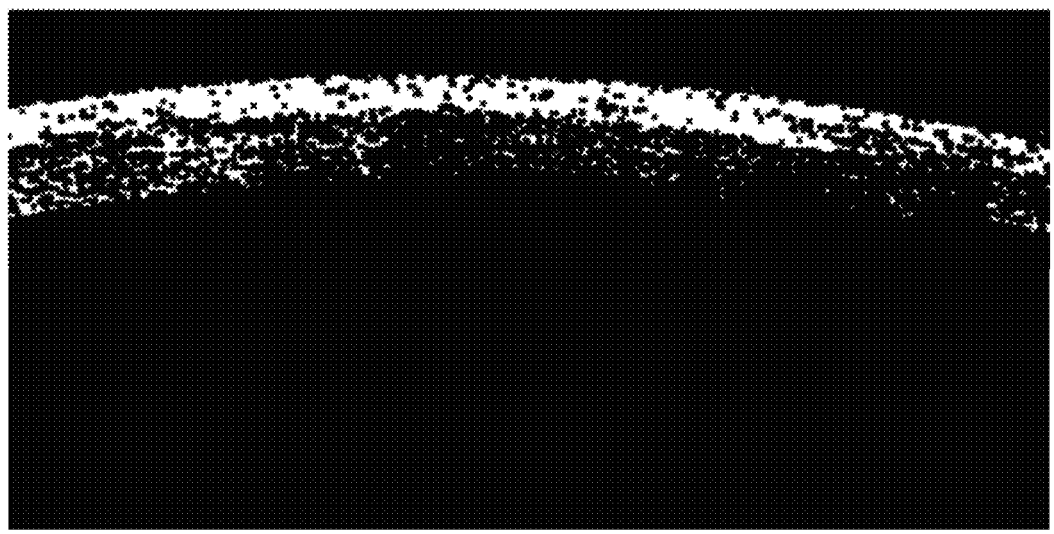
FIGS. 15a-15d are Sequence of images after applying Morphology operators, where
Figure 15B:
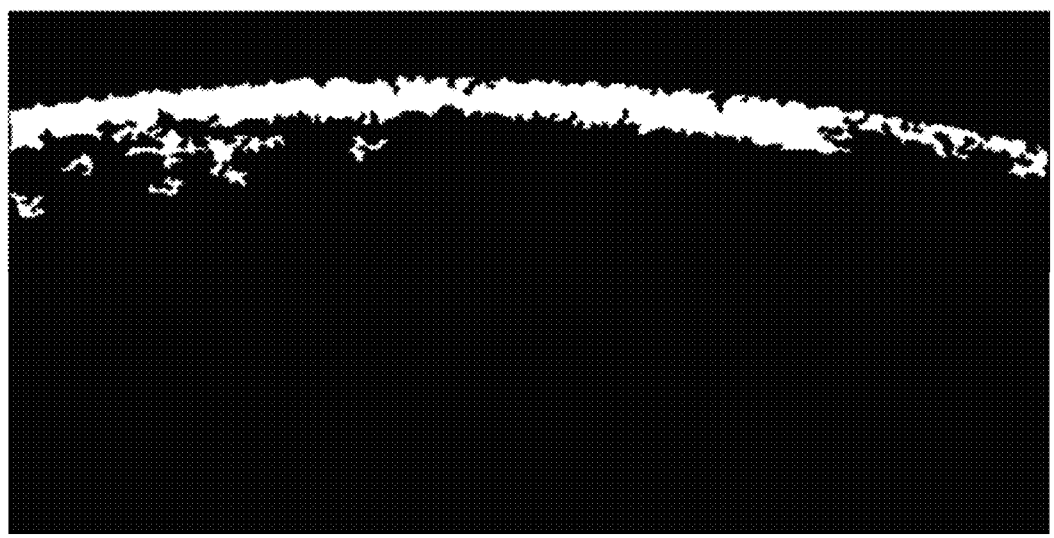
Figure 15C:
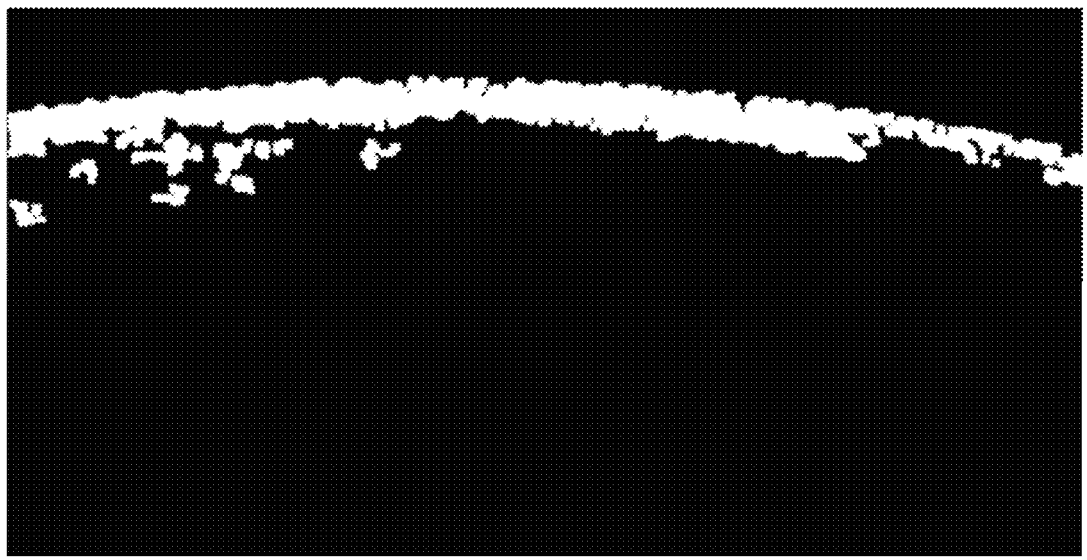
Figure 15D:
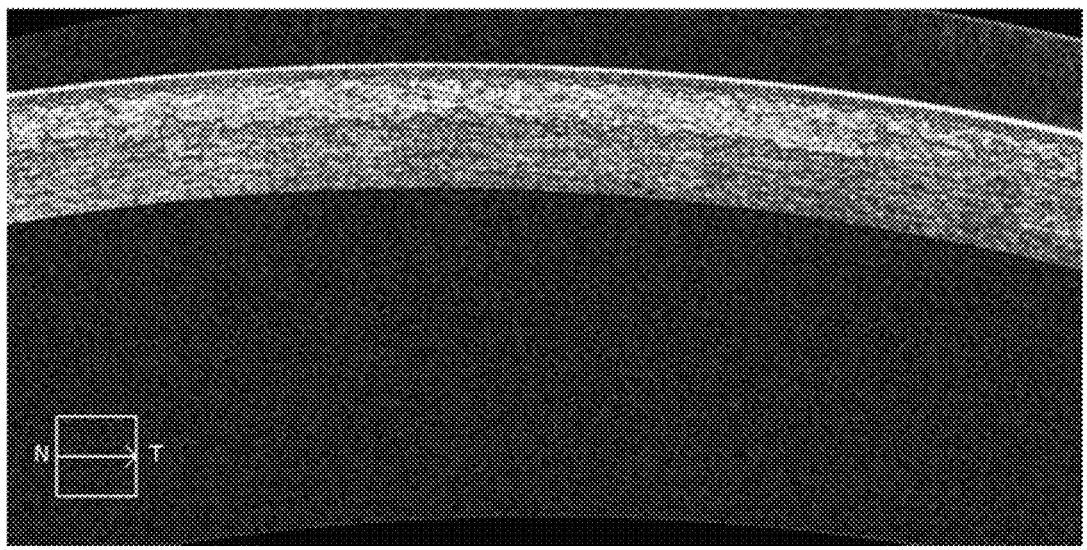

The sequence of morphology operators applied on $M_{CB}$ to detect haze are as follows: 1) Apply the Closing morphology. The result is shown in FIG. 15*a*. 2) Using Suzuki's algorithm, retrieve external contours and apply the Opening morphology. This breaks thin connections and smoothens object contours. The result is shown in FIG. 15*b*. 3) Apply dilation to expand the areas; this allows "close enough" areas to be connected. The result is shown FIG. 15*c*. 4) Finally, apply Contouring on the image to extract a set C representing all external contours that have an area greater than the half of the average area of all contours. This is done to ensure that only the contours that dominate the image are extracted. For example, if only small contours are available, then all contours are extracted, whereas if big contours along with some small contours exist, only the bigger ones are extracted and included in the set C. The set C thus represents the list of detected corneal haze regions as outlined in FIG. 15d.

Each contour c∈C may span across multiple corneal regions (i.e., across the anterior, mid and posterior Stroma regions). Moreover, two or more contours may belong to the same haze region if they are "close enough" to each other. Thus, contours must first be aggregated to form a single haze (where applicable), which then gets classified based on the area it belongs to the most (i.e., where the majority of its pixels is concentrated).

Haze Aggregation

Since the aggregation process must occur per corneal region, the aim is to construct a set $C_r$ per region r=1, 2, 3 such that, $c_r \in C_r$ if $c_r$ has its majority of its pixels in region r. Consequently, using $C_r$, the set of haze per region r is constructed, denoted $\mathcal{H}_r = \{\hbar_{r,1}, \hbar_{r,2}, \ldots, \hbar_r, |\mathcal{H}_r|\}$, such that a haze set $\hbar_{r,k} \in \mathcal{H}_r$ comprises one or more contours. The construction of $\mathcal{H}_r$ is performed via the following iterative algorithm:

1) For each region r, construct a binary matrix $X_r$ of dimensions $|C_r| \times |C_r|$, indicating if any two contours $c_{r,i}$ and $C_{r,j}$ in region r are to be combined (or not) as follows:

$$X_r[i,j] = X_r[j,i] = \begin{cases} 1, & d(c_{r,i}, c_{r,j}) \leq d_{max} \\ 0, & \text{otherwise} \end{cases} \quad (16)$$

Where $d(c_{r,i}, c_{r,j})$ is the (smallest) measured distance between contours $c_{r,i}$ and $c_{r,j}$; and $d_{max}$ is the maximum distance allowed between any two contours. Here, $X_r[i,i]=1$. Based on medical observation and verification, the default value of $d_{max}$ is set to 50 pixels. However, please note that the software provides the user with the option to adjust the value of $d_{max}$ dynamically to obtain more coarse-grained or fine-grained aggregation results.

2) Construct $C_r = \{c_{r,1}, c_{r,2}, \ldots, c_{r,i}, \ldots, c_{r,|C_r|}\}$

```
3) repeat the following until C_r = ∅:
    a. Initialize set ℏ_{r,k=1} = ∅
    b. ∀ c_{r,i} ∈ C_r do the following:
        i ∀ C_{r,j} ∈ C_r, such that X_r[i,j] = 1 and c_{r,j} ∉ ℏ_{r,k}
        ii. ℏ_{r,k} = ℏ_{r,k} ∪ {c_{r,j}}
        iii. C_r = C_r − {c_{r,j}}
        iv. repeat Steps 3.b.i/ii/iii for the added c_{r,j}
    c. Set ℋ_r = ℋ_r ∪ {ℏ_{r,k}}
    d. k = k +1
    e. goto Step 3.a
```

4) Construct the set of all haze regions $\mathcal{H} = \mathcal{H}_1 \cup \mathcal{H}_2 \cup \mathcal{H}_3$.

By applying the System and Method for Automated Detection and Measurement of Corneal Haze, the set of all haze $\mathcal{H}$ as well set of all haze in region r is obtained, denoted as $\mathcal{H}_r$. Thus, the total number of corneal haze as $|\mathcal{H}|$ can be obtained.

Haze Classification and Properties

Haze classification requires identifying in which corneal region the haze exists (which can be easily obtained based on the value of r for every $\hbar_{r,k} \in \mathcal{H}_r$), as well as collecting some salient haze properties such as the area of the haze in each region, the overall corneal haze intensity, and the percentage of haze brightness in comparison to the rest of the cornea.

To collect these properties, a function b(x, y, c) is used, which for a given pixel of coordinates (x, y) and a contour c, it returns whether the pixel belongs to this contour or not, as follows:

$$b(x, y, c) = \begin{cases} 1, & (x, y) \text{ inside } c \\ 0, & (x, y) \text{ on } c \\ -1, & \text{otherwise} \end{cases} \quad (17)$$

Using b(x, y, c), the area of haze $\hbar_{r,k}$ is computed in region r by counting the number of pixels as follows:

$$A(\hbar_{r,k}) = \sum_{x=0}^{w} \sum_{y=a}^{b} \begin{cases} 0, & b(x, y, c_{r,i}) = -1, \forall c_{r,i} \in \hbar_{r,k} \\ 1, & \text{otherwise} \end{cases} \quad (18)$$

where, $$a = \begin{cases} top(x), & r = 1 \\ mid_1(x), & r = 2 \\ mid_2(x) & r = 3 \end{cases} \quad b = \begin{cases} mid_1(x), & r = 1 \\ mid_2(x), & r = 2 \\ bottom(x) & r = 3 \end{cases}$$

Thus, the total area of haze $\hbar_k$ across all regions can be obtained as follows:

$$A(\hbar_k) = \sum_{r=1}^{3} A_r(\hbar_{r,k}) \quad (19)$$

Subsequently, the total and average pixel intensity of haze $\hbar_k$ can be computed as follows:

$$I(\hbar_k) = \sum_{x=0}^{w} \sum_{y=0}^{y} \begin{cases} 0, & b(x, y, c_i) = -1, \forall c_i \in \hbar_k \\ M[x, y], & \text{otherwise} \end{cases} \quad (20)$$

$$\overline{I(\hbar_k)} = \frac{I(\hbar_k)}{A(\hbar_k)}$$

To compare the pixel intensity (i.e., percentage of brightness) of the overall haze with the rest of the cornea, the total area of corneal haze $A(\mathcal{H})$ is computed, and the area of the cornea without haze $A_{cor-\mathcal{H}}$ as follows:

$$A(\mathcal{H}) = \sum_{x=0}^{w} \sum_{y=0}^{y} \begin{cases} 0, & b(x, y, c_i) = -1, \forall c_i \in C \\ 1, & \text{otherwise} \end{cases} \quad (21)$$

$$A_{cor-\mathcal{H}} = A_{cor} - A(\mathcal{H})$$

Similarly, the total haze pixel intensity is computed with and total corneal intensity without haze as follows:

$$I(\mathcal{H}) = \sum_{x=0}^{w} \sum_{y=0}^{h} \begin{cases} 0, & b(x, y, c_i) = -1, \forall c_i \in C \\ M[x, y], & \text{otherwise} \end{cases} \quad (22)$$

$$I_{cor-\mathcal{H}} = I_{cor} - I(\mathcal{H})$$

Finally, the percentage of brightness of a haze $\hbar_k$ to the rest of the cornea with and without haze are obtained by $$\frac{I(\hbar_k)}{I_{cor}} \times 100, \text{ and } \frac{I(\hbar_k)}{I_{cor-\}f} / A_{cor-\}f} \times 100,$$

respectively.

Demarcation Line

The demarcation does not normally appear in corneal hazy images. However, when it does, it indicates that the eye is healing as expected. Thus, automatically detecting it (when available) and measuring its corneal depth has important clinical indications.

Figure 16A:
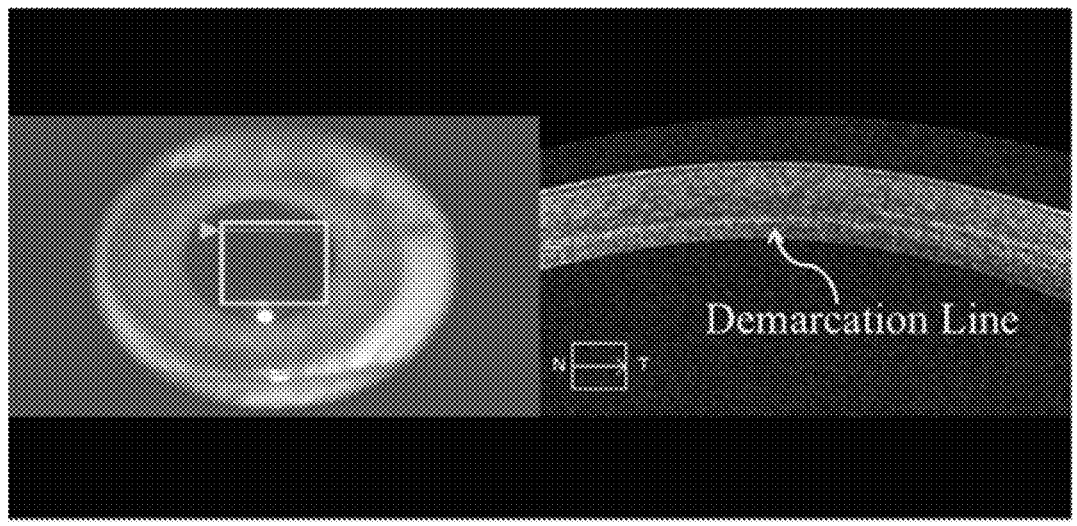
FIG. 16A is an OCT Image showing an instance (i.e., OCT image of Cut 13) of the video taken using the OCT scanner, where the image to the left one shows the location and the cut number the image to the right shows the transversal version of the cut.

Using the OCT scanner, multiple OCT images are typically captured by the experience operator for the same eye (in the same period) in the form of a video of 128 cuts as illustrated in FIG. 16A. For analyzing corneal haze, only the middle cut (i.e., cut 64) is needed to detect and classify haze, since it does not vary across cuts. However, detecting and measuring the depth of the demarcation line requires the cut in which the demarcation line appears the "clearest". To achieve so, each given video is split into 128 images and apply a scoring scheme on each image. Here, a demarcation line is considered a candidate if it consistently appears across multiple cuts (e.g., in at least 15% of the cuts). To account for the fact that the demarcation line may not typically exist at the same depth across different cuts, a demarcation line is considered as being the same one across cuts if it appears at a fluctuating depth of a certain range, which is obtained statistically from the available images. Consequently, the candidate lines that satisfy the property of continuation are left as candidate demarcation lines, and the one that, after running the algorithm, gets the highest score, is picked as suggested demarcation line; subsequently, its corresponding cut is taken as the best cut.

Figure 16B:
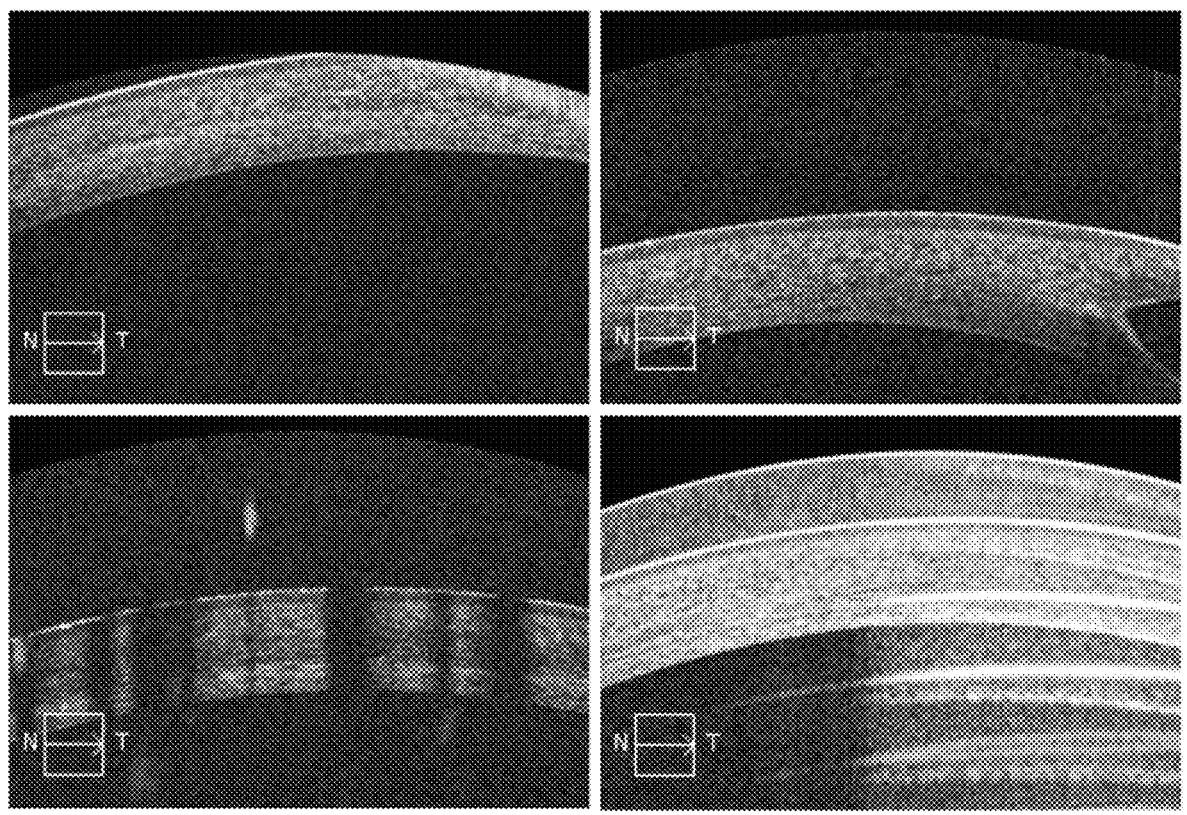
FIG. 16B are OCT images showing four examples of damaged cuts occurring in OCT images.

As shown in FIG. 16B, an instance (i.e., OCT image of Cut 13) of the video taken using the OCT scanner. The image to the left one shows the location and the cut number the image to the right shows the transversal version of the cut.

In summary, the detection and measurement of demarcation line in OCT image is achieved by the software via the following steps:

1. Loading the OCT video into the software and dividing into 128 image cuts;
2. Filtering out invalid cuts
3. Detecting the boundaries of the cornea
4. Dynamically detecting and measuring the thickness of the Epithelium
5. Computing a score for every candidate line across all valid cuts
6. Determining the lines that should be taken as candidate demarcation line(s)
7. Selecting the top two candidate lines
8. Reporting the line with the highest score as "suggested" and second best as "candidate"

Details about the steps applied by the solution to detect and classify haze as well as detect and measure the demarcation line depth, are provided in the following sub-sections.

Elimination of Invalid Cuts

As illustrated in FIG. 16B, some OCT images/videos may have (out of the 128 cuts) some damaged or scrambled cuts. However, this should not disqualify the whole video, since other cuts of the same video may be valid. Nevertheless, damaged cuts must be filtered out; otherwise, they would falsify the output of the software. To address this problem, Machine Learning is applied to classify each cut in an OCT image as valid or invalid for demarcation line detection. Machine Learning is further detailed below.

Those of ordinary skill in the pertinent arts will recognize that any type or form of machine learning system (e.g., hardware and/or software components or modules) may be utilized in accordance with the present disclosure. For example, Machine Learning is applied to classify each cut in an OCT image according to one or more machine learning algorithms or techniques, including but not limited to: a support vector machine; or a topic model analysis, nearest neighbor analysis, artificial neural networks, conditional random fields, factorization methods or techniques, K-means clustering analyses or techniques, similarity measures such as log likelihood similarities or cosine similarities, latent Dirichlet allocations or other topic models, or latent semantic analyses. Using any of the foregoing algorithms or techniques, or any other algorithms or techniques, a classification of the OCT image may be determined.

Data Preparation

Our data is composed of 8,064 cuts taken from 63 OCT images. Each cut is represented by 36,450 features such that each cut is of size 270×135 pixels, and where each pixel is depicted by its RGB value. Note that the width and height of each image have been reduced to half so as the machine training time is reduced, as this may take weeks to finish.

Each cut is annotated by class "0" as invalid, and class "1" as valid. This annotation was done manually and carefully in order to produce accurate learning. Note that with the data, 14.7% of the instances were classified as invalid.

Feature Selection and Data Compression

In one embodiment, OpenCV is used to extract raw features from the images. Due to the large feature space (36,450 features per instance), feature reduction is employed to guarantee good generalization of the learnt models and reduce training time. To achieve the latter, the Principal Component Analysis (PCA) method [Dunteman, G. H. 1989. Principal components analysis. Sage] is employed. PCA is one of the most commonly used methods for dimensionality reduction in machine learning. The number of features is reduced by combining them; that is, the high-dimensional data is projected into a low dimensional space without impairing the variance in the data. PCA requires defining a set of principal components as follows: the $1^{st}$ component $e_1$ represents the direction of the greatest variance in the data, and the $2^{nd}$ component $e_2$ represents the second greatest direction of the variance, perpendicular to $e_1$, and so on until generating d principal components (where d is defined based on the analyzed data). The first m principal components become the new m dimensions, such that m is picked based on the required variance.

To perform PCA, the dataset is split into two subsets: a training set consisting of 80% of the images and a test set consisting of the remaining 20% of images. PCA is then applied on the training or validation set only and the first m eigen vectors that preserve 95% of the data variance are retrieved. Since PCA is cubic in the number of original dimensions, it did not scale well. To address this problem, feature selection is first performed by using the Information Gain (InfoGain) criteria for ranking the features with respect to the accuracy of the different prediction tasks. For each feature $x_i$, its gain value $IG(x_i)$ is computed using decision trees as follows:

$$IG(x_i) = E(t) - \sum_{j=1}^{m_i} \frac{N_j}{N} E(v_j) \qquad (23)$$

where, E(t) and E($v_j$) are the entropy at nodes t and $v_j$, respectively; $N_j$ and N are the number of instances at nodes t and $v_j$, respectively.

The goal is to maximize the info gain; equivalent to minimizing the average impurity, also known as entropy, defined as follows:

$$E(t) = -\sum_{k=1}^{K} p(k|t)\log_2 p(k|t) \qquad (24)$$

where, p(k|t) is the fraction of instances that belong to class k at node t.

That is, after applying InfoGain, the list of features is ranked according to their influence on the prediction accuracy [Kent, John T. "Information gain and a general measure of correlation." Biometrika 70.1 (1983): 163-173].

Due to the large dataset size, it was not possible to test on different cut-off points. However, the top ⅕ of the features (i.e., 8,192 features per instance) as ranked by InfoGain, performs well when later combined with PCA. Therefore, the top $5^{th}$ is used as the cut-off.

Hence, these 8,192 features are used to represent an image instead of the original 36,450 features.

Once each image is represented using these features, PCA is applied to further dimensionality reduction, ending up with 172 features to represent each image. Note that both the feature selection and PCA in this case were also applied on the training set only. The learnt 172 Eigen vectors along with InfoGain ranking resulting from applying this two subsequent steps are then used to transform each test image into the new 172-dimensional space.

Bias-Variance Analysis

To improve data fitting and train highly accurate models, it is necessary to understand the different sources of error leading to bias and variance [Fortmann-Roe, Scott. "Understanding the bias-variance tradeoff" (2012)].

The class denoted that is trying to be predicted as y and the features as vector X. There is a function $f$ is assumed such that y=$f$(X). Hence, the goal is to estimate a model $\hat{f}(X)$ that emulates $f$(X). For a feature vector X, the expected out-of-sample squared prediction error is:

$$\text{Err}(X) = E[(y - \hat{f}(X))^2] \qquad (25)$$

This error is also decomposed into bias and variance terms:

$$\text{Err}(X) = (E[\hat{f}(X)] - f(X))^2 + E[\hat{f}(X) - E[\hat{f}(x)]]^2 \qquad (26)$$

$$\text{Err}(X) = \text{bias}^2 + \text{variance} \qquad (27)$$

Our purpose is to reduce both the bias and the variance. The error due to bias is taken as the difference between the expected (or average) prediction of the model and the correct value that is to be predicted; whereas the error due to variance is taken as the variability of model prediction for a given data point. The variance is how much the predictions for a given point vary among different realizations of the model.

Figure 16C:
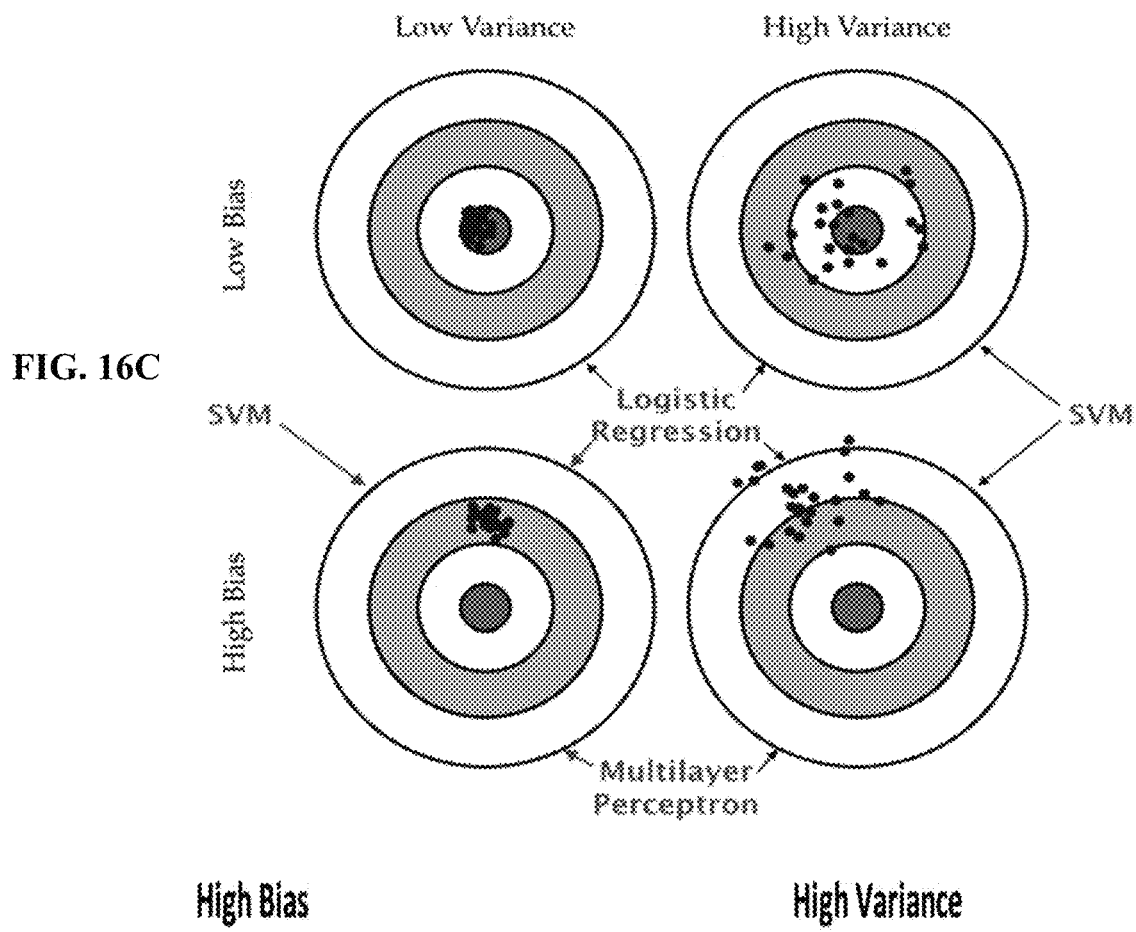
FIG. 16C is a flow diagram illustrating a bias and variance and the corresponding models.

In order to identify whether the data suffers from high bias or high variance (as shown in FIG. 16C), which affects the model employed for the training phase, the learning curve is plotted. In order to do so, samples of the original dataset are created: 10%, 20%, . . . 90% and 100% of the training data. Then, a learning model is selected, say linear regression or logistic regression, and train it. Consequently, the error on the validation dataset is measured. The curve of $E_{in}$ is plotted, the measured error in the training data, and of $E_{val}$, the measured error when using the validation data, evaluated as the number of misclassified instances, with respect to the different dataset sizes.

Figure 16D:
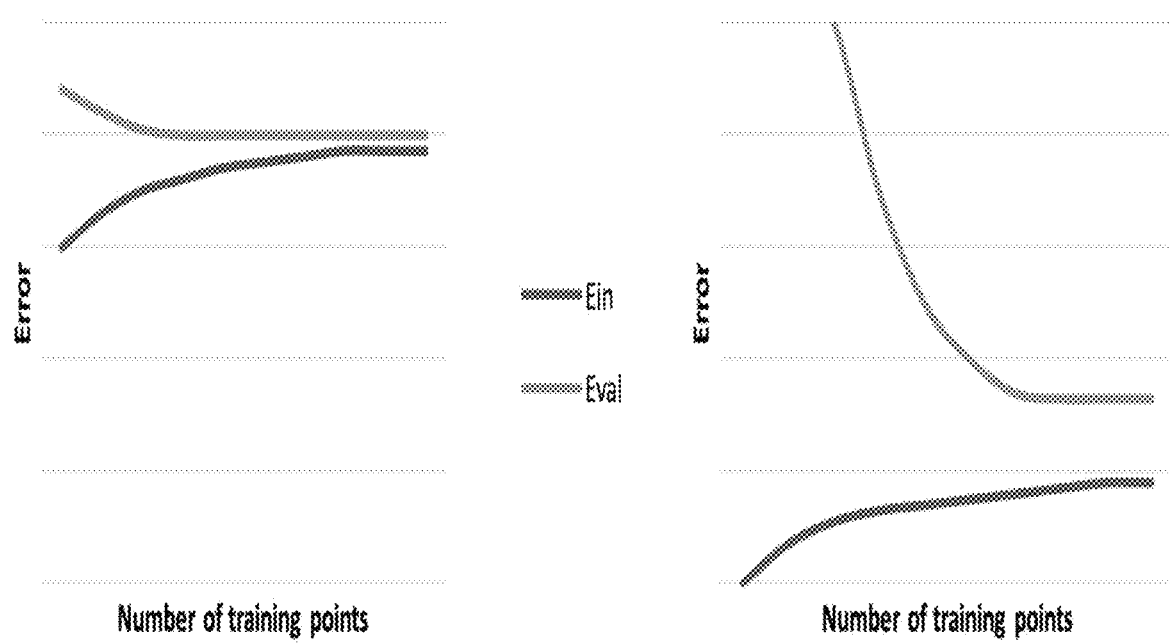
FIG. 16D is a graph showing the Learning curves of high bias and high variance datasets.

As illustrated shown FIG. 16D, the learning curve of high bias data is categorized by a small gap between $E_{in}$ and $E_{val}$, and high values for both $E_{in}$ and $E_{val}$, whereas the learning curve of high variance data is categorized by a constant decrease of $E_{val}$, and a value of $E_{in}$ that is much lower than $E_{val}$.

Figure 16E:
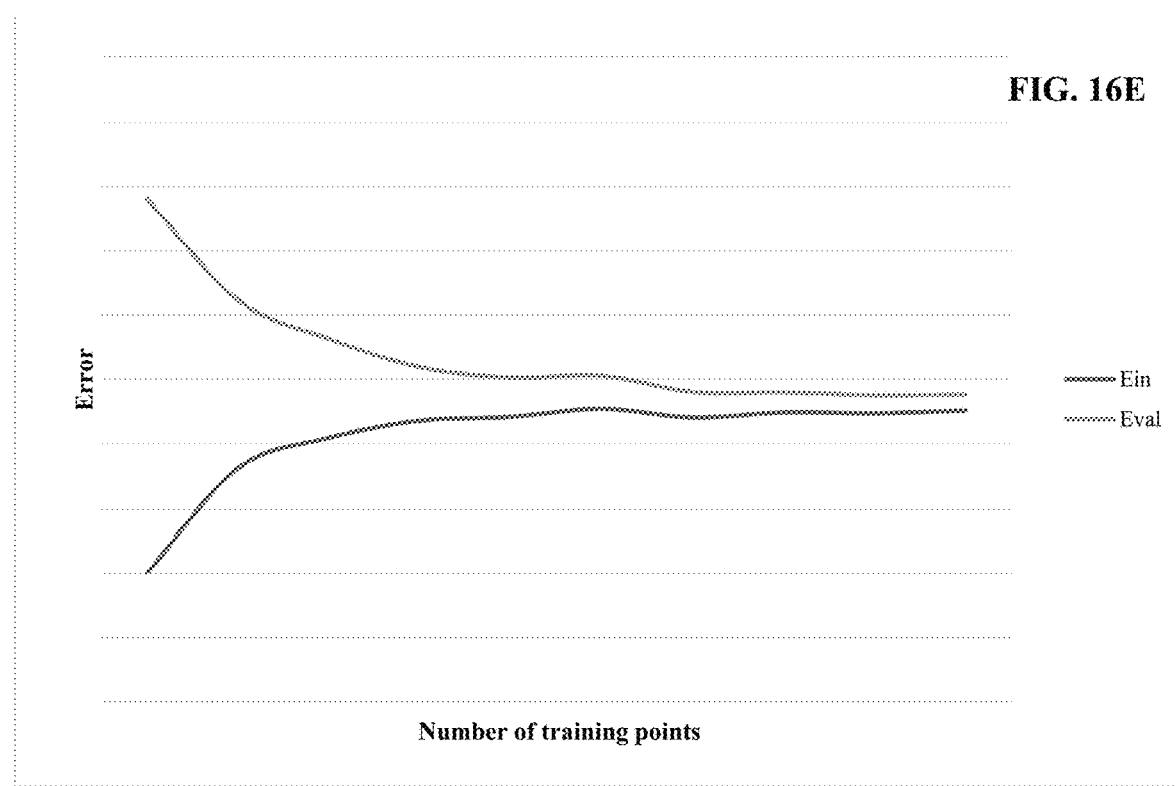
FIG. 16E is a graph of the learning curve of the training data of OCT images using logistic regression.

Since validation sets are no longer used as standard procedure in the literature, they are not considered. Instead, a 10-folds cross validation is used [Picard, Richard R., and R. Dennis Cook. "Cross-validation of regression models." Journal of the American Statistical Association 79.387 (1984): 575-583]. As seen in FIG. 16E, the data suffers from high bias; thus, logistic regression, SVM and multilayer perceptron are valid models that can provide accurate classification.

EXPERIMENTS

The experiments were performed on the training data only, using the machine learning library Weka [Frank et al. "Weka." Data Mining and Knowledge Discovery Handbook. Springer US, 2005. 1305-1314]. Applying the 10-folds cross validation technique, the hyperparameters of each of the considered models are tuned. As for the model evaluation, and since the goal is to classify a cut on whether it is a valid cut or an invalid cut, accuracy and f-measure can be computed using the following formulas:

$$\text{Accuracy} = \frac{TP + TN}{TP + FP + FN + TN} \qquad (28)$$

$$\text{Precision} = \frac{TP}{TP + FP}$$

$$\text{Recall} = \frac{TP}{TP + FN}$$

$$F\text{-measure} = \frac{2 \times \text{Precision} \times \text{Recall}}{\text{Precision} + \text{Recall}}$$

where, if considering a valid cut to be positive, and a damaged cut to be negative:

TP is the number of true positive instances, i.e. the number of cuts that are annotated as valid and the model classified them as valid.

FP is the number of false positive instances, i.e. the number of cuts that are annotated as damaged and the model classified them as valid.

FN is the number of false negative instances, i.e. the number of cuts that are annotated as valid and the model classified them as damaged.

TN is the number of true negative instances, i.e. the number of cuts that are annotated as damaged and the model classified them as damaged.

Our interest is in minimizing the number of damaged cuts classified as valid cuts, rather than to minimize the number of incorrectly classified instances. In other words, fewer valid cuts will not affect the overall results of an OCT image, whereas one damaged cut would detect imprecise demarcation line(s), and thus provide wrong output. Consequently, the goal is to minimize the number of false positive instances. Thus, the models are evaluated by the largest precision value.

In the following, the models described are examined for the problem of classification of valid and invalid cuts in OCT images.

Logistic Regression

Logistic regression takes as input the feature vector X and provides as output a value y [Hosmer Jr, David W., Stanley Lemeshow, and Rodney X. Sturdivant. *Applied logistic regression*. Vol. 398. John Wiley & Sons, 2013]. The key characteristic of this model is that the output value is binary: 0 or 1. Input values are combined using weights β, also called coefficient values, in a linear manner. The coefficients of the logistic regression model are estimated using the training data. This is done using the maximum-likelihood estimation. Therefore, the best coefficients of the logistic regression model result in a model that would predict a value extremely close to 1 for the positive class and a value extremely close to 0 for the negative class.

The Logistic Regression model is considered to be a simple supervised learning model; this model is exploited for the learning curve plotting due to its simple binary classification nature that will be exploited in the model estimation as well.

Support Vector Machines

Support Vector Machine (SVM) model is a supervised machine learning algorithm that can be used for both classification and regression problems (it is mainly used in classification) Scholkopf, Bernhard, and Alexander J. Smola. *Learning with kernels: support rector machines, regularization, optimization, and beyond*. MIT press, 2001. In this model, each instance is plotted in a n-dimensional space, such that n is the number of features per instance. Afterwards, the classification is performed by finding lines or hyperplanes that segregate the different classes by drawing the best frontier. Sequential minimal optimization (SMO) is an algorithm for solving the quadratic programming problem that arises during the training of support vector machines [Platt, J. 1998. Sequential minimal optimization: A fast algorithm for training support vector machines. Technical report, Microsoft Research]. It is applied by the Weka machine learning library instead of SVM. Using some heuristics, SMO partitions the training problem into smaller problems that can be solved analytically. Advantageously, it can significantly decrease the training time.

The SVM model is mostly used for binary classification. The bias-variance analysis of this model shows that, based on the tuning of the hyperparameters of the model, it can be used for both high variance, high bias, or high bias and high variance datasets [Scholkopf et al.].

Multilayer Perceptron

The Multilayer Perceptron model, also known as the feedforward artificial neural network, is a supervised learning algorithm [Demuth, Howard B., et al. Neural network design. Martin Hagan, 2014]. Given an input composed of a set of features of size n, it can learn a non-linear function and then provides an output of m dimensions. This model works for both regression and classification. The difference between Logistic Regression and Multilayer Perceptron is that the latter can employ multiple non-linear function layers between the input layer and the output layer.

The major cure for high bias data is the use of non-linear model for the learning of classification. Hence, Multilayer Perceptron can be used in the case where the learning curve of the training dataset presents the typical characteristics of high bias data [Pal, Sankar K., and Sushmita Mitra. "Multilayer perceptron, fuzzy sets, and classification." IEEE Transactions on neural networks 3.5 (1992): 683-697].

Chosen Model and Results

Table 1 summarizes the best performance of each chosen model. As observed, all the models are able to attain good performance after several rounds of tuning the hyperparameters. However, since the objective is to minimize the number of false positives, the SVM model is adopted, as it was able to provide only 14 false positives (FP) among all cuts of all images.

TABLE 1

Measurements of the best performances of the selected models

| | Accuracy | F-Measure | Precision |
|---|---|---|---|
| Logistic Regression | 0.8620 | 0.9236 | 0.9835 |
| Support Vector Machines | 0.8628 | 0.9250 | 0.9974 |
| Multilayer Perceptron | 0.8504 | 0.9151 | 0.9508 |

Table 3 shows the SVM model (i.e., its hyperparameters) chosen to show best testing results. As noticed, only 3 FP were achieved among all cuts, which is considered to be excellent, since the impact of these on determining the consistency of the demarcation line would be negligible.

TABLE 3

Results and hyperparameters of the Support Vector Machine model on testing data

| | False Positives | Accuracy | F-Measure | Precision |
|---|---|---|---|---|
| C: 1 | 3 | 0.8828 | 0.9366 | 0.9978 |
| Kernel: Polynomial | | | | |
| Degree: 1 | | | | |
| Epsilon: 1.00E−10 | | | | |
| Tolerance: 0.01 | | | | |

Subsequently, the model is saved and is embedded in the software as part of the OCT image filtering process, which ensures that only valid cuts are used for analysis.

Corneal Boundaries and Epithelium Thickness

To detect the demarcation line in the OCT image (see FIG. 16A) and measure its depth, the following two assumptions are made: 1) The demarcation line has the same "curvature" as the top boundary (which is normally the case in almost all images, especially for 4 mm-wide cross sections of the cornea). 2) The total intensity value and continuity of bright pixels of the demarcation line (except the Epithelium's bright surface) is the highest among all other regions.

As before, the first assumption implies the pixel vector of the demarcation line can be found by shifting top(x) down, such that the appropriate position is found based on the second assumption. This approach is valid since the demarcation line comprises a dense curve of high-intensity pixels with few pixels in thickness (unlike haze, which is usually thicker and does not necessarily span the width of the cornea).

The proposed mechanism applies a formula that computes a "score" (based on the intensity value and continuity of bright pixels) for every curve starting from the top boundary downwards; and then based on a well-defined criterion, a set of "candidate" demarcation lines is detected. Subsequently, the "best" candidate is selected/suggested (i.e., the curve with the highest score) to be the actual demarcation line.

Figure 17:
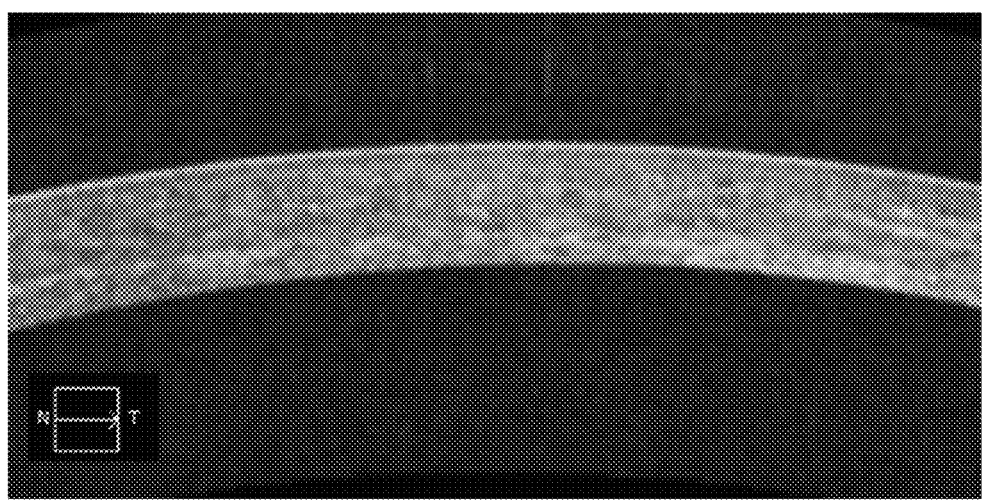
FIG. 17 is an OCT Image after Blurring.

To identify the foregoing dense region of high-intensity pixels, similar to the method used to detect the haze regions, first, the image is blurred so as to eliminate any sharp intensity fluctuation, thereby obtaining the image in FIG. 17.

Next, using an OpenCV function, the Sobel Derivative is applied in the y-direction (i.e., vertical derivative), which multiplies each pixel value by a kernel matrix S, so that its gets assigned a value representing the vertical change across the pixel (the greater the change the higher the value).

The Sobel kernel matrix is defined as follows:

$$S = \begin{bmatrix} -1 & -2 & -1 \\ 0 & 0 & 0 \\ 1 & 2 & 1 \end{bmatrix}$$

Figure 18:
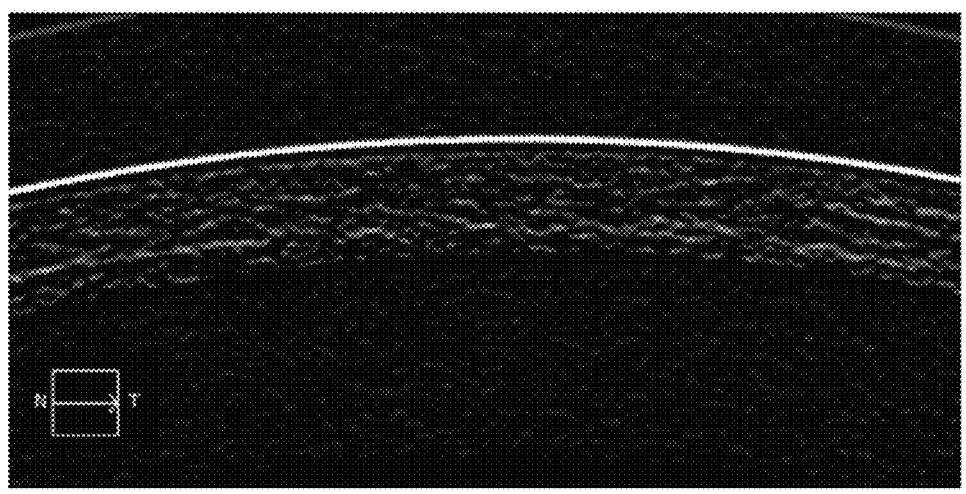
FIG. 18 is an OCT Image after applying the Sobel Derivative.

The resulting image is shown in FIG. 18.

Finally, using the blurred and "Sobelled" image, the following methodology is applied to extract the demarcation line: 1) For each curve c(x) from top(x) to bottom(x), calculate a score S(c) per Eq. 32; 2) Identify and mark the candidate's demarcation lines; these will be the outliers in the data set collected from each image (as described later). 3) Scan through the candidate demarcation lines, and mark the y-position (which will be the position of the demarcation line) as $y_d$ of the highest value of S(c). 4) The suggested demarcation is thus represented by the following function:

$$\text{dem}(x) = \text{top}(x) + y_d \tag{28}$$

Figure 19A:
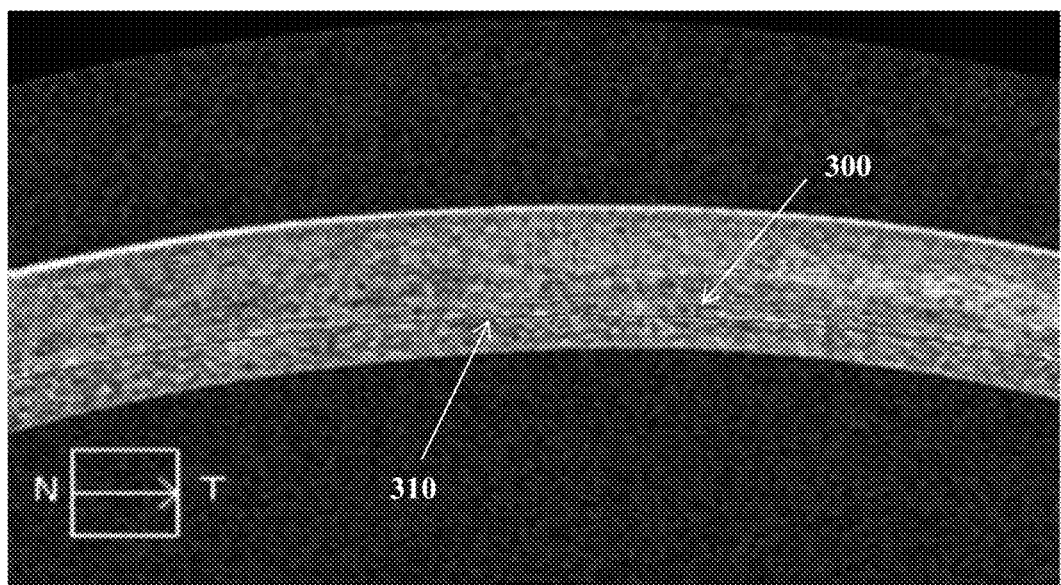
FIG. 19A is an OCT image showing a suggested demarcation line highlighted in color green or line 300, and candidate demarcation lines in color red or line 310.

As illustrated in FIG. 19A, by applying the foregoing method, the suggested demarcation line dem(x) is obtained and highlighted in color green or line 300, and the (second best) candidate demarcation line i highlighted in color red or line 310 on the original image. The figure also shows how the demarcation line depth is measured.

Computation of S(c)

The computation of score S(c) for each curve at depth d is obtained by scanning every pixel $p_{i=1 \ldots n} \in c(x)$, where n the width of the curve, from left to right and computing the total pixel intensity value of c(x) both continuity and brightness in the computation of S(c) need to be accounted. However, continuity should have a higher weight such that if, for example, a line at depth $d_1$ that is continuous throughout whole image cut but at the same time has a low overall level of brightness, and a line at depth $d_2$ that is high intensity value but only appears in a small section of the curve, then the line at depth $d_1$ would have a higher score since it is more probable to be a potential demarcation line.

In other words, to account for continuity of bright pixels, which is a key feature for identifying a demarcation line, a scoring technique is used that is designed to distinguish between any two curves that might have equal total intensity values, but one is continuous and the other is not, in which case, the applied technique will give a higher score to the continuous line.

Given a curve c(x) at depth d of pixels values $p_1, p_2, \ldots, p_n$, such that $0 \leq p_i \leq 255 \forall i \in \{1, \ldots, n\}$, the computation of its score S(c) is performed via the following four steps:

I. Compute the mean position, $\mu$, of the non-zero-pixel values. For example, for n=540, if at depth d, then there's a curve of pixel values:

$p_3 = 18$
$p_{29} = 103$
$p_{413} = 107$
and $p_i = 0 \forall i \in \{1, \ldots, 540\} \setminus \{3, 29, 413\}$
Then, the mean position is $\mu=29$.

Figure 19B:
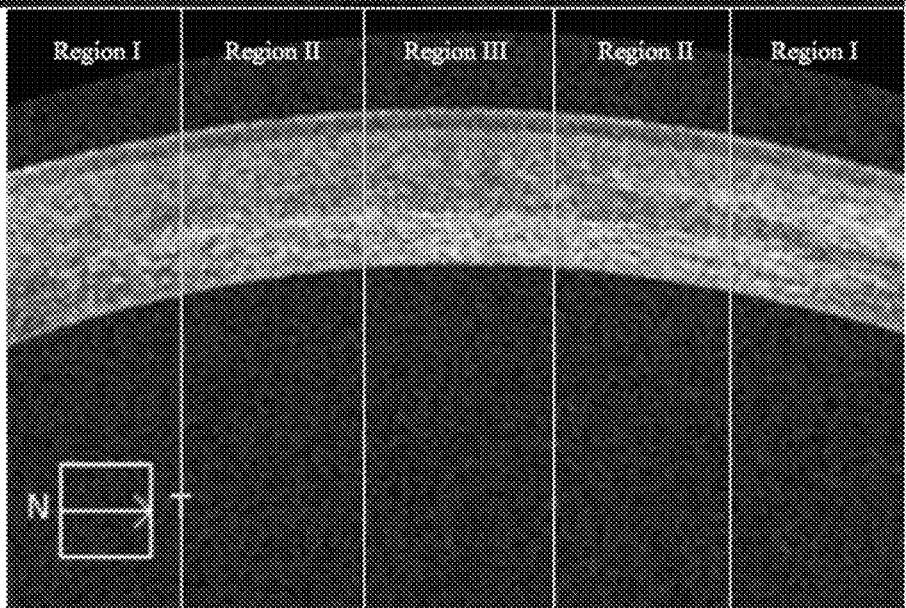
FIG. 19B is One cut of an OCT image showing the different regions used in the score computation.

II. As illustrated in FIG. 19B, the cut is divided into three regions and classify the mean value according to the following via a coefficient, $c_\mu$, as follows:

$$c_\mu = \begin{cases} 3 & \text{if } \mu \in \text{Region III} = \left\{\frac{2n}{5}, \frac{3n}{5}\right\} \\ 2 & \text{if } \mu \in \text{Region II} = \left\{\frac{n}{5}, \frac{2n}{5} \mid \frac{3n}{5}, \frac{4n}{5}\right\} \\ 1 & \text{if } \mu \in \text{Region I} = \left\{0, \frac{n}{5} \mid \frac{4n}{5}, n\right\} \end{cases} \tag{29}$$

By setting the parameter $c_\mu$, more weight is given to the curves having a $\mu$ value in the center of the cornea, which can be explained as a homogeneous distribution of the bright pixels across the curve, and hence a more continuous potential demarcation line.

III. Compute the standard deviation, $\Sigma$, of the position of the non-zero-pixel brightness values. It is quantified using the below formula:

$$\Sigma^2 = \frac{S}{n} \tag{30}$$

where, $$S = \sum_{i=1}^{n} (i - \mu)^2 \text{ if } p_i > 0 \tag{31}$$

In other words, $S$ is the summation of the squared difference between the mean, $\mu$, and the different bright pixels; $\Sigma^2$ is the average difference between the bright pixels and the mean $\mu$.

IV. Compute the S(c) as the follows:

$$S(c) = c_\mu \times \Sigma \times \sum_{i=1}^{n} p_i \tag{32}$$

For example, assume the following two curves, at depths $d_1$ and $d_2$, with their corresponding pixel values for n=10:

$c_1(x) = \{25, 35, 20, 20, 0, 0, 0, 0, 0, 0\}$
$c_2(x) = \{25, 0, 0, 35, 0, 0, 20, 0, 0, 20\}$

Their scores will then be computed as follows:

For $c_1(x)$:

$\mu = 2$

The mean appears in the first fifth of the total width of the line, hence $c_\mu = 1$ $S = (1-2)^2 + (2-2)^2 + (3-2)^2 + (4-2)^2 = 6$ Therefore $$\Sigma^2 = \frac{6}{10} = 0.6 \text{ and } \Sigma = 0.77$$

Consequently, $S(c_1) = 1 \times 0.77 \times (25 + 35 + 20 + 20) = 77$

For $c_2(x)$:

$\mu = 4$

The mean appears in the second fifth of the total width of the line, hence $c_\mu = 2$ $S = (1-4)^2 + (4-4)^2 + (7-4)^2 + (10-4)^2 = 54$ Therefore, $$\sum^2 = \frac{54}{10} = 5.4 \text{ and } \Sigma = 2.32$$

Consequently, $S(c_2)=2\times 2.32\times(25+35+20+20)=464$

Note that in case a candidate is detected near or at the bottom boundary (i.e., in the last 35 microns of the cornea), it is considered the suggested line if and only if it is the only candidate detected. Otherwise, it is considered as candidate even if it has the highest score (the second highest score is considered as the suggested). This is due to the fact that, as confirmed by manual operators, a high intensity (i.e., high S(c) score) candidate falling in the last 35 microns (i.e., approximately last 7 pixels of the image) will most likely be a reflection in the cornea and not a demarcation line, except if it was the only candidate.

Identifying Candidate Demarcation Line(s)

To identify the scores that are considered outliers (and thus taken as candidate demarcation lines), a statistical approach is applied, where the set of scores is divided into three quartiles with three delimiters Q1, Q2 and Q3. The delimiter Q1 represents the lower $25^{th}$ percentile score S(c); Q2 stands for the mid $50^{th}$ percentile score, and Q3 represents the $75^{th}$ percentile score. Typically, in the foregoing statistical approach, upper and lower fences are employed (i.e., the cut-off scores that separate two quartiles) and are usually set at fixed distance from the interquartile range (i.e., Q3−Q1). These are set by default as 1.5 times the interquartile range. Subsequently, any score that falls outside these fences is considered a potential outlier. Even when the scores are not normally distributed, this approach can be used safely because it depends on the median and not the average of the scores.

In the present embodiment, only the upper fence is used as the threshold for considering a curve as candidate demarcation line. This threshold $\mathfrak{T}$ thus computed as follows:

$$\mathfrak{T} = Q3+(Q3-Q1)\times 1.5 \tag{33}$$

Hence, a curve c(x) is considered a candidate demarcation line if its score $S(c) > \mathfrak{T}$.

In a hazy image (i.e., an image with a lot of detected haze), the scores of the different curves that are to be taken as candidate demarcation lines would be high, which makes these curves belong to Q3 subject to a "higher" upper fence value. This ensures that these curves are not considered as part of a haze region. Thus, the mechanism is able to distinguish/separate demarcation line candidates from curves that belong to haze.

Figure 20:
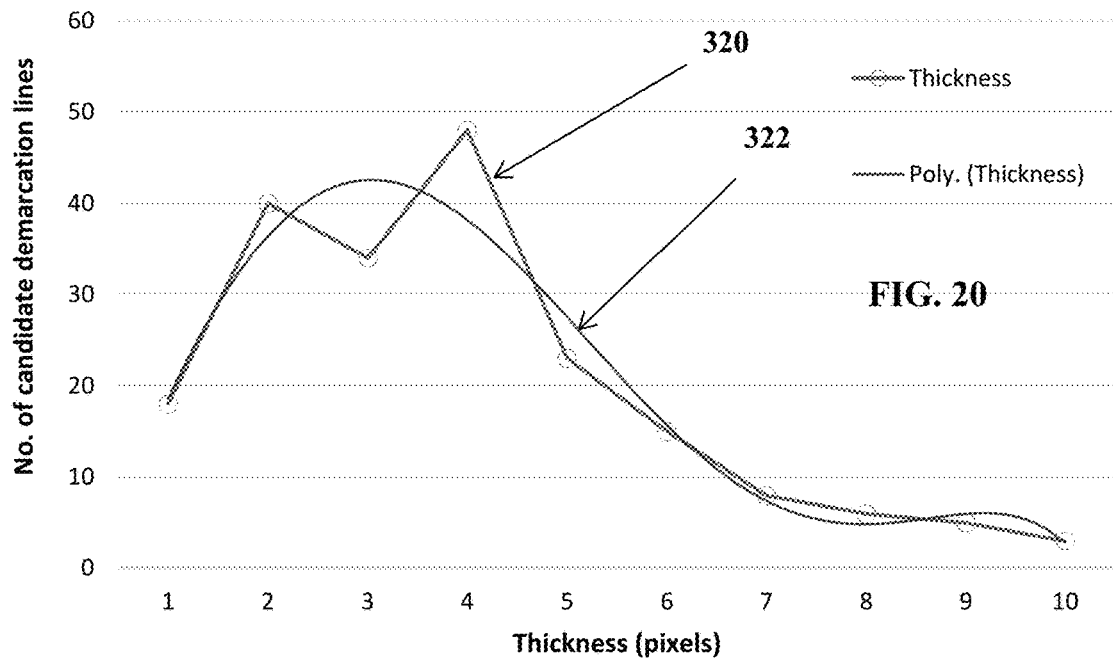
FIG. 20 is a histogram of candidate demarcation line thickness.

Finally, to ensure that the present embodiment does not consider multiple curves as multiple candidates, when they should be taken as one demarcation line, the typical thickness of a demarcation line has been evaluated that is needed to be considered as one candidate. To achieve so, first, from manual observations confirmed by ophthalmologists, a demarcation line is considered a candidate if it is thicker than 1 pixel, which is approximately equivalent to −7.4 microns. To verify this observation, as shown in FIG. 20, the histogram of average thicknesses 320 is plotted (and its polynomial curve fitting 322) of all extracted candidates for all images. As noticed, the average thickness of a demarcation line is approximately 4 pixels.

Thus in the present embodiment, when scanning the curves from the upper boundary to the bottom boundary, whenever a curve is considered a candidate (i.e., the score greater than the upper fence threshold), the scores of the next three curves are "tagged", and then the one with the highest score among these four "tagged" curves, is picked as candidate; the rest are discarded.

Minimum Score Value

In some cuts, a demarcation line must not be detected, as it is barely visible. However, in the same cut, a small bright region in the stroma may have a "high-enough" score and can exist in multiple cuts (i.e., is consistent). In this case, the technology must not report it as a demarcation line; therefore, a minimum score must be set, below which a curve is not considered a candidate demarcation line.

To statistically set the minimum score, denoted Y, the following is performed:

1. First, calculating the scores of all the candidate and suggested demarcation lines for all available OCT images. The total number of entries in the dataset obtained is 5,228.

2. To reduce the set space, aggregating the scores such that, starting with the minimum score m (of the available values), all scores belonging to m+o, are grouped (e.g., o=2000). Subsequently, keep updating m by o score (i.e., m=m+o) until the maximum score is reached (which is obtained from the available values).

3. Plotting the histogram of the distribution of the grouped scores.

4. Identifying the type of distribution obtained [Dixon, Wilfrid Joseph, and Frank Jones Massey. *Introduction to statistical analysis*. Vol. 344. New York: McGraw-Hill, 1969].

5. Computing the $16^{th}$ percentile minimum risk, which is the commonly used percentile in the literature [Rhodes, T. E., Chumburidze, O., and Qiao, S. "Percentile Methodology for Probability Distributions As Applied to the Representative Scenario Method". MIB Solutions Inc. (2015)]; which would be the minimum score.

Figure 21A:
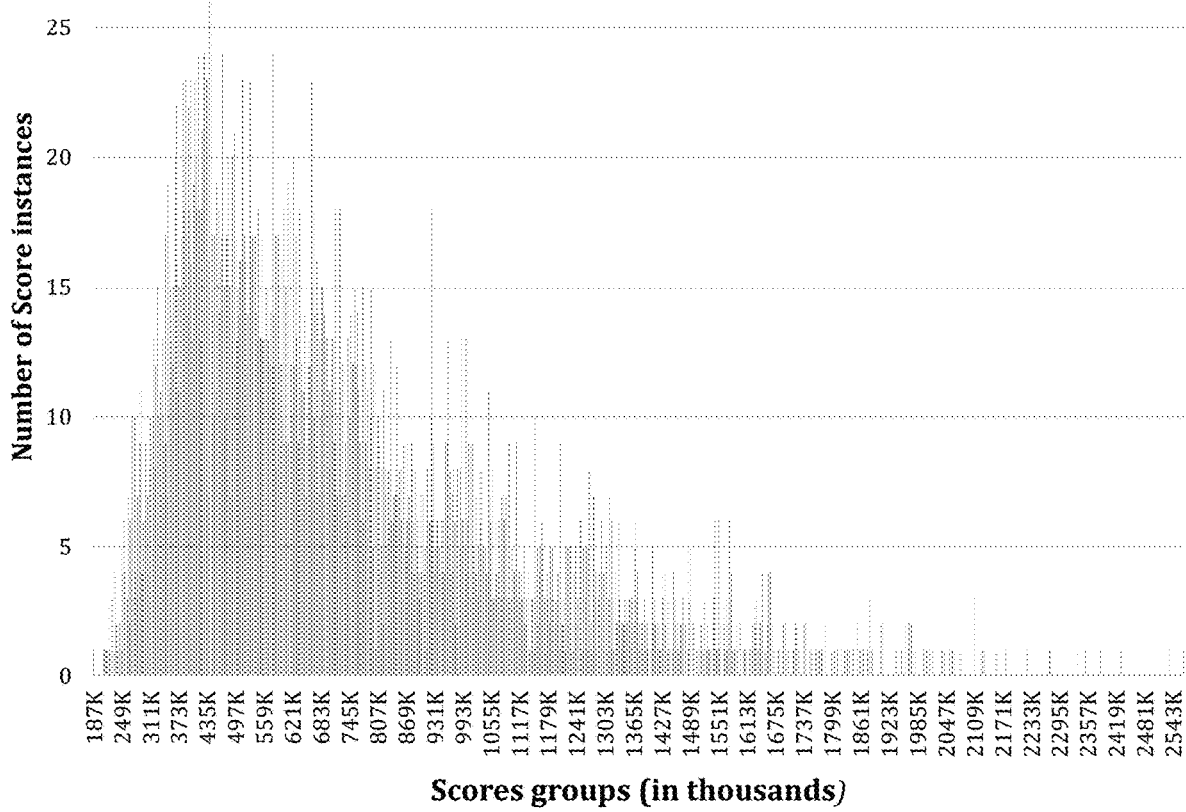
FIG. 21A is a graph showing the distribution of the Candidates and Suggested Demarcation Lines' Scores.

FIG. 21A shows the distribution of scores with respect to the aggregated score groups. This positively skewed distribution can be a: a) Weibull distribution; b) Gamma distribution; c) Lognormal distribution; or d) Power lognormal distribution.

After studying the obtained distribution, the distribution is associated with the Gamma family [Thom, Herbert CS. "A note on the gamma distribution." Monthly Weather Review 86.4 (1958): 117-122; and Kotlarski, Ignacy. "On characterizing the gamma and the normal distribution." Pacific Journal of Mathematics 20.1 (1967): 69-76 for which the shape and scale parameters $\alpha$ and $\beta$ is computed, respectively.

These two values were computed based on the mean $\alpha\times\beta$ and the standard deviation of the distribution $\alpha\times\beta^2$.

The Gamma function is defined, for any positive real number x to be:

$$\Gamma(x) = \int_0^\infty t^{x-1} e^{-t} dt \tag{33}$$

The cumulative distribution (CDF) function F of the gamma distribution is:

$$F(x; \alpha, \beta) = \frac{1}{\Gamma(\alpha)\beta^\alpha} \int_0^x t^{\alpha-1} e^{-t/\beta} dt \tag{34}$$

Figure 21B:
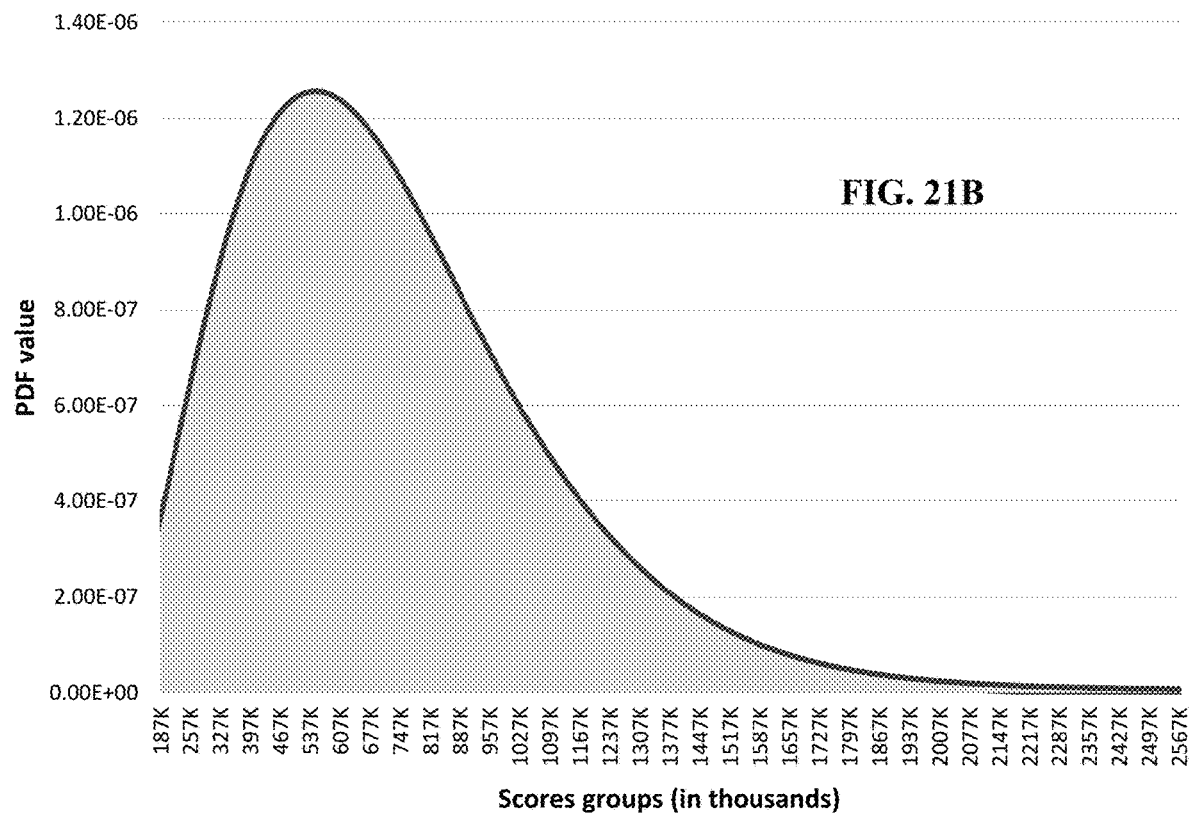
FIG. 21B is a graph showing the Probability Density Function of the Distribution of the Candidates and Suggested Demarcation Lines' Scores.

FIG. 21B shows the probability density function of the distribution with: $\alpha=4.128$ and $\beta=175718.39$.

In order to find the $16^{th}$ percentile of the distribution, finding x is needed such that: $F(x; 4.128, 175718.39)=0.16$.

Hence, $\gamma=x=384489.6$.

Hence, a suggested or candidate demarcation line is considered if and only if its score $S(c)>\gamma$; otherwise it is ignored.

EXAMPLES 44 different OCT eye images were provided by research partners at the American University of Beirut Medical Center (AU BMC). The 44 OCT images are of 40 patients that underwent keratoconus crosslinking; these were collected at baseline pre-operatively, and at 2 weeks, 3 months, 6 months and 12 months post-operatively. The SD-OCT images were analyzed using software described above at baseline and all follow-up periods. The haze and demarcation line statistics generated by the software for all images have been verified. Three types of analysis is performed: 1) aggregate (i.e., on all patients); 2) on one sample patient; 3) on images/videos where the demarcation line is present (or most likely to be present/absent).

Aggregate Results

Figure 22:
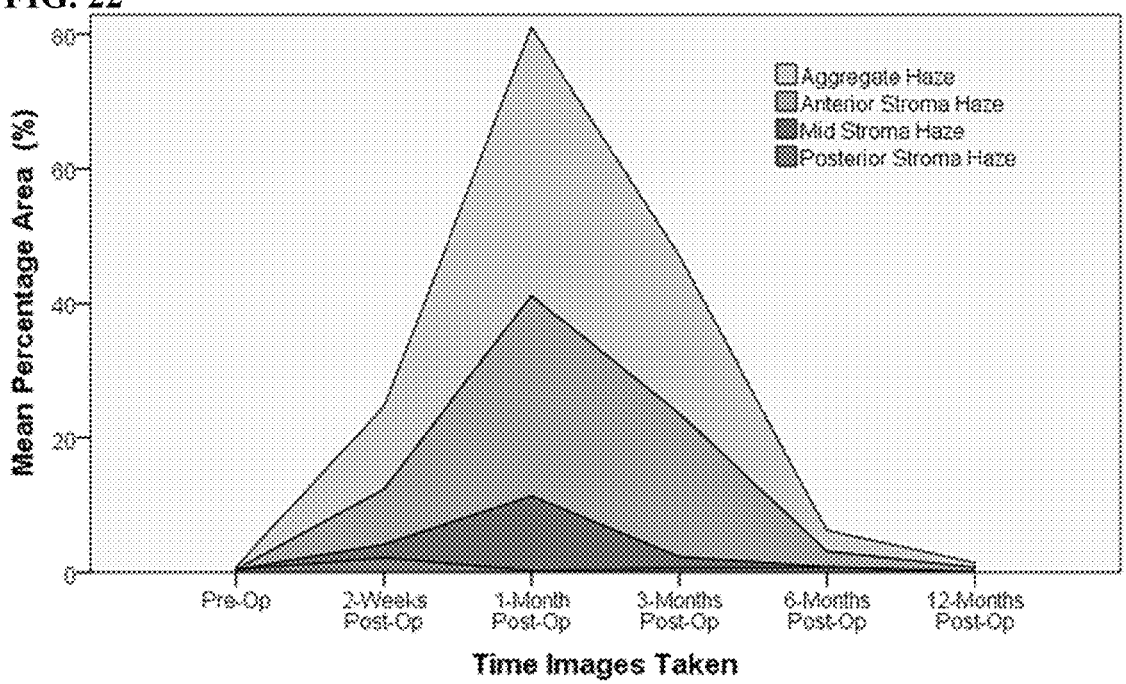
FIG. 22 is a graph showing the change of corneal area occupied by haze from baseline for all patients over time.

FIG. 22 shows the trends followed in haze location and density in the cornea. Overall, the haze is mostly present at 1-month post-surgery for all regions; especially in the anterior and mid stroma regions. In contrast, haze in the posterior stroma region peaks at 2-weeks and 6-months post-surgery.

FIG. 22 shows the average brightness of different corneal regions for all patients, collected at different periods. Here, the brightness is expressed by percentage, and the overall brightness for all corneal regions at each period is also shown.

As noticed, the overall average brightness significantly changes in comparison to the baseline value (i.e., pre-op average brightness) at 2-weeks and 3-months periods with p values of <0.001 and =0.006 respectively. In the anterior stroma region, the average brightness significantly changes at 2-weeks and 3-months with p values of <0.001 and = 0.001 respectively. In contrast, the average brightness in the mid stroma region significantly changes at 2-weeks with a p value of <0.001. Finally, the average brightness in the posterior stroma has no significant changes.

12-months of a typical steroid treatment course. In particular, posterior haze develops directly after treatment (from 2-weeks to 1-month). Subsequently, later in the patient's course (from 1-month to 3-months), the haze mainly occupies the anterior part of the cornea.

Demarcation Line Depth

After applying the algorithm on all videos, detecting and measuring the depth of the suggested and candidate demarcation lines in microns, such that the depth is measured from the beginning of the Epithelium's bright surface to dem(x), as shown in FIG. 19. Two independent operators and the automated detection software examined corneal OCTs of 40 eyes post corneal cross-linking, at 1 and 3 months postoperatively. Operators evaluated the presence of the demarcation line and measured its depth by looking at OCT images (128 cuts) on two separate occasions one week apart. The automated software examined all 128 cuts of each OCT measurement. The operators were blinded to patients' names, the results of other examiners (human or software), and their own previous results. Intra-observer measurements repeatability and intra-observer reproducibility were calculated and compared.

Figure 24:
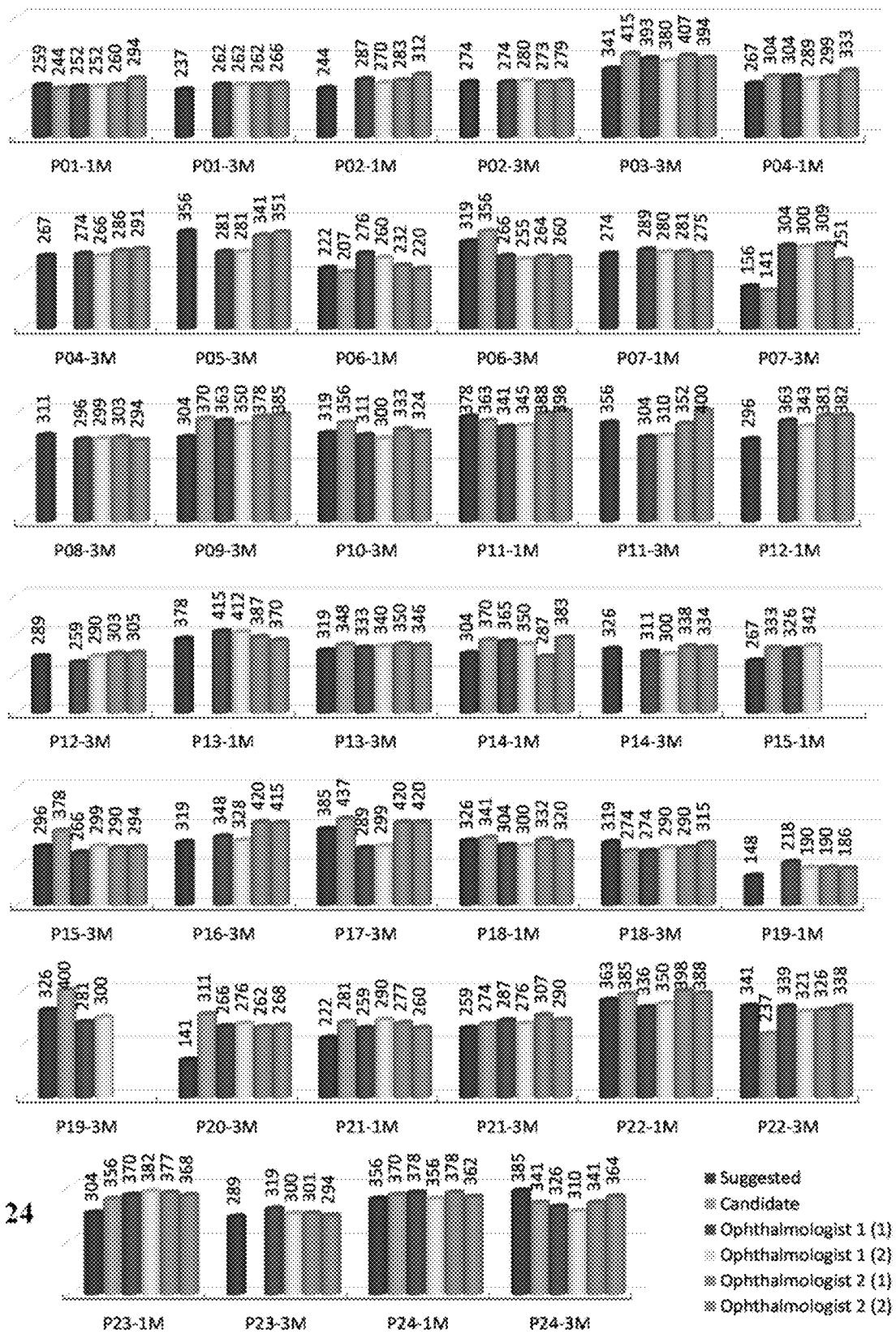
FIG. 24 are bar graphs showing the depth of suggested and candidate demarcation line by the software and the measurements of the ophthalmologists on two occasions expressed in microns for all patients at 1-month and 3-months post-operation periods.

FIG. 24 shows the depths of the demarcation lines in microns for all considered patients. These measurements are taken by two experienced human operators (i.e., Dr. Shady Awwad and Dr. Maamoun Abdul Fattah from AUBMC) and the present invention. The absence of a depth value indicates that the operator (software/human) did not detect any (candidate or suggested) demarcation line (e.g., patient 19 at 3-month post-operation).

As noticed in the figure, some of the measurements of the demarcation line depth of the inventive software and the two human operators are approximately equal (e.g., patient 24 at 1-month post-operation), or the margin of difference is very small. Here, every pixel is equal to about 7.4 microns, and it is common that a human operator "drifts" by ±5 pixels when doing manual measurements, which is equivalent to a drift of ~40 microns.

Some measurements are observed in outstanding cases where the software provides a measurement close to one of

TABLE 4

Mean pixel intensity of Stroma regions for all patients over time; the values highlighted in yellow represent the periods with significant change ($p < 0.05$) in brightness of the region from baseline (i.e., mean for all patients)

| Region | Pre-Op | 2-Weeks | 3-Months | 6-Months | 12-Months |
| --- | --- | --- | --- | --- | --- |
| Anterior Stroma Brightness | 46.5 ± 5.1% | 54.8 ± 4.0% ($p < 0.001$) | 52.4 ± 5.3% ($p = 0.001$) | 49.7 ± 7.1% | 48.4 ± 6.5% |
| Mid Stroma Brightness | 43.2 ± 6.8% | 50.2 ± 5.1% ($p < 0.001$) | 45.2 ± 4.8% | 45.0 ± 6.7% | 44.3 ± 5.9% |
| Posterior Stroma Brightness | 39.3 ± 7.9% | 41.4 ± 7.3% | 39.2 ± 5.1% | 39.9 ± 7.2% | 39.8 ± 4.9% |
| Overall Brightness | 43.3 ± 6.2% | 50.2 ± 4.5% ($p < 0.001$) | 47.9 ± 4.5% ($p = 0.006$) | 46.4 ± 5.8% | 44.9 ± 5.4% |

Sample Patient Case Analysis

To highlight the ability of the System and Method for Automated Detection and Measurement of Corneal Haze to aid in clinical analysis and decision-making for tracking each patient's haze progress over time, FIGS. 23A-23C shows an example patient case.

Here, the haze of the analyzed patient peaks at 2-weeks and 3-months post-surgery compared to pre-op, with significant decrease to pre-op values after 6-months and the human operators' measurements only (e.g., patient 13 at 1-month post-operation) or may provide a measurement that is far from the ones provided by both human operators (e.g., patient 7 at 3-months post-operation). Interestingly, since the software is designed to detect and report not only the best candidate line (i.e., the suggested one), but also the second best candidate (if applicable), those two candidate(s) can be fairly used to assess the performance of the software vs. the different measurements of human operators. Here, a candidate demarcation line (when it exists) might be the line chosen by ophthalmologists as "the" demarcation line. However, with the technology, for a line to be chosen as candidate and not suggested, this means that this line that has the highest score among all consistent potential demarcation lines (i.e., exists in 15% of the valid cuts).

Figure 25:
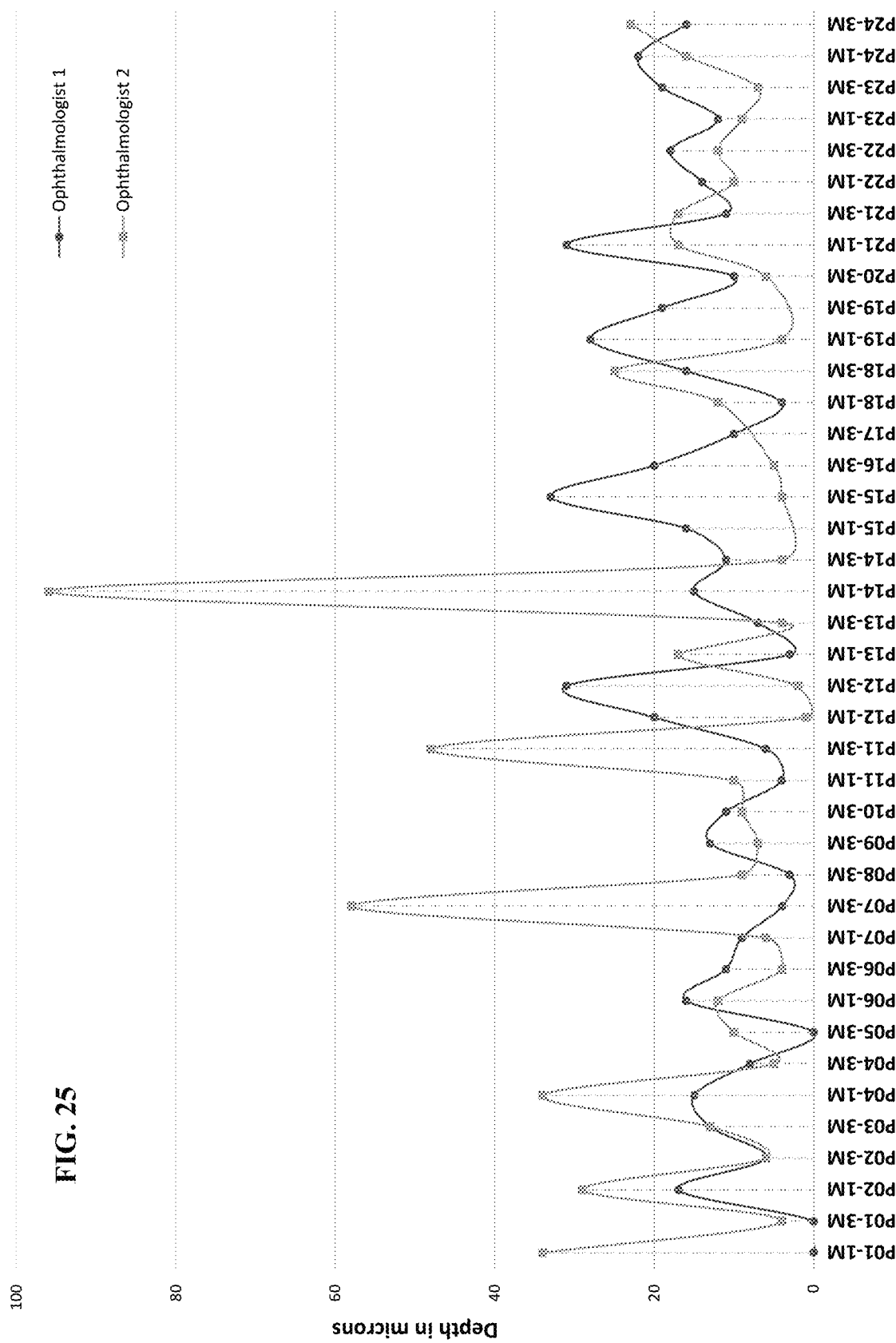
FIGS. 25 and 26 are graphs showing the differences of depths of the demarcation lines as measured by ophthalmologists and software in microns for all patients at 1-month and 3-months post-operation periods, where
Figure 26:
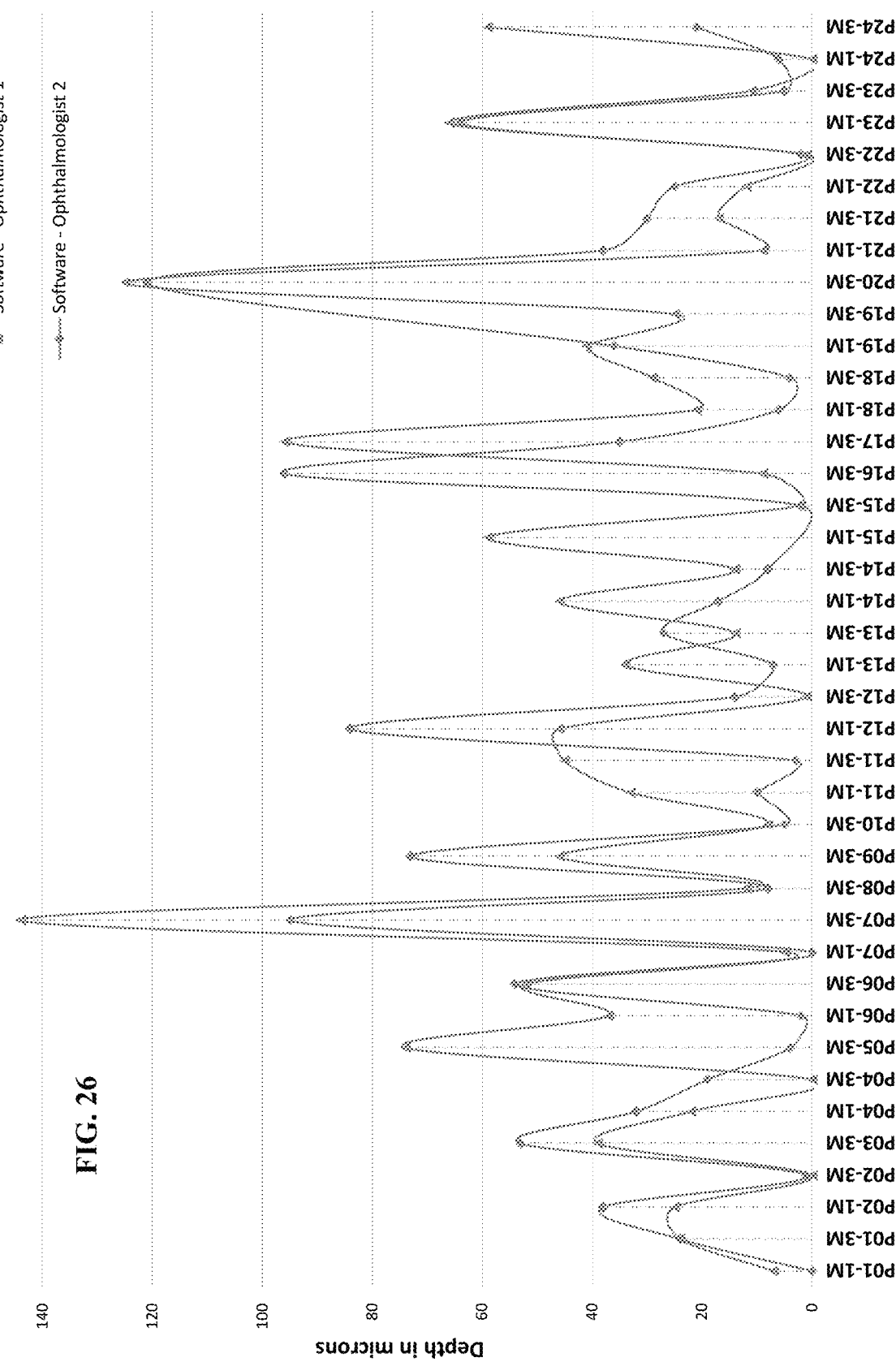

The difference of measurements in microns, between the different operators, is quantified in FIG. 25-26B. As observed in FIG. 25, the measurements provided by the human operators differ between the two measurements of the same operator, and across operators (with a maximum difference of 96 microns). These results highlight the human error and inconsistency factor in obtaining manual subjective measurements (where sometimes one operator might detect a line, and another may not, e.g. patient 19 at 3-months post-operation), which motivates the need for an automated tool and software. Similarly, FIG. 26 shows the differences in measurement between the software and the average measurements provided by the two human operators. As observed, although blinded to the human operator's measurements, the software is able to provide very close (and sometimes almost identical) results taking into account the aforementioned human drift in measurement. This reflects and proves the accuracy and robustness of the technology in being the main tool used for corneal haze measurement, with the promise of replacing manual measurements.

However, the same figure shows some discrepancy of measurement for some patients between the automated and manual operators. This is due to the fact that unlike the human operators, the inventive software takes into account multiple factors (i.e., valid cuts, consistency among cuts, continuity, etc.) for considering a demarcation line as a "legal" one, thereby having the human operators selecting a cut and measurement that shouldn't be considered. To shed the light on this interesting observation, FIG. 26 plots the measurements of the cases where discrepancy is observed (i.e., P6-3M, P7-3M, P9-3M, P12-1M, P15-1M, P20-3M and P23-1M) as obtained by the different operators (human and software) on the different cuts that were selected to be the "best" by the different operators. Since the difference between the first and second measurement of one human operator is observed to be minor, for simplicity, only one of the human measurements is shown.

Figure 27A:
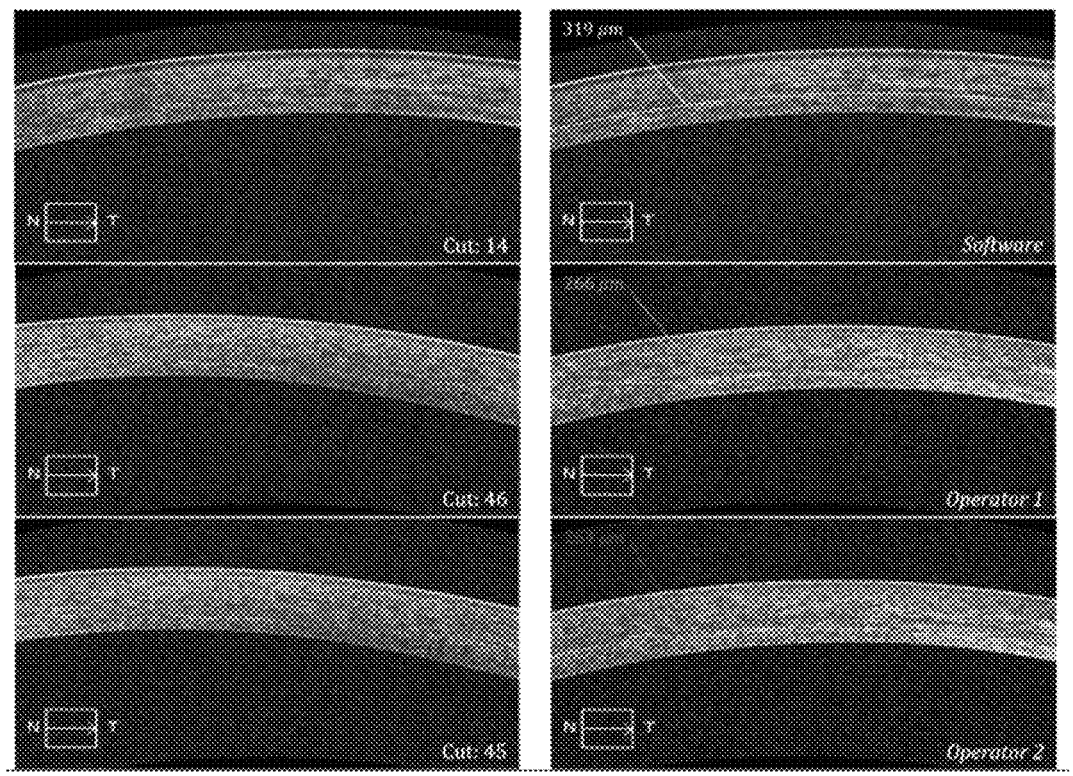
FIGS. 27A-27G are Raw and annotated cuts with depth in microns of demarcation line based on human and software operators for the patients with relatively large differences in measurements. The software suggested demarcation line is highlighted yellow, the candidate demarcation line is highlighted in orange when available. The demarcation lines measured by the first and second ophthalmologist are highlighted in green and in red, respectively. The annotation is made on the operator's chosen cut of the OCT image.

Discussion and analysis of these results are presented as follows:

(a) As exhibited in FIG. 27A, for the case of P6-3M, the software picked cut 14 in which the demarcation line appears the clearest (i.e., has highest score among all consistent demarcation lines), and its depth is measured to be 319 µm. Conversely, the two human operators selected cuts 45 and 46, respectively, in which they obtained depths of 266 and 264 µm, respectively. Interestingly, it can be noticed that the thickness of the cornea has varied between the different cuts. More specifically, the thickness in cuts 45 and 46 remained almost the same; whereas at cut 14, it appears to have expanded. To verify this observation, the relative depth of the line is measured, and a depth of ≈62% for the software is obtained, and a depth of ≈58% for the two human operators measurements. Therefore, the demarcation line chosen by the ophthalmologists is most likely to be the same line as the one chosen by the software.

Figure 27B:
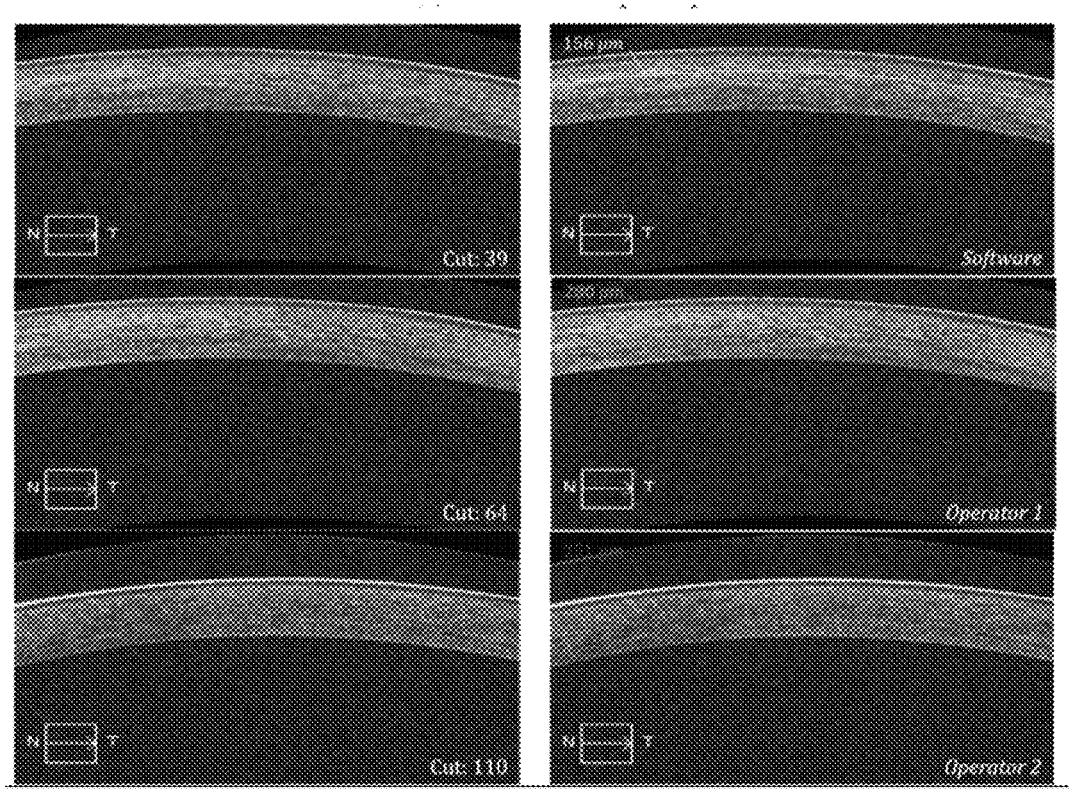

(b) As exhibited in FIG. 27B, for the case of P7-3M, after examining the scores of the lines (suggested/candidate) picked by the operators, the lines chosen by the ophthalmologists have obtained scores that are high enough to be potential demarcation lines. However, they did not rank $1^{st}$ or $2^{nd}$ (i.e., suggested and candidate, respectively) to be reported by the software. In fact, a line with a depth near the line chosen by the human operators, was detected by the inventive technology; however, it was ranked $3^{rd}$.

Figure 27C:
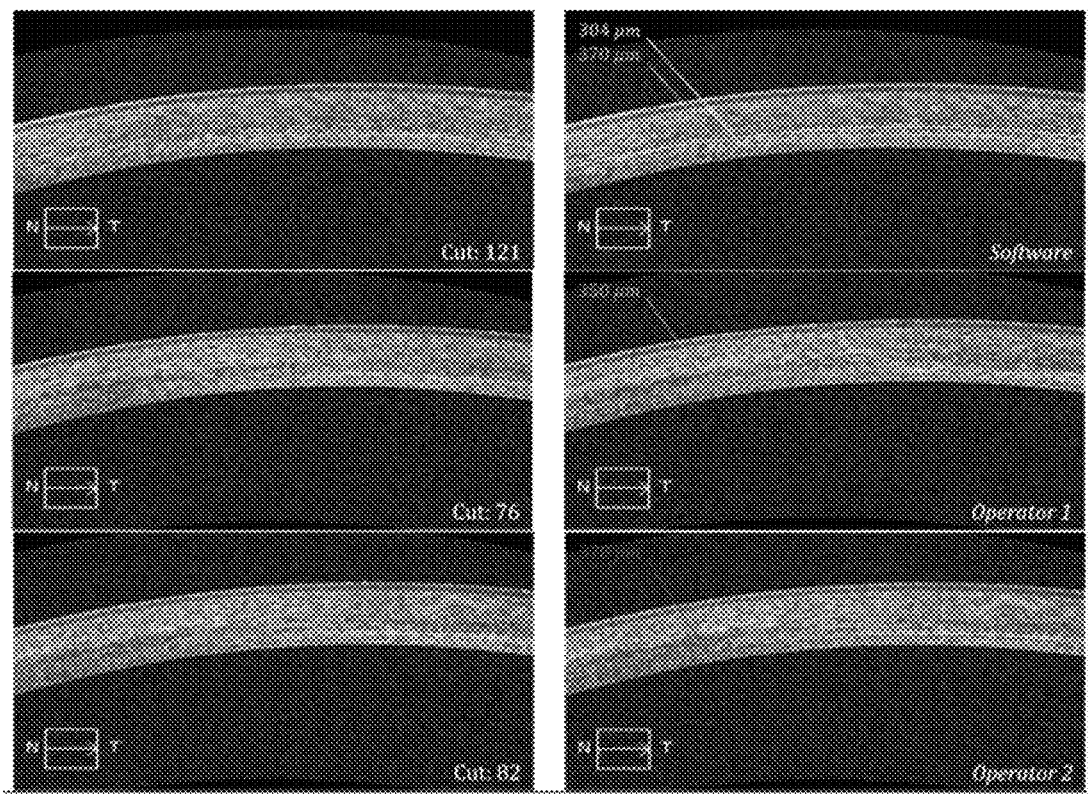

(c) As exhibited in FIG. 27C, or the case of P9-3M, the suggested demarcation line as measured by the software is captured at cut 121, in which it appears the most continuous across the curvature of the cornea, and consistent among cuts. The line with the highest score appears at depth 304 µm, whereas the candidate demarcation line is at depth 370 µm. Interestingly, the two human operators picked a demarcation line at approximately the same depth as the candidate line (i.e., at depth 350 and 378 µm, respectively). However, in cut 121, as observed in the figure, the thickness of the demarcation line is observed to be relatively high (i.e., greater than 4 pixels, which is computed statistically as the average thickness of a demarcation line based on the available data set). Thus, it is most likely that the two lines pertain to the same demarcation line.

Figure 27D:
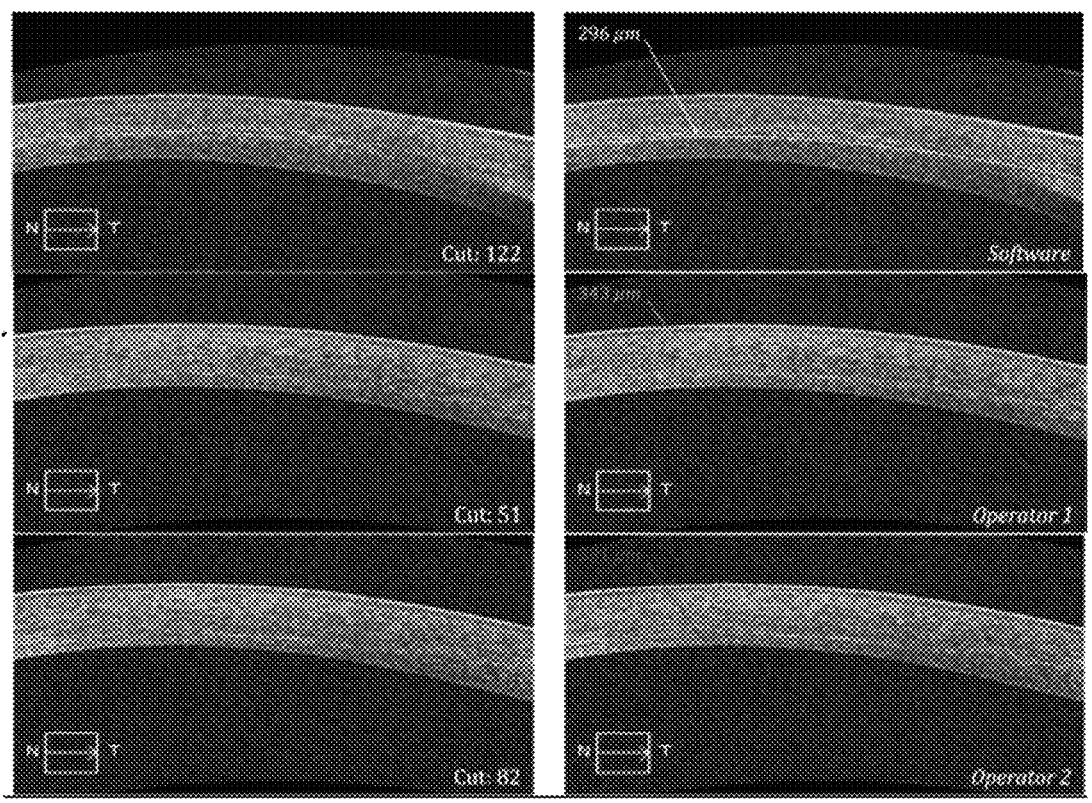

(d) As exhibited in FIG. 27D, for the case of P12-1M, the cut picked by the software exhibits the presence of a "clear" demarcation line at a depth around 290 µm. Nevertheless, by comparing the cuts chosen by the different operators, this line appears the clearest in cut 122. In general, ophthalmologists tend to look mainly for potential lines in central cuts (in this case, cuts 51 and 82) as they assume that "most probably" a potential line appears the clearest in middle cuts, which is not the case for P12-1M.

Figure 27E:
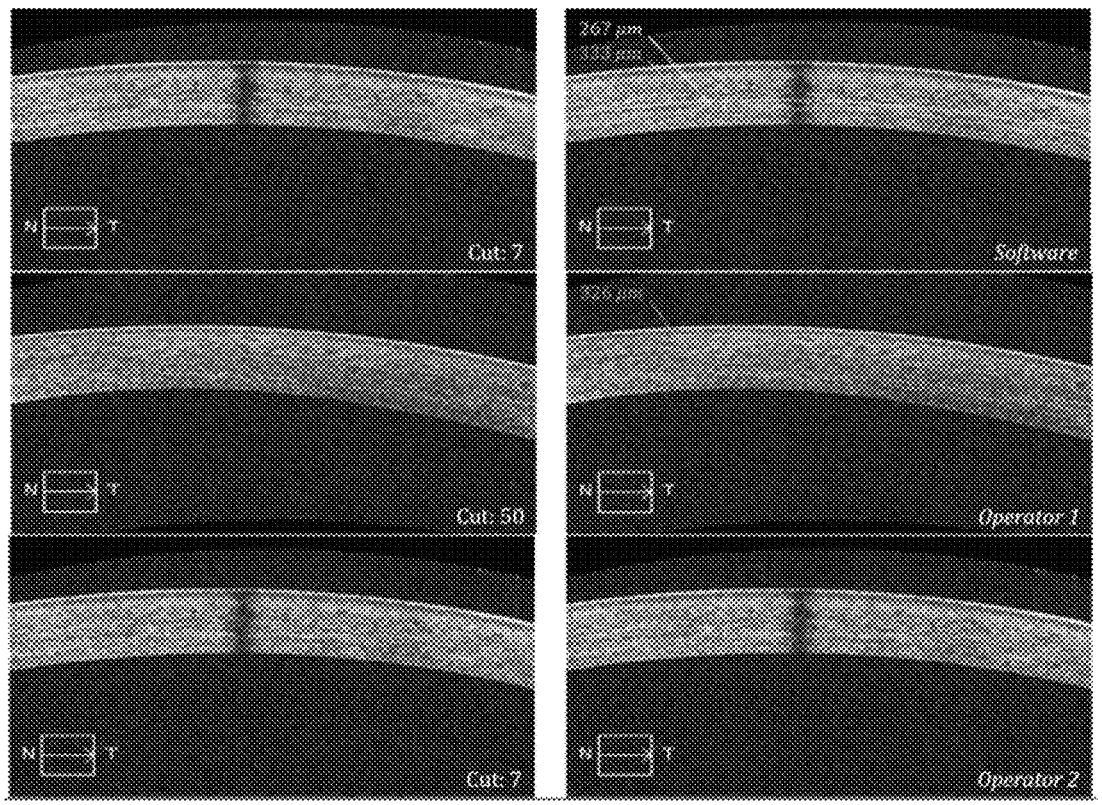

(e) As exhibited in FIG. 27E, for the case of P15-1M, the second operator's observation indicates that there is no demarcation line. Nonetheless, the first human operator found a demarcation line at depth 326 µm. As for the software, a suggested and a candidate demarcation lines were observed at depths 267 µm and 333 µm, respectively, which adheres with the first operator's measurement. Discussion of the cases with no reported demarcation lines is presented later in the text.

Figure 27F:
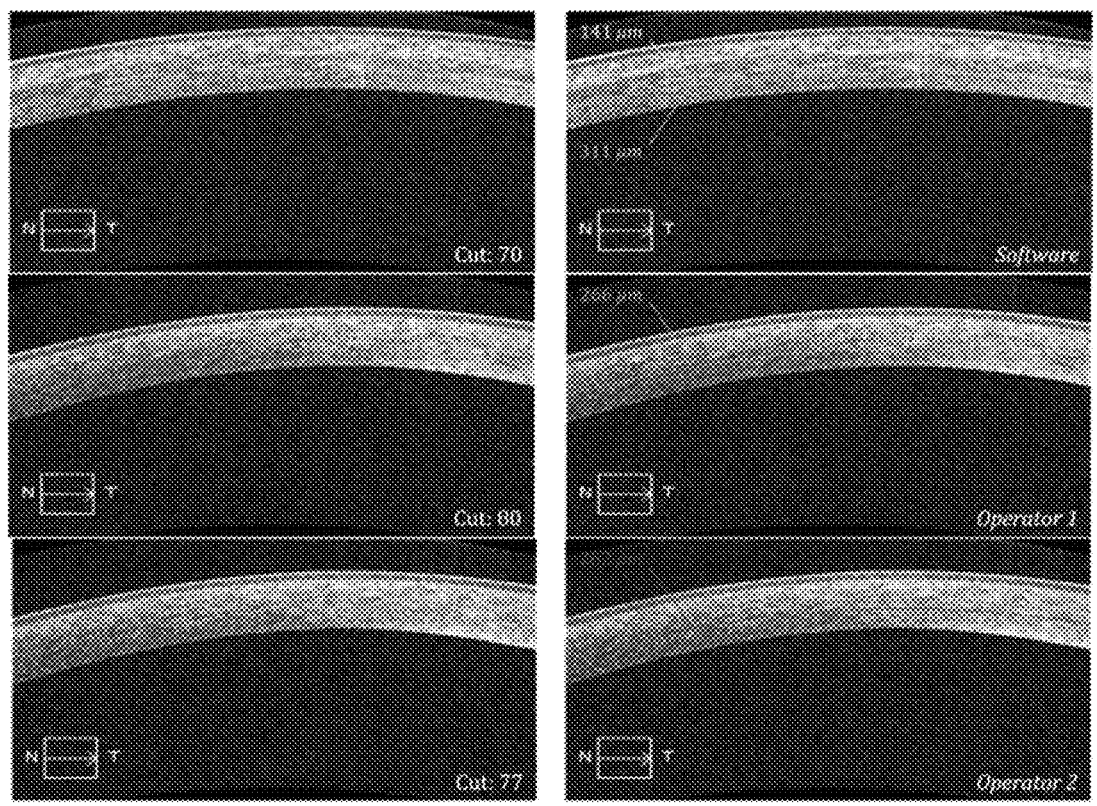

(f) As exhibited in FIG. 27F, the case of P20-3M is a similar to the case of P7-3M. Here, the line chosen by the human operators was indeed captured by the software, but it did not have the highest score. The candidate's score is slightly smaller than that of the suggested one; hence, it was ranked $2^{nd}$ by the inventive technology.

Figure 27G:
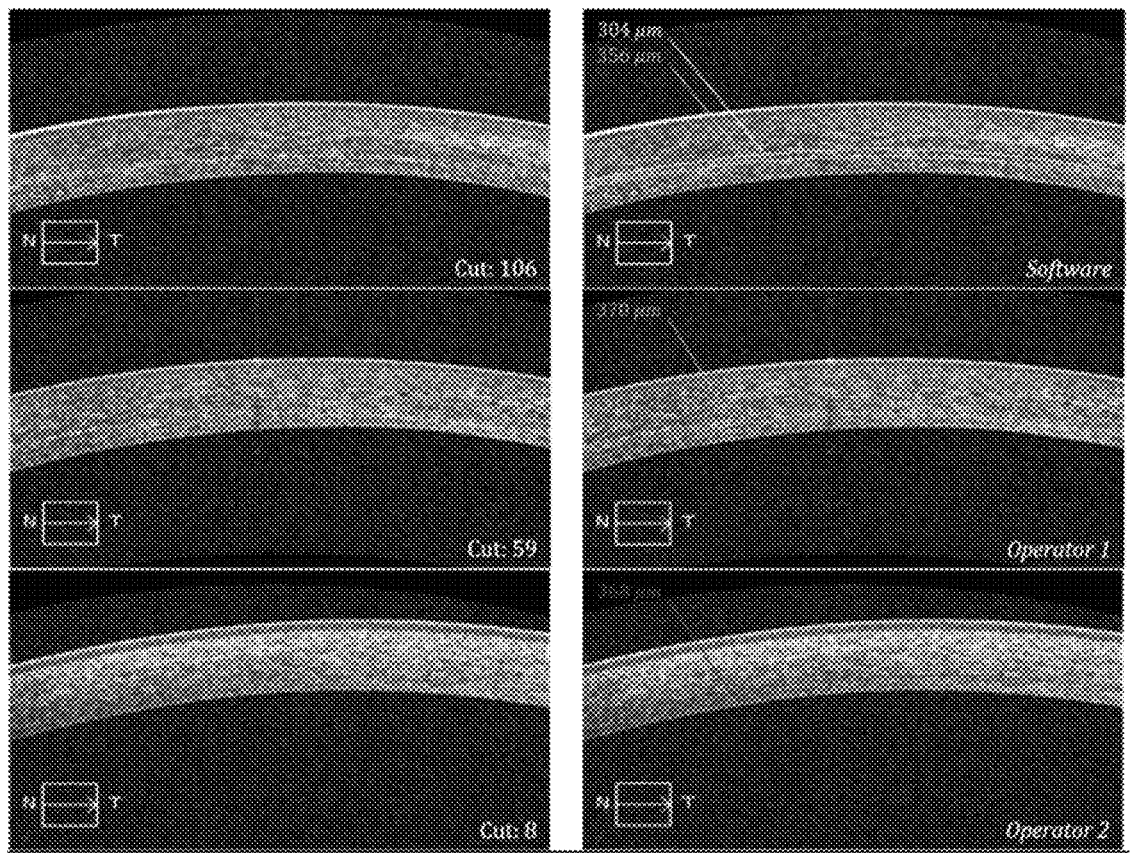

(g) Lastly, as exhibited FIG. 27G, for the case of P23-1M, after examining the OCT image, the demarcation line appearing for this patient's eye fluctuates across multiple cuts. However, the software considers two lines to be the same if the difference in depth is less than or equal to 4 pixels (following the assumption that the demarcation line is the same if it is within 4 pixels of depth range). Interestingly, the fluctuation in this case appears to be slightly larger than 4 pixels. However, the software was able to capture this very high fluctuation by considering the fluctuation as two lines. Nevertheless, the measurements of the human operators were very close to the obtained candidate demarcation line (the difference is less than 24 µm).

As noticed, the selection of the cut for all the cases has a big impact on the demarcation line measurement. This highlights the advantage of the automated tool in selecting the "best cut" statistically based on a well-defined criterion (which incorporates the score of the line and the consistency of the line among multiple cuts) as opposed the error-prone human approximation. In addition, as observed, the automated tool is able to accurately detect and measure the depth of the demarcation line in the selected cut.

Figure 28A:
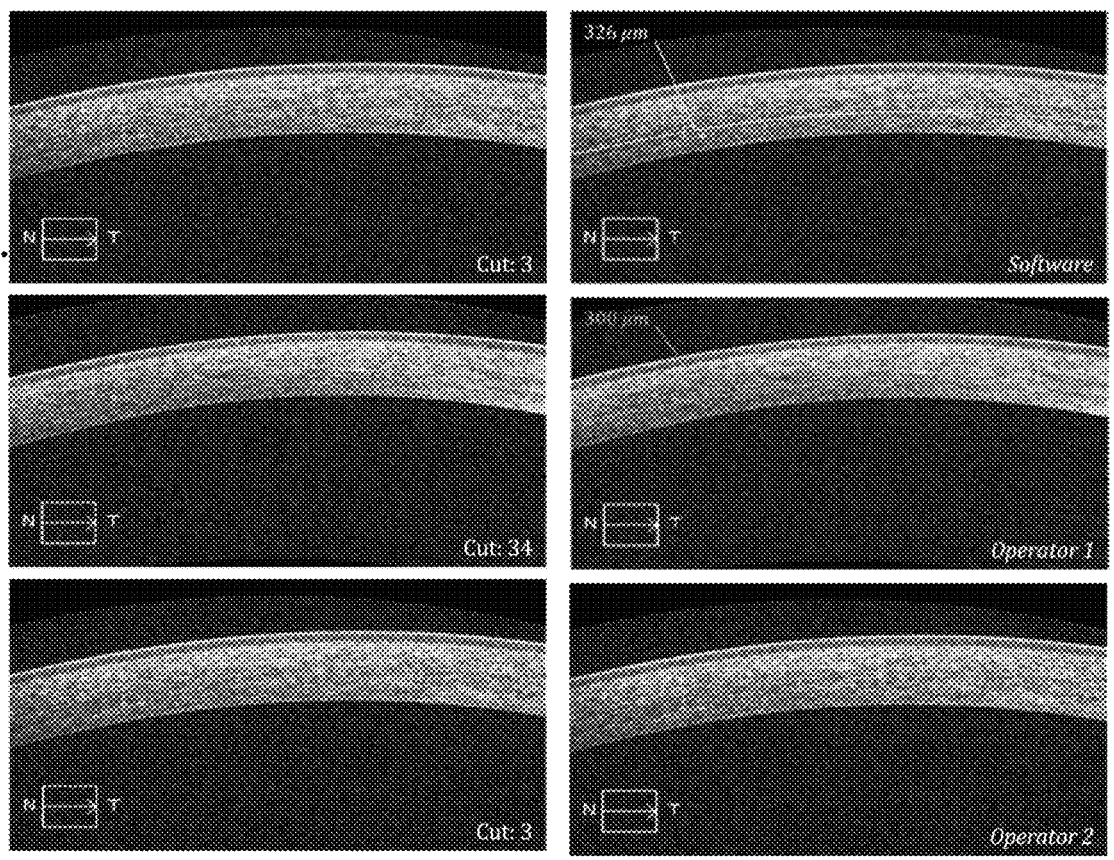
FIGS. 28A-28D are OCT images showing the Depth of detected demarcation lines for different patients as measured by the software (in yellow), the first operator (in green) and the second operator (in red). The absence of a highlighted line indicates that a demarcation line was not detected by software/operator.
Figure 28B:
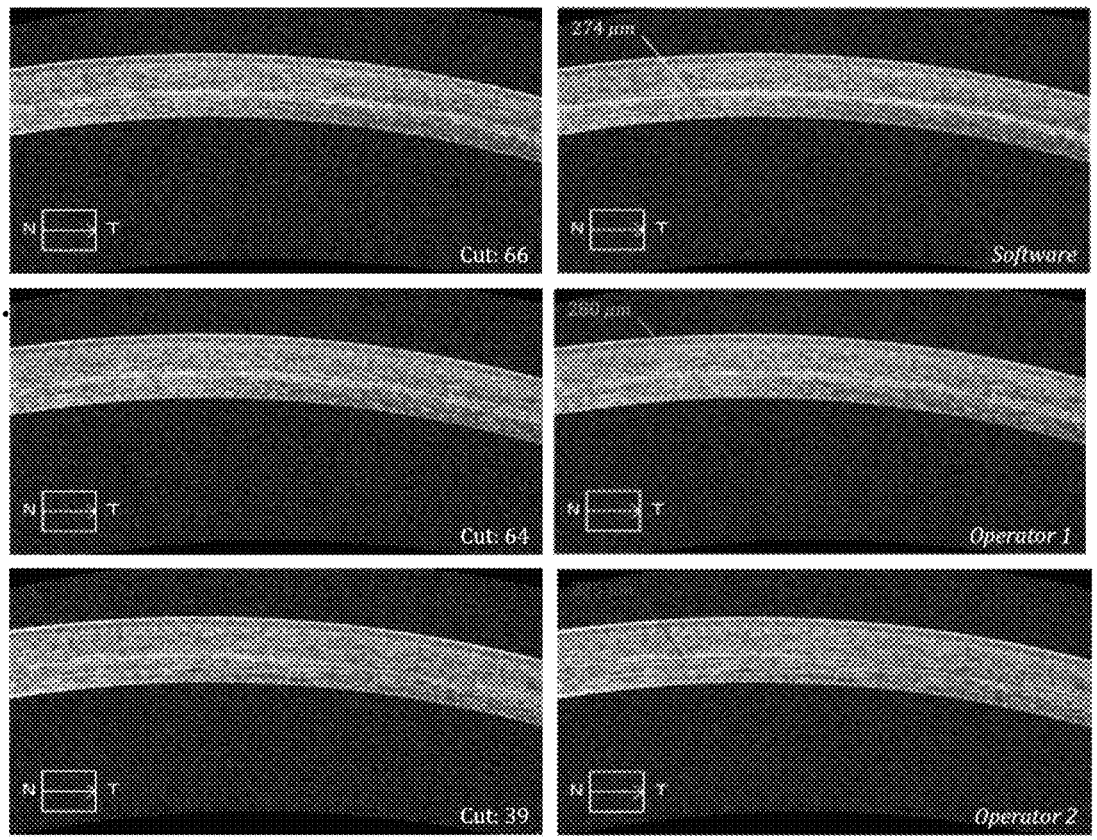
Figure 28C:
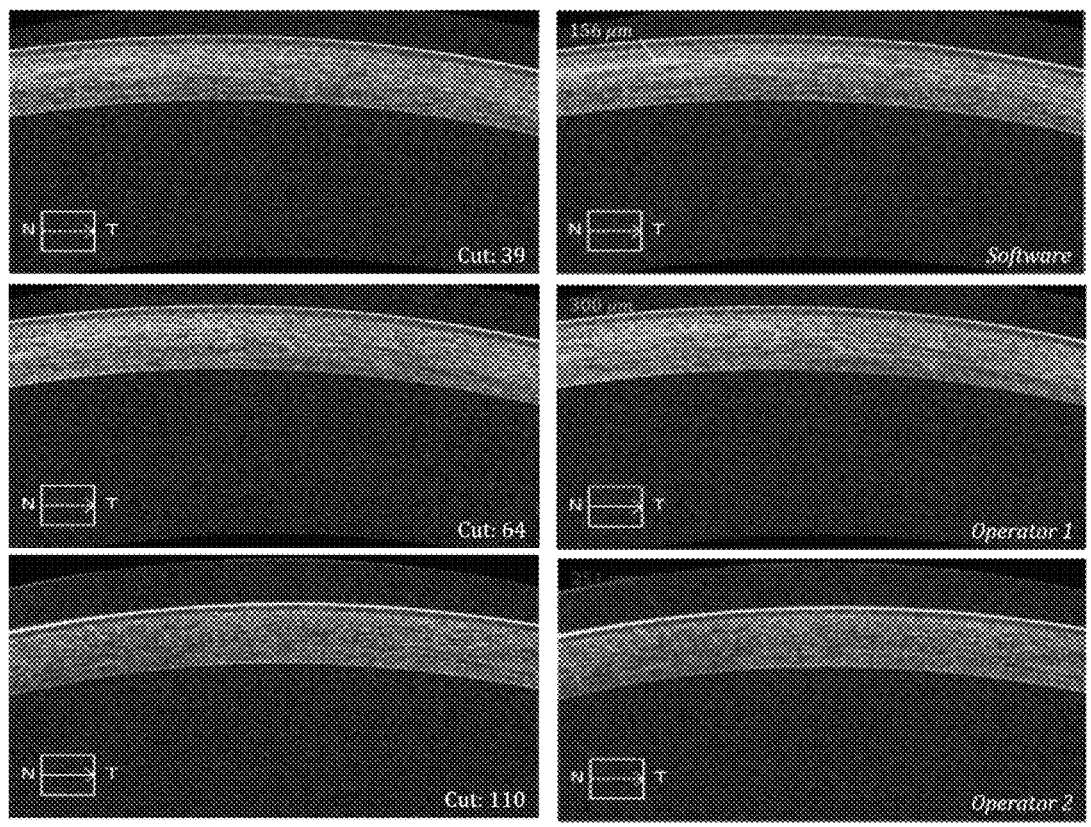
Figure 28D:
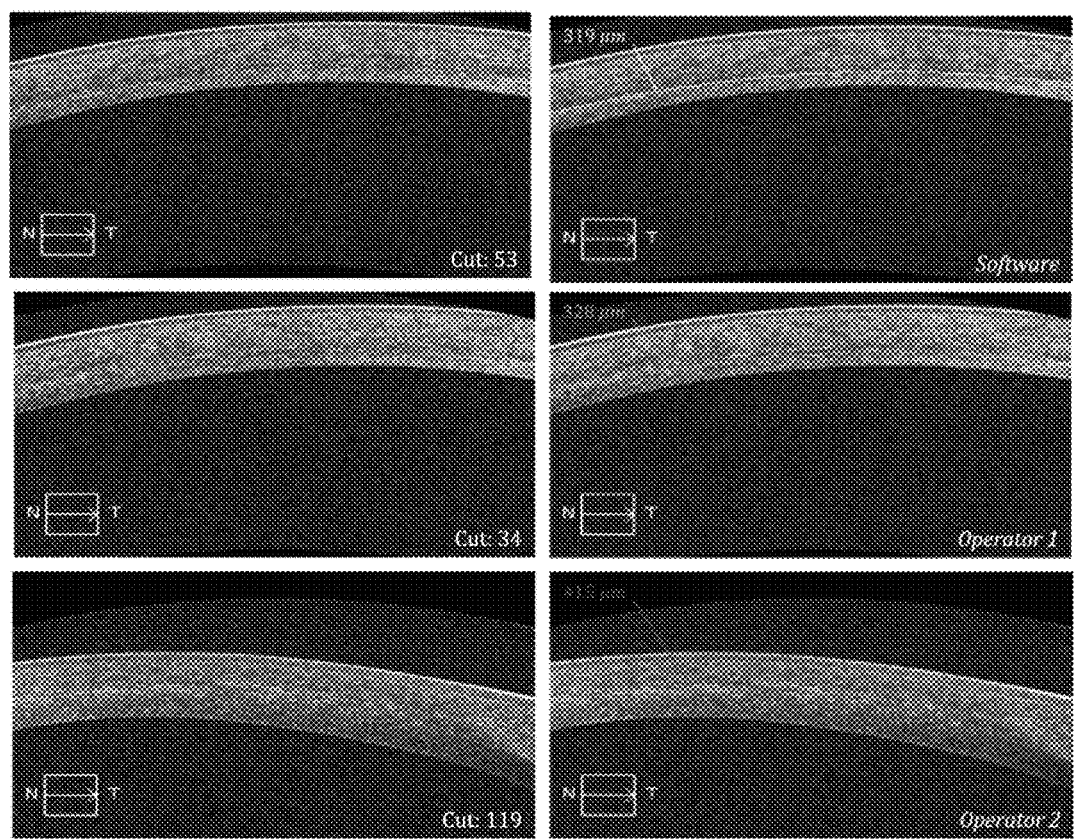
Figure 29A:
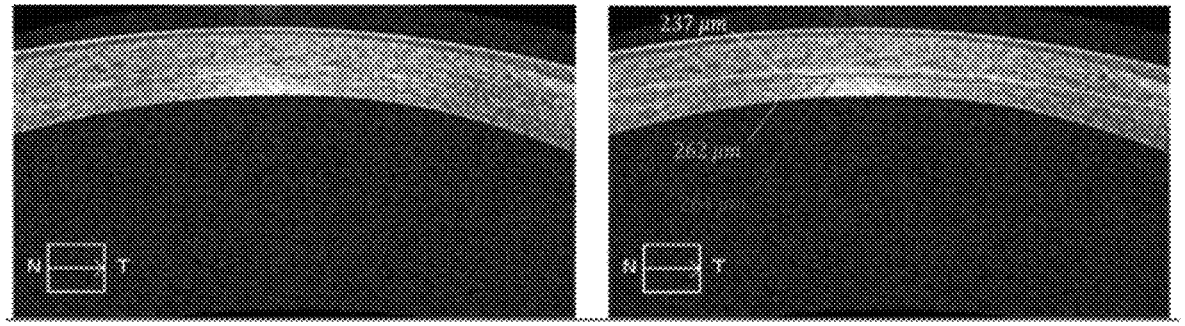
FIGS. 29A-29D are raw and annotated cuts of detected demarcation lines for different patients as measured by the software (suggested, in yellow), the first operator (in green) and the second operator (in red). The absence of a highlighted line indicates that a demarcation line was not detected by software/operator.
Figure 29B:
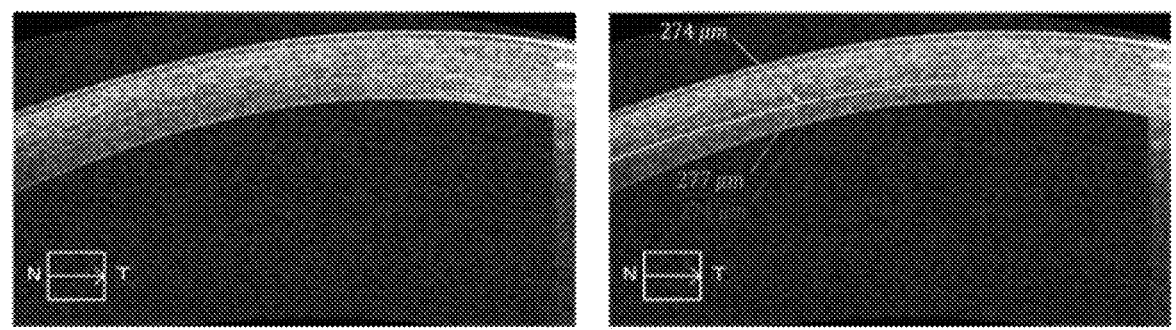
Figure 29C:
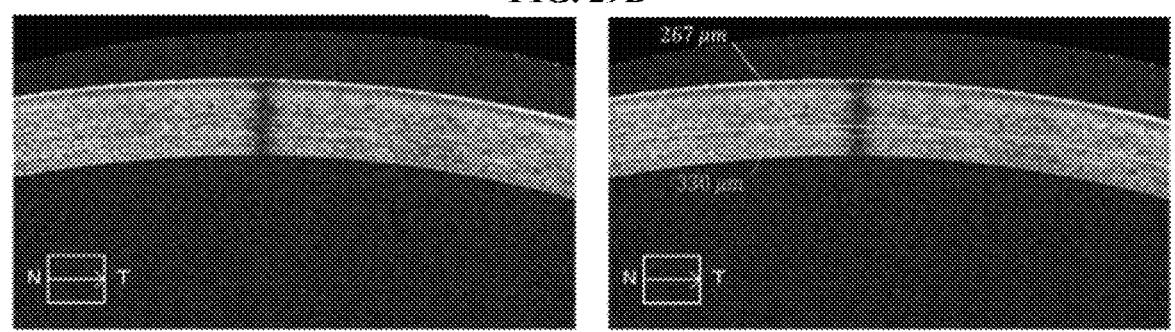
Figure 29D:
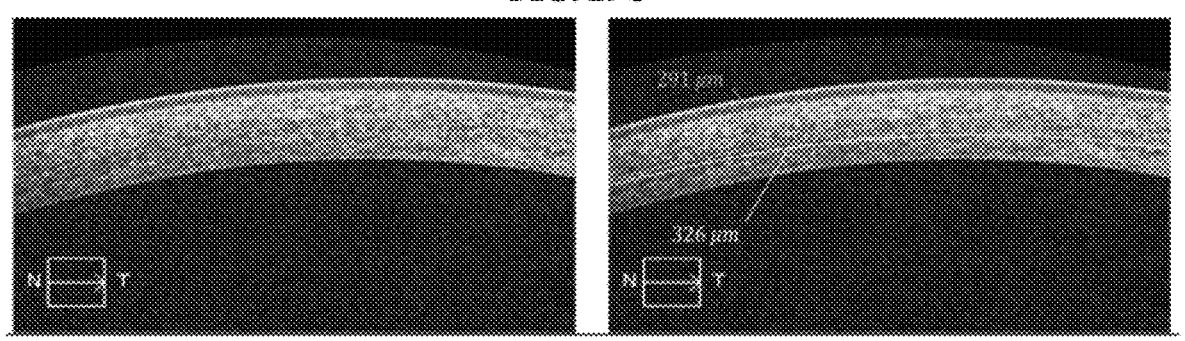

In FIGS. 28A-28D, this note is emphasized by showing examples of the four scenarios that might occur in the demarcation line depth measurer that includes measurements: one of the operators does not find any potential demarcation line, (as observed in FIG. 28a); the three operators, human and software, agree on the same demarcation line (as observed in FIG. 28b); the gap between the demarcation line depth as measured by the inventive software module demarcation line depth measurer and the human operators is relatively large (about 100-140 microns, as observed in FIG. 28c); and lastly, as observed in FIG. 28d, the difference between the human operators is large, yet one of the human operators measurements is close to the software measurement.

Although a minimum score value was set, the software was still able to detect a suggested and/or candidate demarcation line in all OCT images, even though one of the human operators did not detect a demarcation line in exactly two images: P15-1M and P19-3M. The scores of the demarcation lines of the latter two images were examined, and by making the software more conservative (in this case, by picking $30^{th}$ percentile as minimum score range as opposed to $16^{th}$ percentile), the software would not detect a demarcation line in these two images; however, a demarcation line would also not be detected in two other images. In FIGS. 29A-29D, the cuts of the affected four images are shown. Interestingly, in these OCT images, the demarcation line chosen by the software and one (or two) human operator(s) is "faded" and with relatively the same brightness intensity. Hence, the software was able to give a well-computed score that accurately assesses the brightness and continuity of a stromal line; whereas, a human operator might give two different examinations for two lines with the same characteristics. Nevertheless, this highlights the flexibility of the tool to be customized as either conservative or loose by the user. Alternatively, in addition to the scoring technique, the tool may also employ machine learning to "learn" from the user about what should be taken as demarcation line, which is a feature implemented in alternative embodiments.

To assess the overall performance of the software, the Pearson Correlation Coefficients and the Intraclass Correlation Coefficients (ICC) are computed [Benesty, Jacob, et al. "Pearson correlation coefficient." Noise reduction in speech processing. Springer Berlin Heidelberg, 2009. 1-4; and Sedgwick, Philip. "Pearson's correlation coefficient." Bmj 345.7 (2012)]. In the following, the characteristics of these coefficients are explained:

i. The Pearson Correlation Coefficient (PCC) is defined as:

$$\rho(x, y) = \frac{E(x, y)}{\sigma_x \sigma_y} \quad (35)$$

where: x and y are two real valued variables; E(x, y) the cross-correlation between x and y; and, $\sigma_x$, $\sigma_y$ the variances of x and y, respectively.

This coefficient is a measure of the linear correlation between two variables, x and y, that has a value between −1 and 1 inclusively such that: If $\rho(x,y)<0$, then x and y are negatively correlated. If $\rho(x,y)=0$, then x and y are not correlated. If $\rho(x,y)>0$, then x and y are positively correlated. Therefore, the closer $\rho(x,y)$ is to the value 1, or −1, the stronger is the correlation between x and y [Kotlarski and Benesty].

ii. The Intra-class Correlation Coefficients (ICC) describes how strongly the values of two variables x and y resemble each other [Müller, Reinhold, and Petra Buttner. "A critical discussion of intraclass correlation coefficients." Statistics in medicine 13.23-24 (1994): 2465-2476]. ICC operates on data as groups. $Y_{i,j}$ is defined as the $i^{th}$ observation in the $j^{th}$ group, as the following:

$$Y_{i,j} = \mu + \alpha_j + \varepsilon_{i,j} \quad (36)$$

where: $\mu$ an unobserved overall mean; $\alpha_j$ an unobserved random effect shared by the values in group j; and $\varepsilon_{i,j}$ an unobserved noise term.

The population ICC is hence computed using the following formula:

$$\frac{\alpha_\alpha^2}{\sigma_\alpha^2 + \sigma_\varepsilon^2} \quad (37)$$

where: $\sigma_\alpha^2$ the variance of $\alpha_j$; and $\sigma_\varepsilon^2$ the variance of $\varepsilon_{i,j}$.

The value of ICC is strictly positive and can reach at most the value 1. For a value ICC less than 0.4, the groups to have a poor agreement are considered; conversely, when the value of ICC is greater than 0.75, the data is considered to have excellent agreement.

The main difference between PCC and ICC is that, in the first, each variable is centered and scaled by its own mean and standard deviation; whereas, in the second one, the data are scaled by a pool mean.

Figure 30:
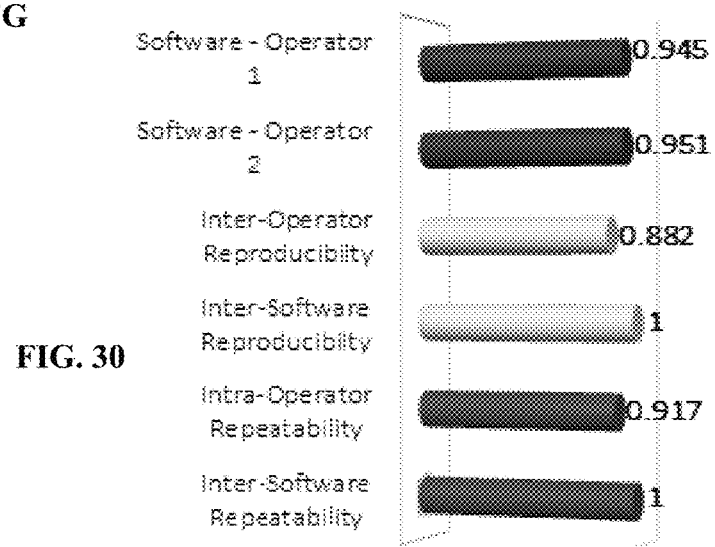
FIG. 30 is a bar graph showing the Intraclass correlation coefficients (ICC) of the demarcation lines' depths for all patients.

In FIG. 30, the values computed for 40 Keratoconus patients considered in the experiments were reported. As noticed, the human-software (for both human operators) is very high (i.e., >0.94), which is considered excellent.

Furthermore, the experimental results report that: The mean corneal demarcation line depth is 295.9±59.8 microns as computed by the automated technique. The mean corneal demarcation line depth is 314.5±48.4 microns as computed by the human operators. The Pearson correlation coefficient between the software and the first operator is 0.918. The Pearson correlation coefficient between the software and the second operator is 0.910. The average time per OCT examination by the human operator was 31 seconds. The average time per OCT examination by the software scored less than a second.

All these results validate the effectiveness and efficiency of the automated tool, and its promise in replacing manual human measurements.

Example: The Future Work Comprises the Following Four Main Activities

1) Stress-testing the Back-end module with more data to further ensure its accuracy, and optimizing the software to be ready for production deployment and usage.

2) Designing and implementing the Front-end of the software, which will consist of a graphical user-interface (GUI) that allows the physician to interact and manipulate the data generated by the software. Some of the main features will include: a) creating a project file per patient; b) Generating a report (in PDF format) that includes haze statistics; c) the ability to toggle/change some Back-end parameters to get a customized view of the image; d) visually highlight color-code some regions for analysis.

3) Developing the technology in its second form (i.e., as a plugin to the OCT scanner software). This requires getting access to the application programming interface (API) of the OCT scanner software and customizing the application (especially the Front-end) to be integrated as part of the OCT scanner software.

4) Extending and customizing the Back-End module to perform the following:

a. Handle different types of OCT images (e.g., of 8 mm size and for different types of scanners); b Make the selection of demarcation line depend on the analysis of multiple images for the same patient at different timeframes, as opposed to only observing it at one specific time (e.g., pick the line based on how to appears in the image taken at 3-months AND at 6-months, and not only at 3-months); c. Instead of using 20 images, modeling the OCT cuts in 30 (where the 3rd dimension is the cut number). This will provide us with a holistic view of the demarcation line and optimally measure its depth. Subsequently, the software will pick the "best slice" (i.e., where the demarcation line appears the clearest) for measuring the demarcation line depth and report it.

5) Researching further uses of the application in other longitudinal studies and medical practices such as pathology.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A system for Automated Detection and Measurement from an optical coherence tomography (OCT) image comprising a processor to perform the operations of: an image processing module and a data extraction module; wherein the image processing module generates information from an OCT image and comprises a plurality of sub-modules including a region divider, a corneal attribute calculator, a haze region detection, a haze region aggregation, a haze classifier, a demarcation line detector, and a demarcation line depth measurer; and with the information generated by the image processing module, the data extraction module performs visual data and statistics generation comprising at least two sub-modules including a data visualizer and a quantitative data generator to detect corneal haze and calculate corneal attributes.

2. The system of claim 1, wherein the region divider locates the region covered by the cornea in the image by dividing it into segments; the region divider finds a plurality of coordinates of a top boundary and a bottom boundary of the cornea; and the region divider segments the cornea into three regions of equal size including the anterior stroma, mid stroma, and the posterior stroma.

3. The system of claim 2, wherein the corneal attribute calculator is used once the boundaries of the image are identified, the corneal attribute calculator calculates a corneal thickness, a total corneal area, a total corneal intensity, and an average corneal intensity.

4. The system of claim 3, wherein the haze region detection is used for the data extracted by the region divider and the corneal attribute calculator to find regions within the cornea that have similar haze attributes and combined regions of brightness; and the haze region detection calculates the total intensity of all haze regions and the total area of all haze regions.

5. The system of claim 4, wherein the haze region aggregation is used once all the regions in the cornea that contain haze are detected, the haze region aggregation is applied to aggregate haze regions that may be close enough to each other based on a formula that measures a distance between neighboring hazes regions; and the haze region aggregation output includes a list of haze regions that may or contain one or more haze regions.

6. The system of claim 5, wherein the haze classifier is used as each haze component in the list retrieved from the haze region aggregation gets classified according to the haze area, a percentage of haze in each region, the region to which the haze belongs, and an average intensity of haze.

7. The system of claim 6, wherein the demarcation line detector is applied to find the demarcation line, wherein the demarcation line is a bright line that follows a curvature of the cornea depending on the type of the OCT image; and the demarcation line detector detects a location of the demarcation line in the cornea and detects its depth that is how far is it from the epithelium or top boundary.

8. The system of claim 7, wherein the data extraction module performs visual data and statistics generation with the information generated by the image processing module; the data visualizer is used when the data given by the image processing module is used to provide visual representation of corneal haze regions; and the data visualizer color codes the haze in each region and highlights the haze in each region depending on its class.

9. The system of claim 8, wherein the data visualizer includes a visual interaction with the user through a graphical user interface (GUI).

10. The system of claim 8, wherein the quantitative data generator is used when the raw data values given by the image processing module are compiled and converted into at least one statistic to assist in clinical decision-making and monitoring of haze progress in the eye of the patient.

11. A Method for Automated Detection and Measurement comprising:

generating information from an image by an image processing module;

performing visual data and statistics generation by a data extraction module comprising at least two sub-modules including a data visualizer and a quantitative data generator to detect corneal haze and calculate corneal attributes; and wherein the quantitative data generator comprises detecting the outer boundary and the inner boundary of the cornea, and detecting corneal haze based on reflectivity, location, size, and shape.

12. The method of claim 11, wherein the image processing module comprises a plurality of sub-modules including a region divider, a corneal attribute calculator, a haze region detection, a haze region aggregation, a haze classifier, a demarcation line detector, and a demarcation line depth measurer.

13. The method of claim 12, further comprising locating the region covered by the cornea in the image by dividing it into a plurality of segments by the region divider; finding the plurality of coordinates of a top boundary and a bottom boundary of the cornea by the region divider; and segmenting the cornea into three regions of equal size including the anterior stroma, mid stroma, and the posterior stroma by the region divider.

14. The method of claim 13, further comprising identifying the boundaries of the image and using the corneal attribute calculator; and calculating the corneal thickness, the total corneal area, the total corneal intensity, and the average corneal intensity by the corneal attribute calculator.

15. The method of claim 14, further comprising using the data extracted by the region divider by the haze region detection and the corneal attribute calculator and finding regions within the cornea that have a similar haze attributes and combined regions of brightness; and calculating the total intensity of all haze regions and a total area of all the haze regions by the haze region detection.

16. The method of claim 15, further comprising using the haze region aggregation once all the regions in the cornea that contain haze are detected; aggregating the haze regions that may be close enough to each other based on a formula that measures the distance between neighboring hazes regions by the haze region aggregation; and including an output list from the haze region aggregation that is a list of haze regions that may or contain one or more haze regions.

17. The method of claim 16, further comprising using the haze classifier as each haze component in the list retrieved from the Haze Region Aggregation sub-module gets classified according to the haze area, the percentage of haze in each region, the region to which the haze belongs, and the average intensity of haze.

18. The method of claim 17, further comprising applying the demarcation line detector to find the demarcation line, wherein the demarcation line is a bright line that follows the curvature of the cornea depending on the type of the image; and the demarcation line detector detects the location of the demarcation line in the cornea and returns its depth that is how far is it from the epithelium or top boundary.

19. The method of claim 18, further comprising performing visual data and statistics generation with the information generated by the image processing module by the data extraction module; using the data visualizer when the data given by the image processing module is used to provide visual representation of corneal haze regions; and coding the haze in each region and highlights the haze in each region depending on its class by the data visualizer color; and using the quantitative data generator when the raw data values given by the image processing module are compiled and converted into at least one statistic to assist in clinical decision-making and monitoring of haze progress in the eye of the patient.

20. A Method for Automated Detection and Measurement comprising:
    generating information from an image by an image processing module;
    performing visual data and statistics generation by a data extraction module comprising at least two sub-modules including a data visualizer and a quantitative data generator to detect corneal haze and calculate corneal attributes; and wherein the image processing comprises a sub-module to detect the outer and inner boundaries of the cornea; and detecting corneal haze based on reflectivity, location, size, and shape; wherein the sub-module detects a demarcation line detector.

* * * * *